United States Patent [19]
Carey et al.

[11] Patent Number: 5,977,978
[45] Date of Patent: Nov. 2, 1999

[54] INTERACTIVE AUTHORING OF 3D SCENES AND MOVIES

[75] Inventors: Richard Joseph Carey, Los Altos; David Stanley Immel, Santa Barbara, both of Calif.; Paul S. Strauss, Sharon, Mass.; Robert David Story, Sunnyvale, Calif.

[73] Assignee: Platinum technology IP, Inc., Oakbrook Terrace, Ill.

[21] Appl. No.: 08/748,613

[22] Filed: Nov. 13, 1996

[51] Int. Cl.[6] .................................................. G06T 17/00
[52] U.S. Cl. ............................................................ 345/419
[58] Field of Search ..................................... 345/418, 419, 345/420, 421, 426, 427, 430, 431, 432

[56] References Cited

U.S. PATENT DOCUMENTS 5,307,452  4/1994  Hahn et al. .............................. 395/132

OTHER PUBLICATIONS

Corel Dream 3D (Abstract and screenshot).
Alias|Wavefront, *Explore Anim, Display and Mapper, Version 4.2*, Silicon Graphics, Inc., Nov. 1995.
Alias|Wavefront, *Advanced Visualizer User's Guide, Version 4.2*, Silicon Graphics, Inc., pp. i–xxiv, 1–1–1–11, 13–26, 14–1–14–23,. Oct. 1995.
Alias|Wavefront, "Power Animator V7" (http://www.alias.com/Film_Video/PowerAnimator/PowerAnimator1.html) through http://www.alias.com/Film_Video/PowerAnimator/PowerAnimator4.html).
Alias|Wavefront, "Design Product Line" (http://www.alias.com/General/Overview/product_line.html).
Pixar, "Pixar's RenderMan", (http://www.pixar.com/renderman/rm_info.html).
Pixar, "Pixar Typestry 2.1" (http://www.macpi.org/typestry.html).
Pixar, "Pixar Typestry 2.1" (http://www.macworld.com/pages/february95/Reviews.174html).
Pixar, "The RenderMan Interface Specification, Version 3.1", Sep. 1989, (http://giga.cps.unizar.es/prman/RISpec/Index.html to http://giga.cps.unizar.es/prman/Toolkit/errata2.html).
CGW, "Product Spotlight: Pixar Introduces RenderMan, Intros Three New Products", Nov. 1995 (http://www.cgw.com/cgw/Archives/1998/11/11prod1_01.html).
Murie, Michael, "ShowPlace Brings 3–D into View", *MacWEEK*, vol. 5, No. 34, p. 54(1), Oct. 8, 1991 (Abstract No. 05466716 with full text).
Biedny, David, "The Third Dimension", *MacUser*, vol. 8, No. 9, p. 114(12), Sep. 1992 (Abstract No. 01528969 with full text).
Jakman, Mike and RoseAnn Alspektor, "Pixar Announces Showplace", Business Wire Report (No. 0157260 with full text).

*Primary Examiner*—Phu K. Nguyen
*Assistant Examiner*—Cliff N. Vo
*Attorney, Agent, or Firm*—Fish & Richardson P.C.

[57] ABSTRACT

Three-dimensional scenes or movies are generated by a user of a computer system by interactively selecting a stage from among several available 3D stages, each of which has at least one predetermined feature such as a pedestal, lighting characteristics, a camera path or the like. The user may import predefined 3D objects into the selected stage and move and resize the objects as desired to compose a scene. Once composed, the scene is rendered to generate an image or a series of successive scenes is rendered to generate an animated movie.

53 Claims, 36 Drawing Sheets

```
/* Listing 3.1   The structure of a RenderMan program */ include
render(nframes)  /* Basic program using the RenderMan Interface */
int nframes;
{
    int frame;

RiBegin();           /* Options may now be set */
    /* IMAGE OPTION SECTION: See Chapter 8 */
    RiDisplay( ... );
    RiFormat( ... );
    ...
    /* CAMERA OPTION SECTION: See Chapter 8 */
    RiClipping( ... );
    RiDepthOfField( ... );
    RiProjection("perspective", RI_NULL);  /* The current trans- */
        /* formation is cleared so the camera can be specified. */
    RiRotate( ... );     /* These transformations address the */
    RiTranslate( ... );  /* world to-camera transformation */
    ...  /* controlling placement and orientation of the camera. */ for(frame = 1; frame <= nframes; frame++) {
```

FIG. 4a

```
RiFrameBegin( frame );
    /* FRAME-DEPENDENT OPTION SECTION          */
    /* Can still set frame-dependent options, camera xforms */
    RiWorldBegin(); /* SCENE DESCRIPTION SECTION: */
    /* The camera xform is now set; options are frozen  */
    /* and rendering may begin. We are in world space.  */
        RiAttributeBegin(); /* Begin a distinct object  */
            RiColor( ... );        /* Attributes fit in here */
            RiSurface( ... );      /* See Chapter 11 */
            RiTransformBegin();    /* See Chapter 7 */
                RiTranslate( ... );  /* Object positioning */
                RiRotate( ... );     /* commands (see Ch.7) */
                ...
                RiSphere( ... );     /* See Chapter 4 */
                RiPolygon( ... );    /* See Chapter 5 */
                RiPatch( ... );      /* See Chapter 6 */
            RiTransformEnd();
        RiAttributeEnd();    /* Restore the parent's attributes. */
        ...                  /* Other objects, other spaces */

RiWorldEnd();   /* The scene is complete. The image is ren- */
                    /* dered and all scene data is discarded. Other scenes */
                    /* may now be declared with other world blocks. */
    RiFrameEnd();   /* Options are restored. */
}

RiEnd();
}
```

FIG. 4b

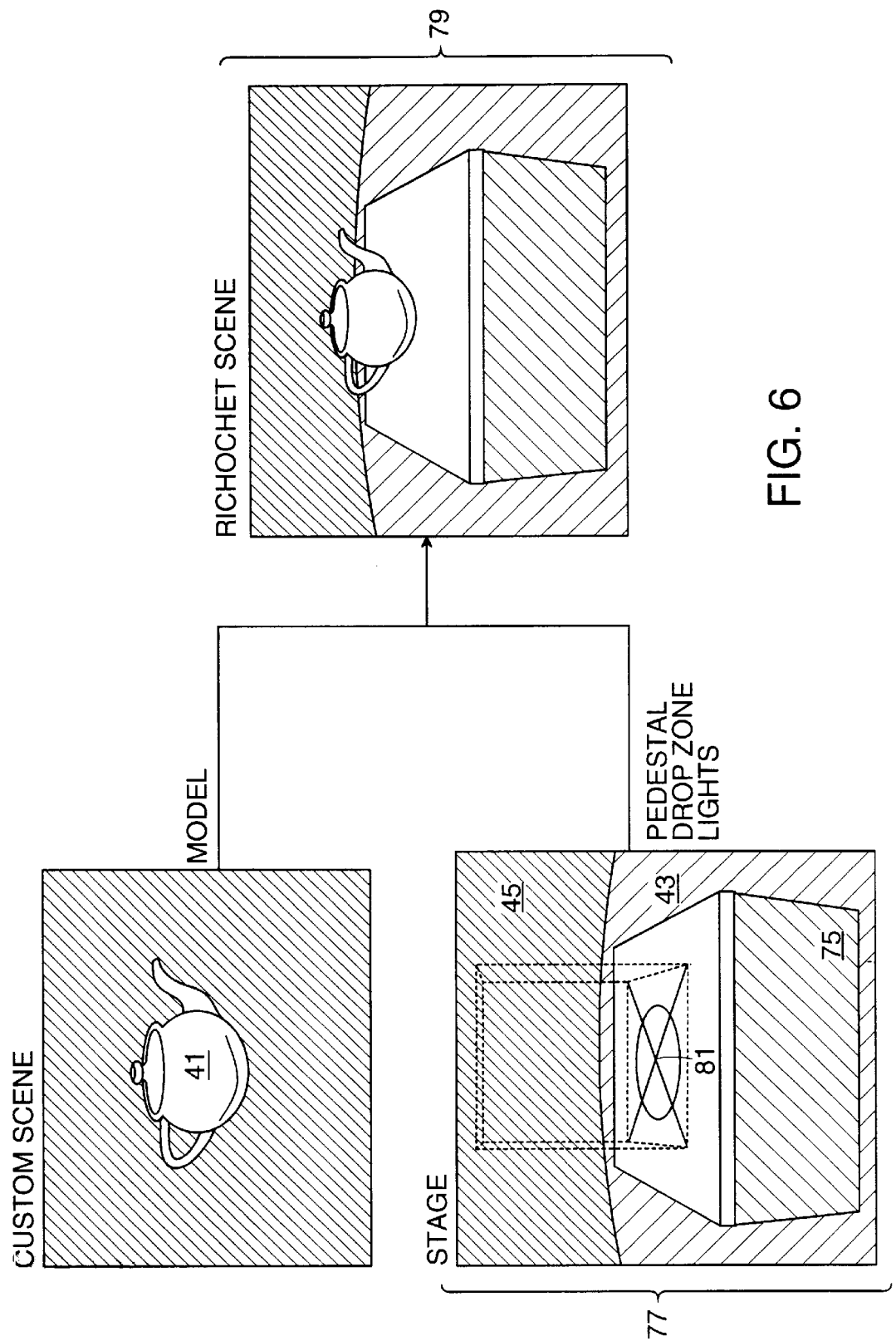

content trimmed for brevity …

INTERACTIVE AUTHORING OF 3D SCENES AND MOVIES

BACKGROUND

This invention relates to the interactive authoring of 3D scenes and movies using a computer system.

A 3D scene typically comprises one or more 3D graphic objects placed in a background setting to create an informative or aesthetically pleasing image. Such 3D scenes may be used in generating image data files (e.g., GIF or JPEG files) or web pages (e.g., HTML or VRML files), or may be strung together in a sequence to create an animated 3D movie (e.g., MPEG-1 or Quicktime files). FIG. 2 shows an example of a 3D scene in which a teapot 41 rests on a horizontal surface 43 with a vertical surface 45 appearing in the background.

A 3D scene also may embody characteristics, other than its graphic elements, that affect how the scene appears to a human viewer. The scene of FIG. 2, for example, is illuminated by three separate spot light sources positioned at locations respectively behind the viewer over the left and right shoulders, and in front of and above the viewer. Different types, locations and numbers of light sources may be used as desired to create different effects.

Other scene characteristics include the orientation and position of the graphic objects in the scene relative to the viewer's eye point, which may be thought of as governed by what would be seen through a camera. The camera may be moved through virtual 3D space (forward, back, side-to-side, rotating around an object, etc.) to change how the scene appears to the viewer. The term "virtual" refers to the fact that the 3D scene, the space that it occupies and its graphic elements and characteristics, are conceptual rather than actual, but possess the functional (e.g., optical) properties of the physical entities that they represent. The camera in the 3D scene of FIG. 2 is oriented in virtual 3D space such that the viewer is presented with a side view of the teapot 41, with the viewer's eye positioned at a point slightly above the teapot and looking down at it.

Among other characteristics, the graphic objects in a 3D scene each may have a color, texture and/or material composition which will affect how the 3D scene appears to the viewer. The colors, textures and material compositions of the objects in the scene of FIG. 2 are such that the three light sources create bright reflection spots 47 and shadows 49 on the teapot 41 and on the horizontal surface 43.

The manner in which a 3D scene is "rendered"—the process of generating an image (or an image file) from data that describes the image—also affects how the resultant 3D scene appears to a viewer. In FIG. 2, "ray tracing" is used to create a photorealistic representation in 2D space of the 3D scene. Ray tracing is a rendering technique that creates shadows and reflections by following paths taken by rays of light in the scene. Other less sophisticated rendering techniques exist and may be used to generate images with less computer processing, and thus more quickly, although they tend to result in a less realistic scene. FIG. 3 shows how the scene of FIG. 2 appears when it is rendered without the benefit of ray tracing.

To create a 3D scene using conventional systems and methods is a painstaking and difficult process. In one such method, authors of 3D scenes must know and use high level programming languages (e.g., C++) to write long and complex computer programs that invoke specialized object libraries. Instructions within such programs specify each of the 3D objects that appear in the scene, including the background of the scene, and each of the scene's characteristics such as lighting, orientation, texture and color. The complexity of this method is evident from FIG. 4, which shows the basic structure of a C++ program of the type that may be used for generating 3D scenes.

Examples of programming tools that may be used to create 3D scenes include Silicon Graphics' "Open Inventor Toolkit" (described in Josie Wernecke, The Inventor Mentor, Addison-Wesley (1994); Josie Wernecke, The Inventor Toolmaker, Addison-Wesley (1994), and Open Inventor C++ Reference Manual, Addison-Wesley (1994)); "OpenGL" (described in Jackie Neider et al., OpenGL Programming Guide, Addison-Wesley (1993); and Pixar's "Renderman" (described in Steve Upstill, The Renderman Companion, Addison-Wesley (1990)).

Another conventional method by which an author may generate 3D scenes is to use an application program specifically designed for that purpose. Examples of such an application program include Alias's "Power Animator" and Wavefront's "Advanced Visualizer."

To effectively generate 3D scenes, an author must possess a considerable amount of knowledge, training and expertise. As a result, less knowledgeable authors generally have been precluded from using computer systems to create sophisticated and photorealistic 3D scenes. Even for those authors that possess the requisite skills, generation of 3D scenes using conventional techniques is a slow and difficult process.

SUMMARY

One objective is to provide authors with simple yet powerful tools to allow them to rapidly and interactively create informative and/or aesthetically pleasing 3D scenes. An author is provided with a set of predefined environments, or "stages," into which models can be imported and later showcased for review and presentations. These stages may include preset colors, textures, lighting and camera paths in 3D space to create photorealistic ray-traced results with just a few items of input from the author, for example, by means of a graphical user interface ("GUI"). These stages also may include a "drop zone" at which 3D objects appear when imported into the scene, and which is optimally positioned within the stage to take advantage of its predefined lighting and other characteristics.

Authors are provided with an intuitive GUI through which they can interactively specify a path in 3D space for a virtual camera to travel as it renders successive views of a 3D scene. The GUI includes visual tools that allow the author to modify the camera path as desired, to specify the direction in which the camera looks, and to add pauses and timing markers to control the rate at which the camera moves along its specified path.

In one embodiment, three-dimensional scenes or movies may be generated by a user of a computer system by interactively selecting a stage from among several available 3D stages, each of which has at least one predetermined feature such as a pedestal, lighting characteristics, a camera path or the like. The user may import predefined 3D objects into the selected stage and move, rotate or resize the objects as desired to compose a scene. The 3D objects may be static or self-animated. Once composed, the scene is rendered to generate an image or a series of successive scenes is rendered to generate an animated movie.

The selecting of a stage may be performed by a user of the computer system. To facilitate this selection, the user may be presented with a visual interface having graphical abstractions to allow the user to communicate with the computer system. Among other things, this enables the user of the computer system to modify the predetermined feature of the selected 3D stage. The predetermined feature of the selected 3D stage may be a functional element or an aesthetic element, a combination of both, or some other type of element. For example, the predetermined feature of the selected 3D stage may include lighting characteristics for the 3D scene, or a headlight that moves in synchronization with a viewpoint from which a user of the computer system views the stage. Alternatively, or in addition, the predetermined feature of the selected 3D stage may comprise a platform on which the 3D object may be placed. The predetermined feature of the selected 3D stage may be a texture, a color or a material composition, for example, on one or more of the stage's graphical elements. The predetermined feature also could be an environment (e.g., fog, haze, pollution or smoke) in which the 3D object is displayed, or a home view position with respect to which the 3D object is rendered. The predetermined feature of the selected stage may be a camera path that defines a series of positions in 3D virtual space along which a virtual camera travels while rendering views of the scene. In addition, a stage may include two or more predetermined features which are a combination of any of the above.

Prior to being selected by the user, each 3D stage is defined such that its features are tailored to complement each other. This allows each stage to represent a different atmosphere in which 3D objects may be displayed.

Upon being imported into a stage, a 3D object is placed at a predetermined drop zone, for example, a virtual 3D region, within the selected 3D stage. The drop zone may be a bounding box that encompasses the imported 3D object, which is automatically scaled to fit within the bounding box upon importation. The 3D object may be selectively imported at a location other than at the drop zone, or imported without being automatically scaled, or both. By default, the virtual camera looks at the drop zone at all points along the camera path, although the user is able to modify the virtual camera's orientation. The user may manipulate (e.g., translate, rotate, scale) the 3D objects that have been imported into a scene or the 3D objects that make up a stage or both.

In another embodiment, using various user interface abstractions provided by the computer system, a user of the computer system may interactively define (i) a camera path in virtual 3D space along which a virtual camera travels; and (ii) a variable rate at which the camera moves along the camera path. These parameters may be specified independently of each other by the user. Virtual camera views of the 3D scene are rendered based on the camera path and the variable rate defined by the user. The user-defined variable rate at which the camera moves along the camera path may include pause information that causes the virtual camera to pause for a specified duration when the virtual camera reaches a specified location on the camera path, time tick information that causes the virtual camera to arrive at a specified location on the camera path at a specified time, or both. This information may cause the virtual camera to accelerate or decelerate as it moves along the camera path.

Advantages of this invention may include one or more of the following. The visually based tools provided by this application program provide users with an intuitive environment in which 3D graphic content may be developed. The tools are simple to use yet sophisticated in their functionality. Creators of 3D scenes need not learn and use complicated programming techniques to achieve professional looking results. Rather, authors need only learn a few basic skills, such as standard cursor manipulation techniques, to create complex 3D scenes on their own. As a result, personnel training time is reduced while the quality of output is enhanced.

Providing a number of predefined stages from which users may select enables authors, even inexperienced ones, to quickly and easily generate sophisticated and aesthetically pleasing 3D scenes. Each predefined stage presents a different environment designed for various purposes (e.g., marketing presentations, engineering presentations, artistic renderings) and in different artistic styles (modern, gothic, art-deco, etc.). The availability of predefined stages allows users to create visually rich scenes simply by adding and/or arranging a few 3D objects and associated characteristics such as lighting, texture, color and the like. This ability to generate sophisticated images in an expedited manner applies to both experienced and inexperienced authors.

The visually based movie making tools provided by this application program allow users an easy and quick way to make movies. Each predefined stage includes a default camera path that is tailored to the stage's features. If the default stage suits the user's needs, making a movie may be accomplished with just a few cursor manipulations. If the user wants to modify the default camera path, or create an entirely new camera path, the Camera Path Editor presents the user with an intuitive environment in which to do so. The user need only visually manipulate (i.e., drag in the desired direction) in 3D virtual space the camera points that define the camera path.

Other advantages and features will become apparent from the following description, including the drawings and claims.

BRIEF DESCRIPTION OF THE DRAWINGS

FIG. 4 shows the basic structure of a program for 3D scene generation.

FIG. 6 shows how components may be combined to form a typical 3D scene.

FIGS. 8(a) through 8(l) show screen displays of the 12 predefined stages provided by the LightBox™ application.

DETAILED DESCRIPTION

Figure 1:
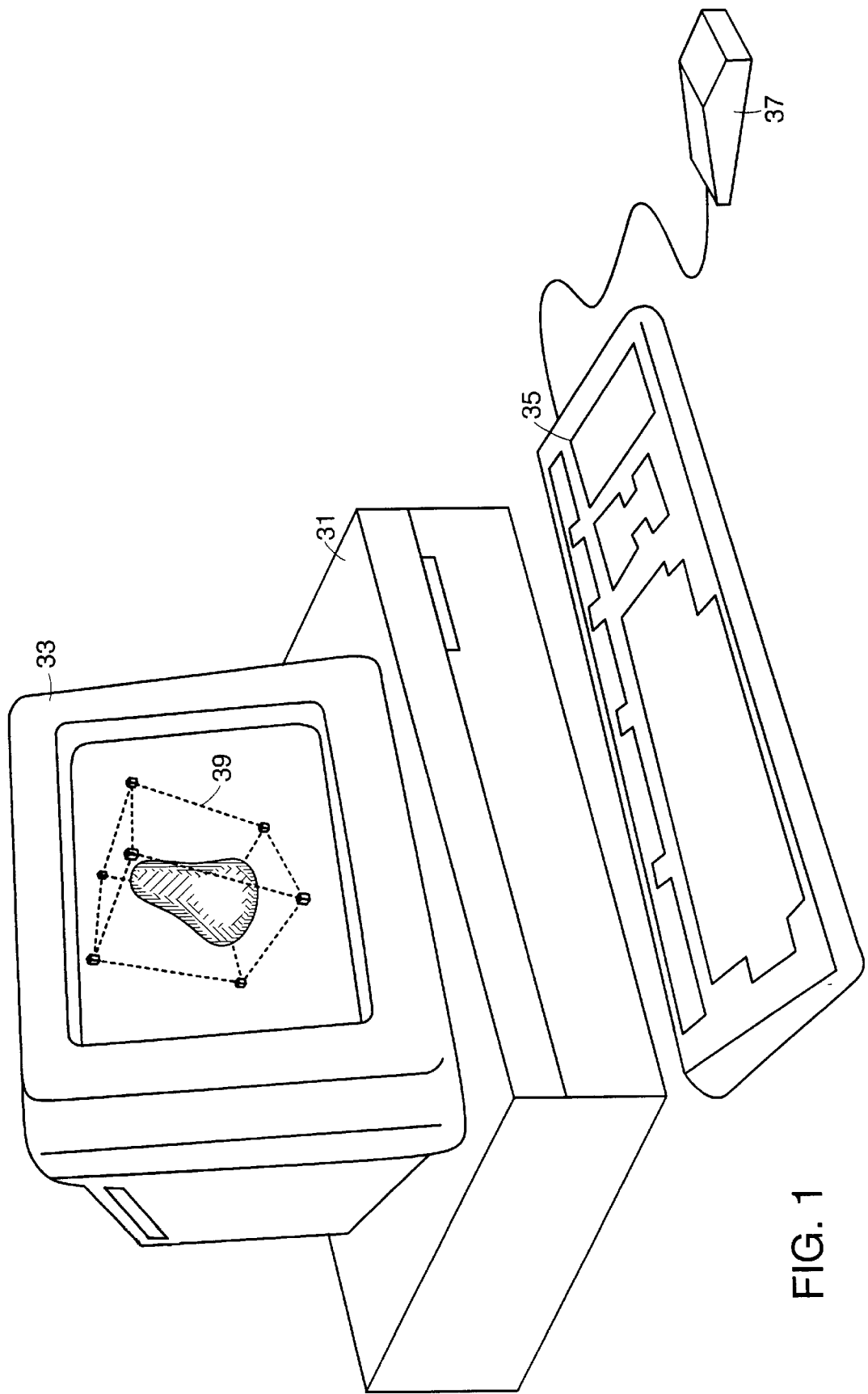
FIG. 1 shows a computer system displaying a 3D image.

The computer system illustrated in FIG. 1—which includes mouse 37, keyboard 35, CPU 31 and CRT 33—represents a hardware setup for running software that allows a user to view and/or create virtual 3D scenes. The techniques described here were implemented on Silicon Graphics machines using the Open Inventor Toolkit, Motif, OpenGL, and the C++ programming language and apply to any computer system that has a display device such as CRT 33.

The LightBox™ 1.0 rendering package, which is a component of Silicon Graphics' Mindshare™ Collaborative Environment, allows a user of a computer system, for example, an author, to compose interactively a 3D scene and produce a rendered image of a single view of the scene or a movie consisting of a series of rendered views of the scene. LightBox™ provides a number of predefined "stages" into which the user can import models of 3D objects to create a customized scene. Each stage makes up the basic features of a 3D scene and acts as a template in creating a new 3D scene. A stage includes one or more predetermined 3D graphic objects (e.g., a pedestal or platform on which the 3D model may be set) or characteristics (e.g., lighting) or various combinations of both. A user's guide describing the operation and features of LightBox™ (using its preliminary name, "Ricochet") is attached as appendix A and incorporated by reference.

The 3D graphic objects, both those forming a stage and those that the user may import into a stage, may be self-animated objects or static objects (i.e., non-self-animated). Self-animated objects are objects that change their state (e.g., appearance) based on the value of a global parameter (e.g., time or position of a virtual camera). An example of a self-animated object is an image of a windmill whose blades spin at a constant rate in correspondence with the passage of global time. The Open Inventor file format facilitates the use of self-animated objects as described in The Inventor Mentor, supra.

Figure 5:
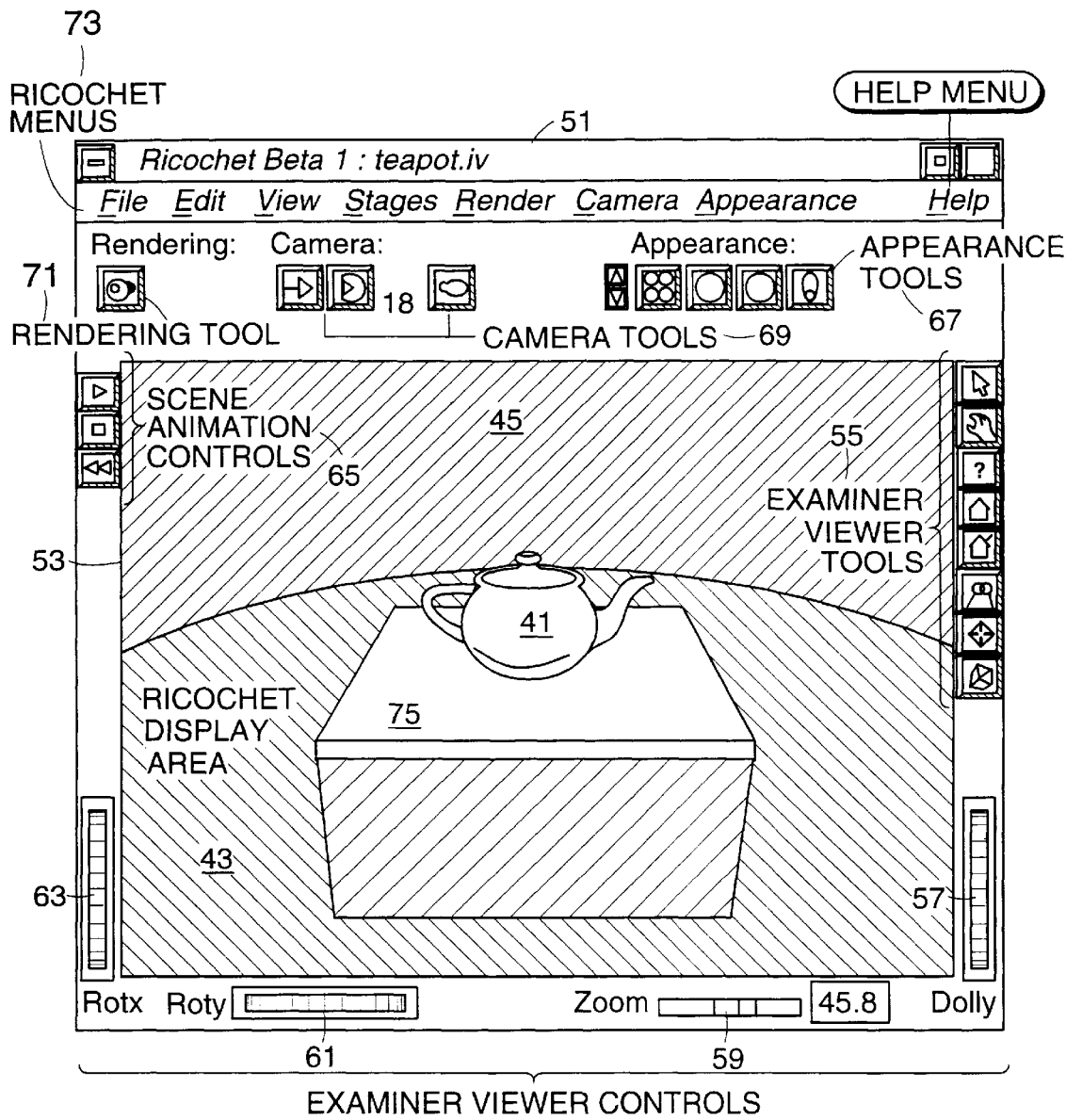
FIG. 5 shows a screen display of the main window in the LightBox™ application.

FIG. 5 shows an example LightBox™ screen display. The LightBox™ rendering package is embodied as a graphical user interface ("GUI") within a main window 51, and includes a display region 53 for displaying the 3D scene in its current state. The GUI includes various user-interface abstractions 55–73 (e.g., menus, toolbars, buttons, thumbwheels and the like, generically referred to as "widgets") to provide the user with a number of different tools for varying the appearance of the 3D scene. To modify the 3D scene, or otherwise interact with the LightBox™ application, the user interactively manipulates one or more of the widgets 55–73 until the desired result is achieved. For example, the user can manipulate the Dolly thumbwheel 57 to move the camera (i.e., the user's viewpoint) closer to or farther from the scene as desired. The user can cause the camera to translate (move side-to-side, up or down) relative to the scene by manipulating the Roty and Rotx thumbwheels 61 and 63, respectively. Full details on the use and operation of widgets 55–73 is provided in appendix A. Typically, a mouse is used to manipulate widgets 55–73 although any other input device could be used for this purpose. In response to manipulation of widgets 55–73 or other input from the user, the 3D scene is redrawn in real time using the input received from the user as appropriate.

As shown in FIG. 6, two basic elements are combined to form the 3D scene 79: a 3D object 41 and a predefined stage 77. The 3D object, teapot 41, typically is a model (a data structure that describes how the object appears in 3D virtual space) that was previously generated in a separate program. In building a scene, the user imports one or more of these models into a predefined stage selected by the user.

The stage 77 is a collection of one or more graphic objects and associated characteristics that provide a backdrop for the 3D object (or objects) being displayed. In creating a 3D scene, the user may pick, from among several different predefined stages provided by the LightBox™ application, a stage that accentuates or otherwise complements the 3D object being showcased. Alternatively, a user can create and use a new stage, either by modifying one of the existing predefined stages, or by building one from scratch. In either case, the stage serves as a template into which the user imports 3D models to create a new scene.

The particular stage 77 in FIG. 6 includes platform 75 resting on a horizontal surface 43, vertical surface 45, and several inherent characteristics such as lighting, texture, color, home viewpoint (the default camera position relative to the scene), all of which affect how the scene appears to the viewer.

Figure 7A:
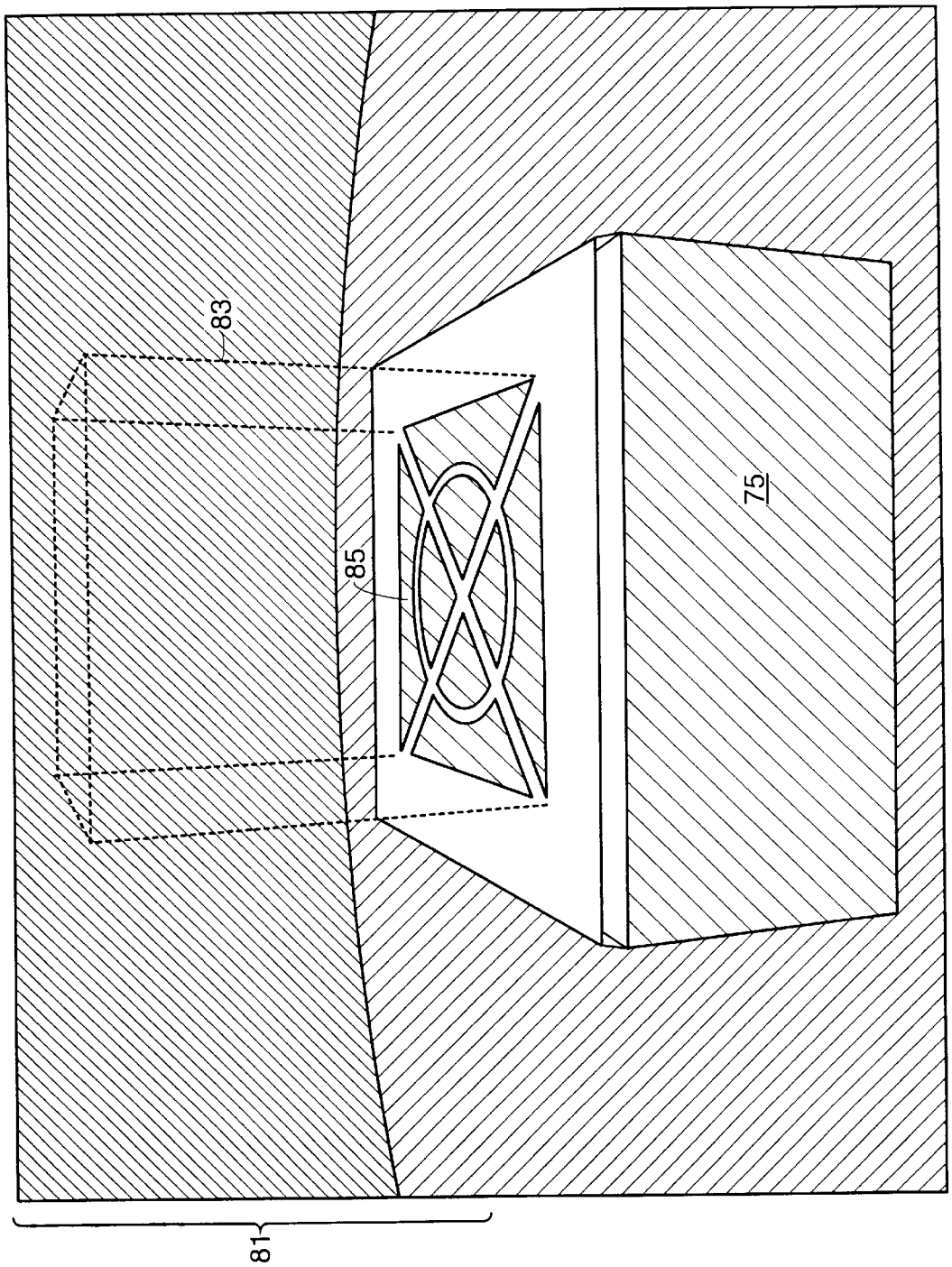
FIGS. 7(a), 7(b) and 7(c) show example screen displays of a predefined stage and a 3D object within the drop zone of the predefined stage.
Figure 7B:
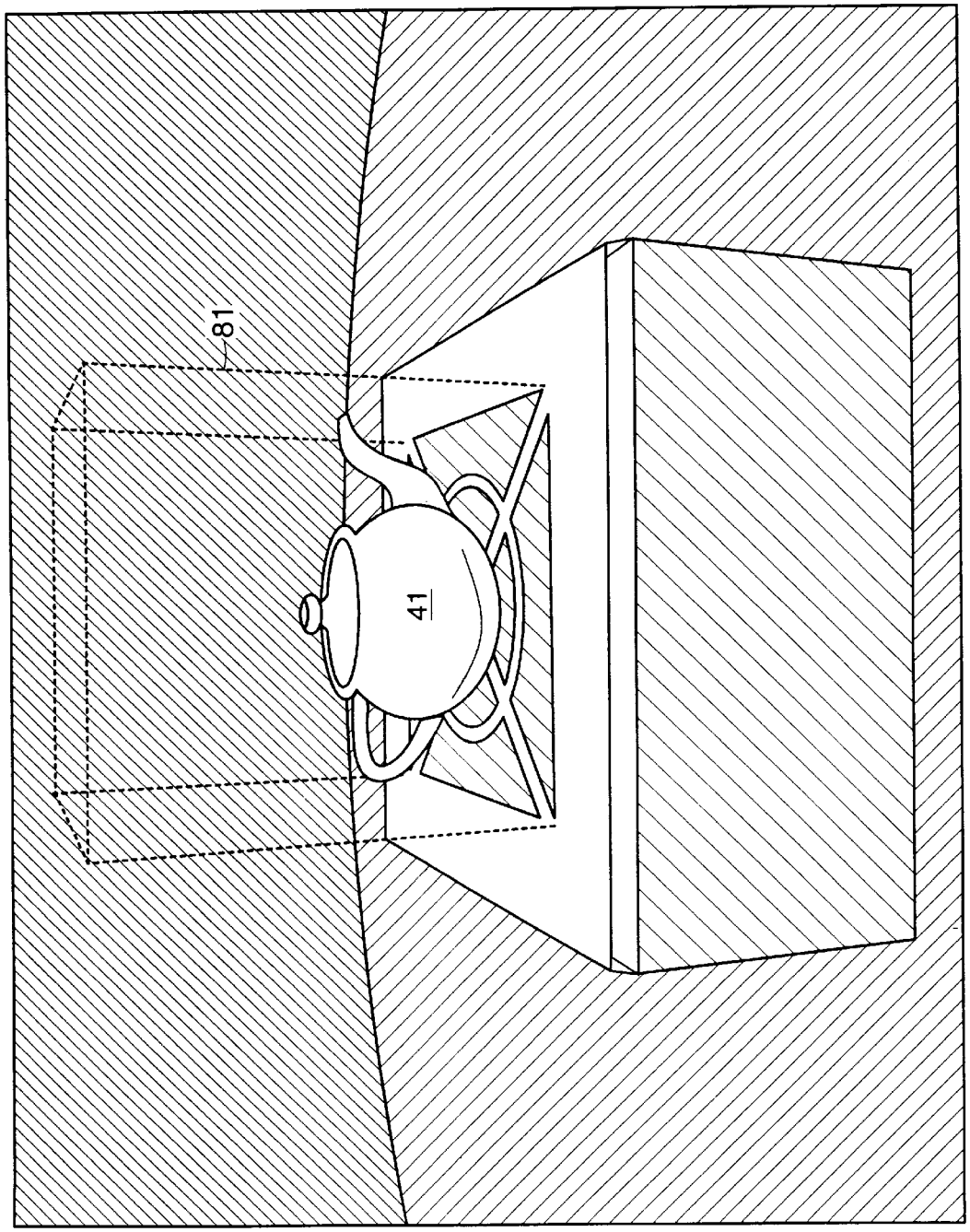

Stage 77 also includes a "drop zone" 81 composed of a wire-frame box 83 having a reference pattern 85 at its base as shown in greater detail in FIG. 7(a). A drop zone is a virtual 3D region within the stage, typically a box, that serves several purposes: it is the point of entry for all 3D models imported into the stage by the user. All models imported into a stage are automatically positioned to appear within the drop zone. As shown in FIG. 7(b) teapot 41 is automatically positioned at the bottom of drop zone 81 in the center of reference pattern 85 upon being imported into stage 77. Although only one drop zone is illustrated, a stage conceivably could include two or more drop zones at which the user may alternatively import 3D objects. In addition, a model upon being imported into a stage may be automatically scaled to be as large as possible while still fitting within the drop zone and while still retaining its original proportions. Moreover, the drop zone typically acts as a focal point for the scene. Typically, stage is designed so that the drop zone is positioned at a strategic location that is optimized for the scene's lighting and other characteristics.

By using the "Absolute Import" feature, a user may selectively disable the auto-scaling of 3D objects upon importation, and may further import objects at locations (e.g., a location specified by a model) other than the drop zone. These capabilities are useful when the user is importing sub-assemblies that were modeled relative to one another. Upon importing the parts into the scene, they may be properly re-assembled, which may not otherwise be possible if the parts were re-scaled or re-oriented relative to each other.

After a model has been imported into a stage, the user may move it to any other location within the scene as desired. The user also may resize a model to a scale other than that initially imposed on it upon being imported into the drop zone. These model manipulation operations, as well as rotation of a model, are accomplished by interactive cursor manipulation techniques with the assistance of visual clues (e.g., manipulator box, directional arrows, knobs) provided by the LightBox™ application. Complete details are provided in appendix A.

Figure 7C:
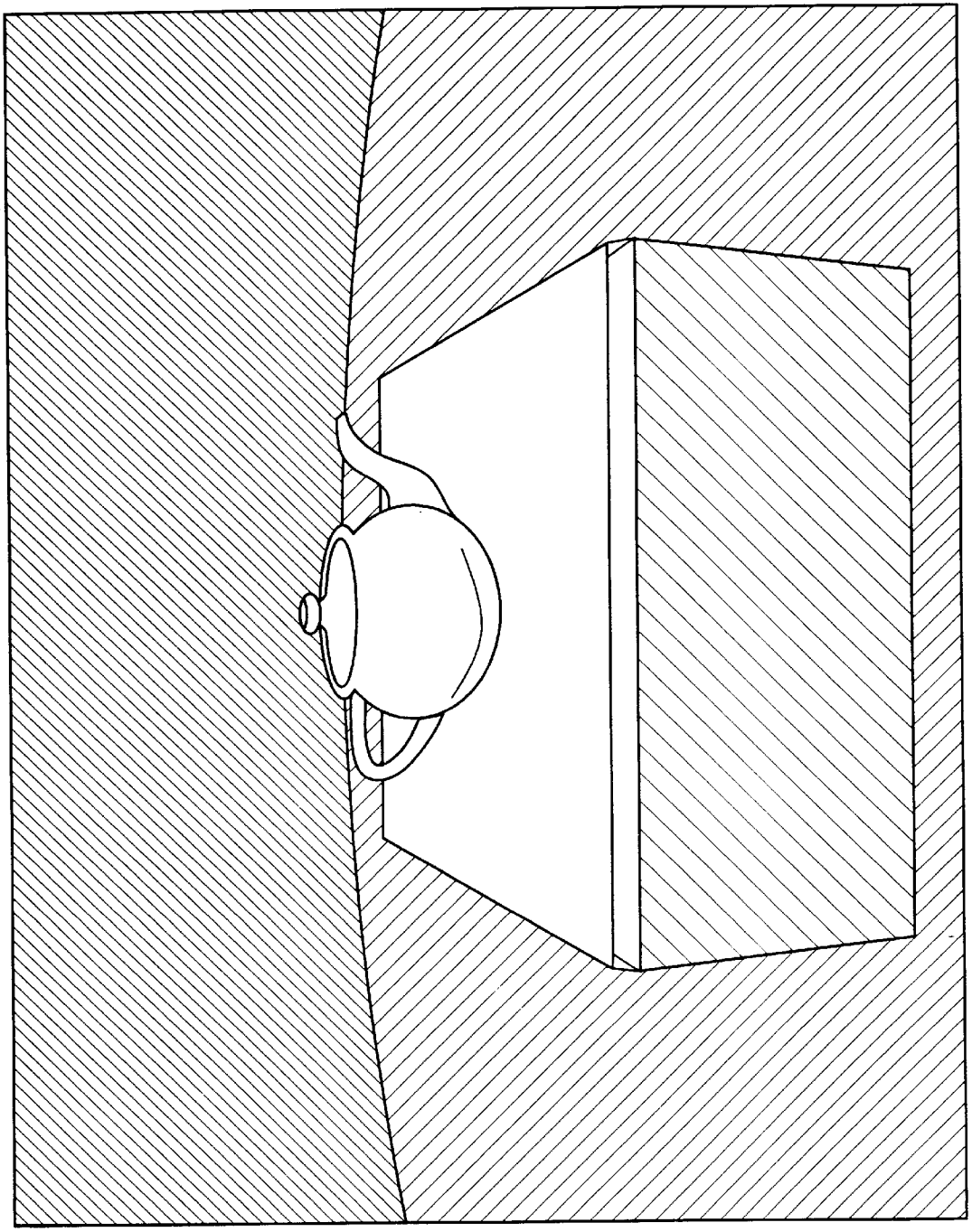

As shown in FIG. 7(c), the user may selectively turn on/off the display of the drop zone 81 so that the wire-frame box 83 and the reference pattern are visible/invisible. The default setting is that the drop zone is not displayed. This feature may be desirable when the user prefers that the scene have a less cluttered appearance while it is being constructed. Although the drop zone may be invisible, it remains present logically and functionally within the stage.

The drop zone feature provides several advantages. For example, because models are automatically scaled when they are imported into a drop zone, the user is free to import virtually any model into the scene without regard to its size. Once imported, the model will always fit nicely within the scene and will have a size that is similar to any other model that is imported into the scene. Moreover, a stage's drop zone typically is positioned at a location that is optimized for the scene characteristics—for example, the scene's lighting and home viewpoint. As a result, any model imported into a stage, if left within the drop zone, also will be positioned at a point within the stage that is optimal for the scene's characteristics. This feature is particularly important for lighting which typically is one of the most difficult characteristics to define in generating a scene.

The LightBox™ application provides the user with 12 different predefined stages (FIGS. 8(a) through 8(l)) that may be used in creating 3D scenes. Each stage includes different graphic objects so that the user may select the one that best suits his or her needs. For example, a user who wishes to create a 3D scene for purposes of marketing a consumer product may choose a stage that has aesthetic elements—for example, features relating to a certain artistic style (e.g., modern, arts-and-crafts, impressionistic), bold colors or aesthetically appealing features to attract the attention of consumers, as in FIG. 8(l). On the other hand, an engineer or scientist who wishes to create a 3D scene to convey detailed technical information in a precise manner may choose a stage that includes functional elements such as a ruler or grid lines (e.g., FIG. 8(k)). By picking a stage suited to the purpose of the presentation as the starting point in creating a scene, users are able to easily and quickly generate aesthetically pleasing and/or informative images even though they may have little or no understanding of graphical or artistic composition.

Each of the predefined stages provided by LightBox™, in addition to its drop zone and any graphic objects (e.g., a platform or a ruler) it may contain, has one or more associated characteristics, or default features, that affect how the scene appears to the user. These characteristics include lighting, environment, background color, texture, material, home viewpoint and a camera path, each of which is described below.

Figure 9A:
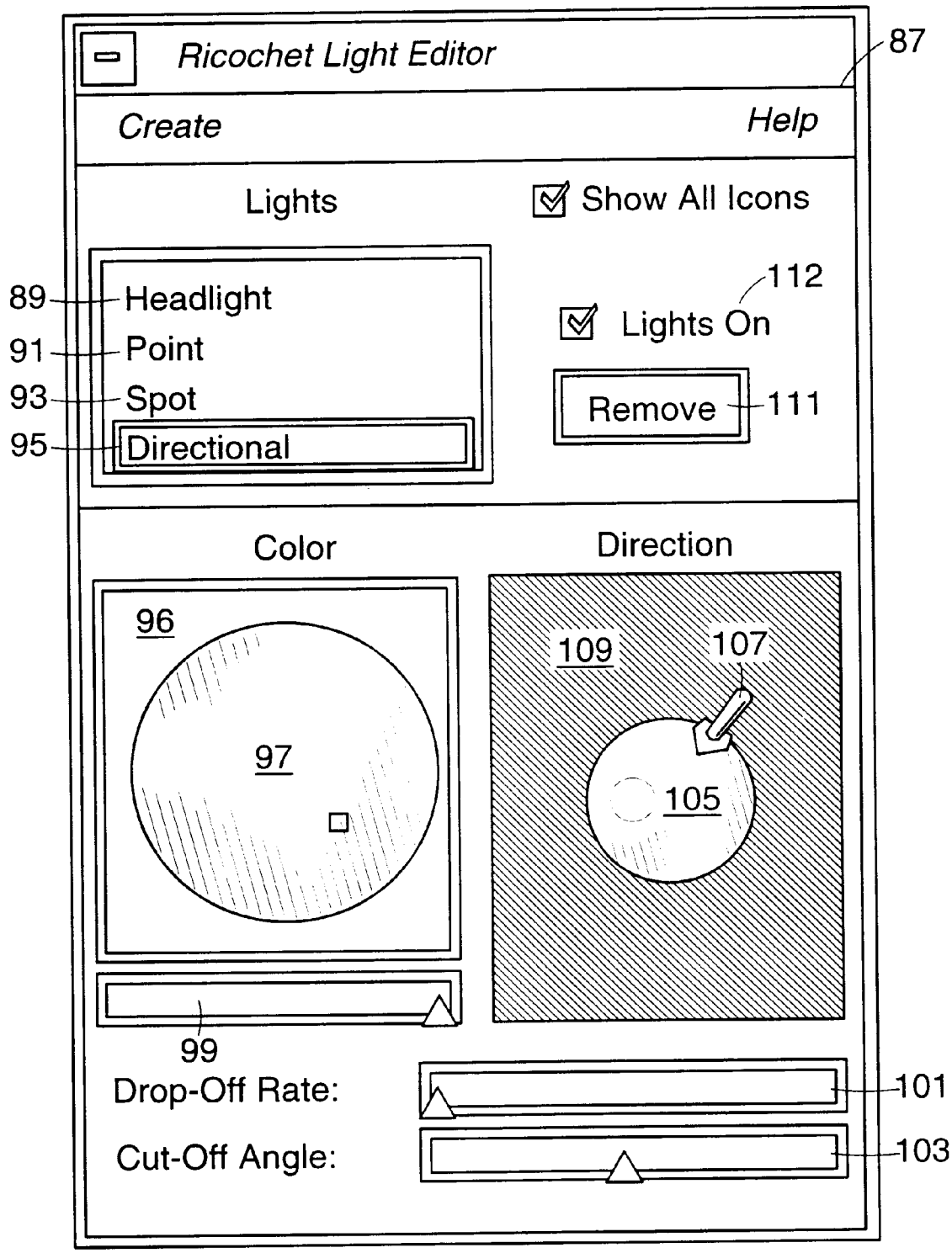
FIGS. 9(a) and 9(b) show respective screen displays of the Light Editor window and the Environment Editor window in the LightBox™ application.

The LightBox™ application provides the user with a Light Editor window 87, as shown in FIG. 9(a), which allows the user to specify, through interactive cursor manipulation techniques, the type, number, color, and position or direction of the light sources that are used to illuminate the 3D scene. Three types of light sources are available to the user to add to a scene: a spot light 93, a directional light 95, and a point light 91. A fourth type of light source, a headlight 89, is present in every scene, although the Light Editor allows it to be turned on and off by the user. The headlight is a white light that illuminates a scene from the point at which the camera views the scene and which moves automatically with the camera as the user changes the viewpoint.

A spot light provides a cone of light that diverges from the light's location and illuminates from a point along a primary direction. Spot lights have two characteristics that the user may vary by means of sliders 101 and 103: drop-off rate (the rate at which light intensity drops off with increased distance from the spot light's primary direction) and cut-off angle (the threshold angle beyond which the light intensity is zero).

A directional light is infinitely far away from the scene and illuminates uniformly along a particular direction. The user may specify the direction along which a directional light illuminates by positioning arrow 107 relative to sphere 105 in the Direction box 109.

A point light has a specific location in space and radiates equally in all directions from its location. Point lights and spot lights may be moved by the user to new locations relative to the scene by appropriate manipulation of the icons that represent the active light sources in the scene.

The color of any light may be changed by the user as desired. To do so, the user moves the cursor to the desired location on color wheel 97 within Color box 96. The user may adjust the intensity of the chosen color with slider 99. The illumination from the selected light changes color in the scene in real time as the user moves the cursor within color wheel 97.

Any light other than the headlight may be removed from the scene by the user by clicking on the Remove button 111. In addition, any light also may be turned on or off without removing it permanently from the scene by alternately clicking on the "Light On" box 112.

Figure 9B:
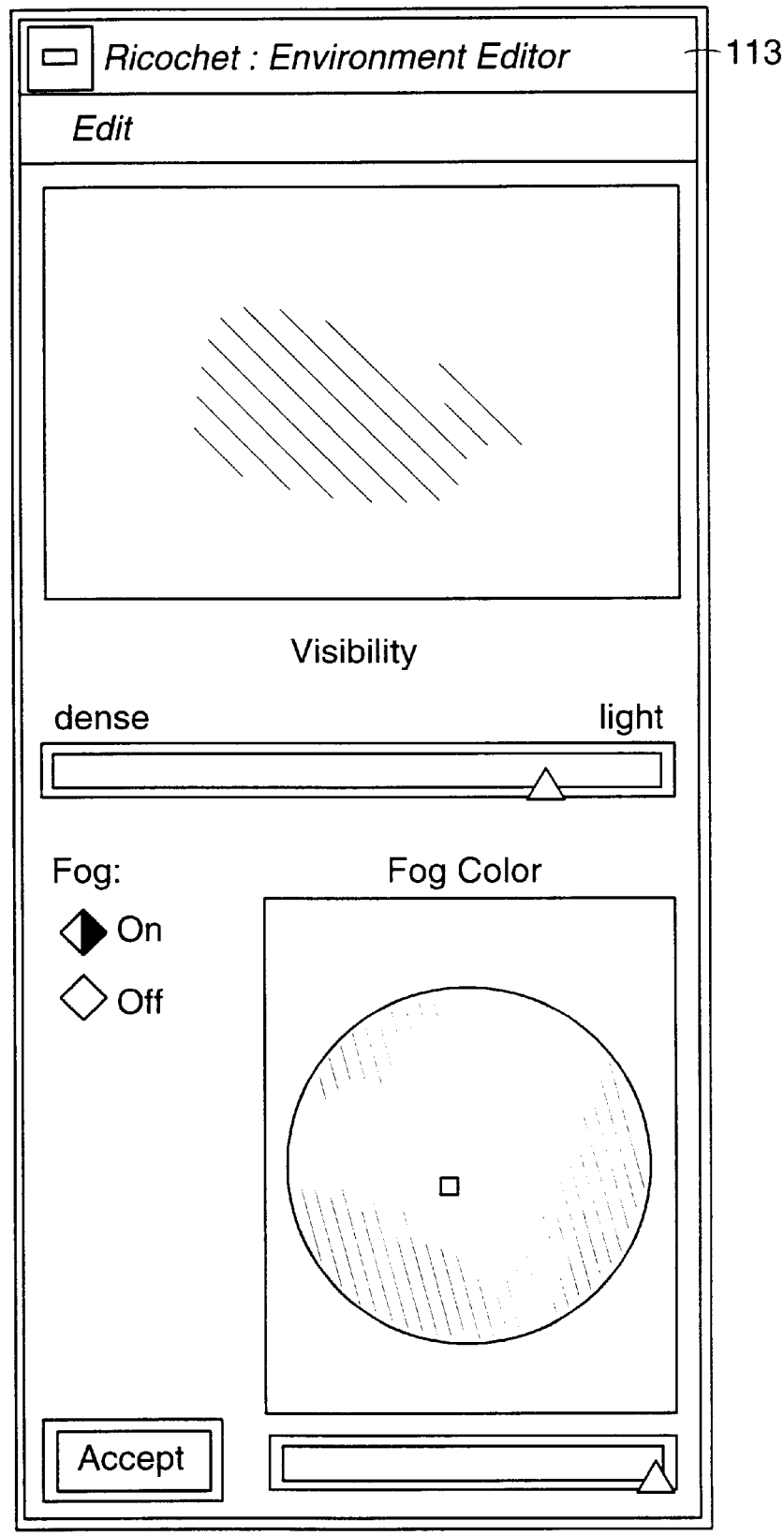
Figure 10A:
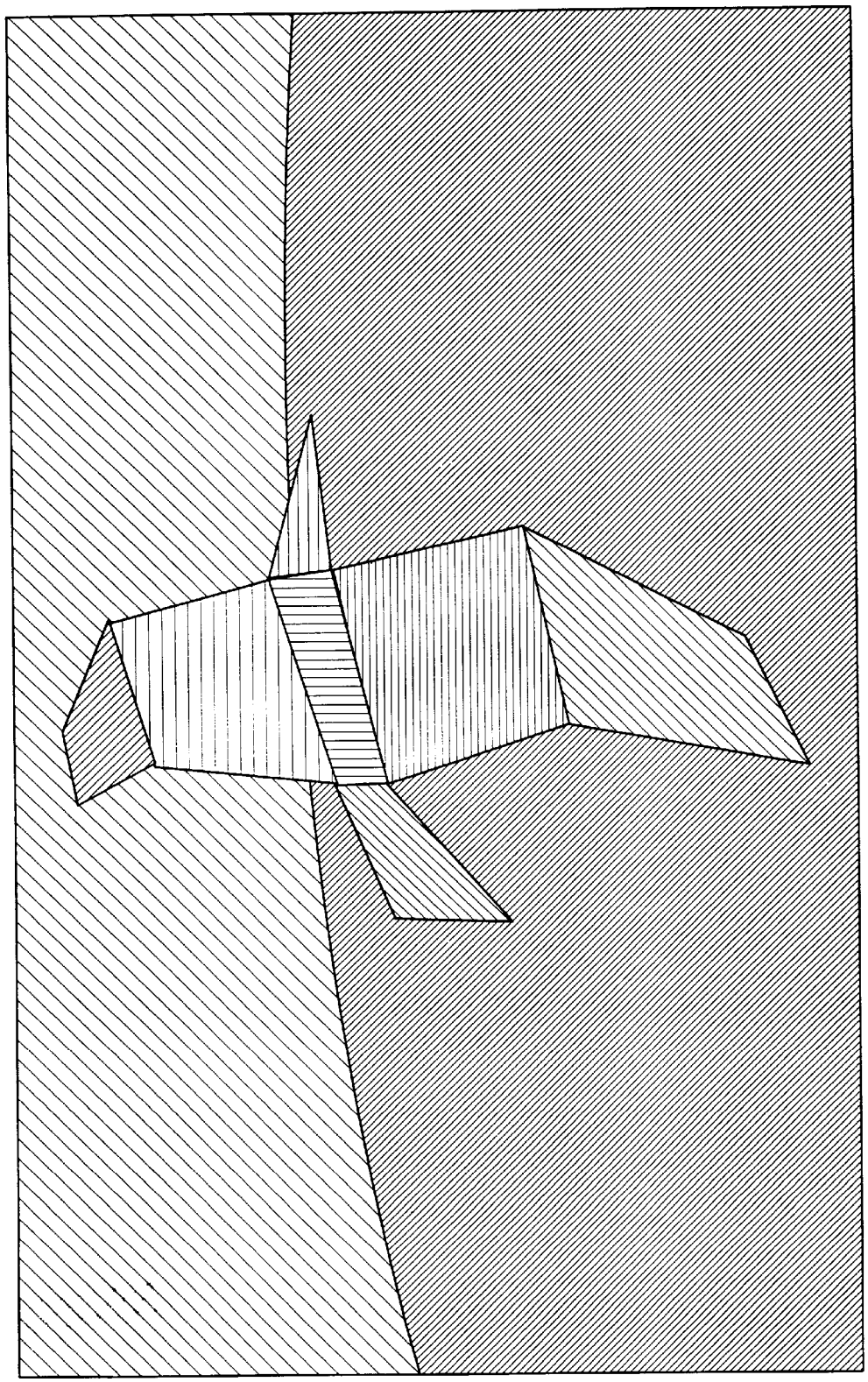
FIGS. 10(a) and 10(b) show example 3D scenes respectively rendered without fog and with fog.
Figure 10B:
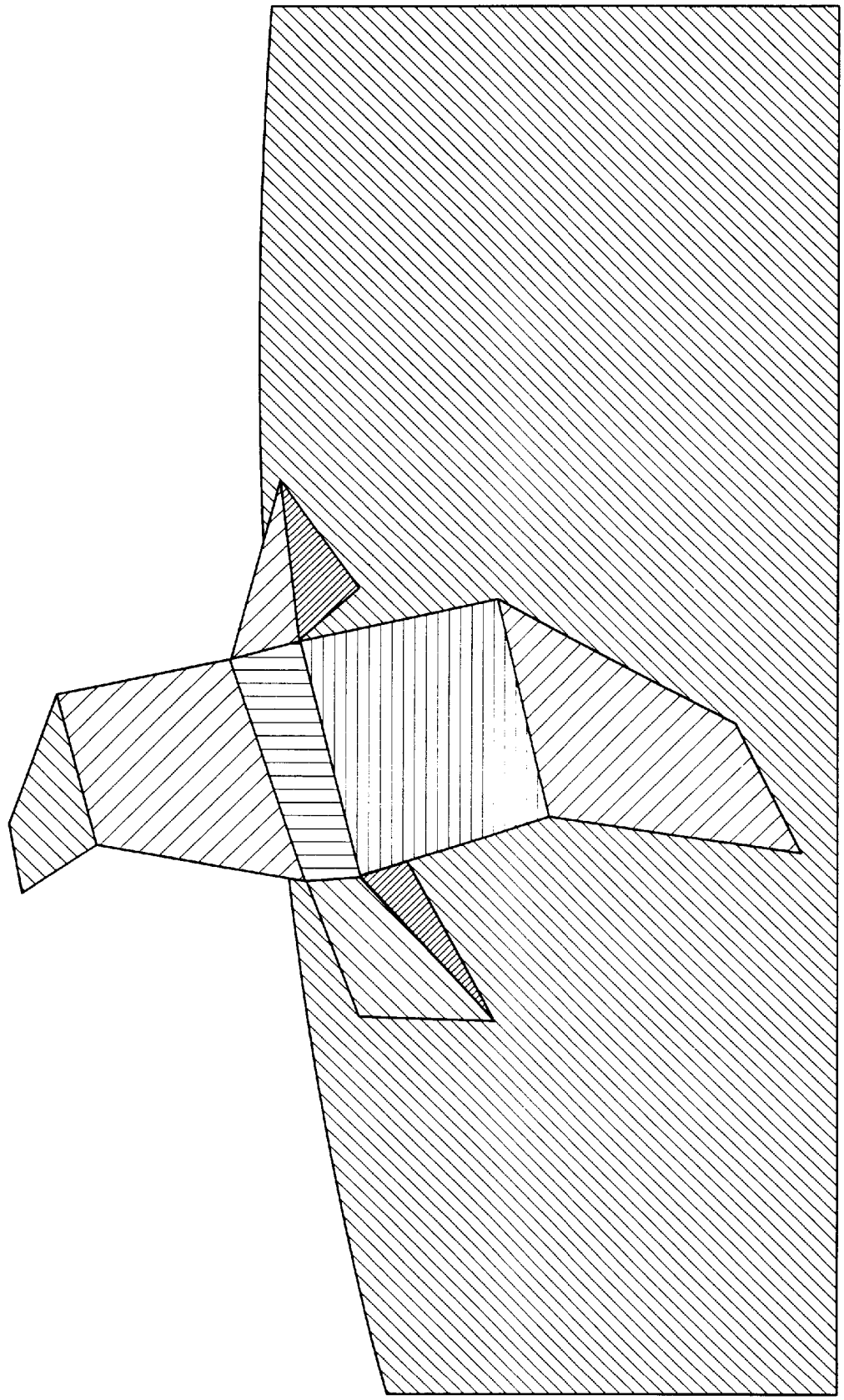

The user may simulate fog, haze, pollution or smoke in the scene by using the Environment Editor window 113 (FIG. 9(b)). If fog or the like is desired, the user manipulates the widgets in the Environment Editor window 113 to select values of visibility and fog color and intensity to achieve the desired effect. A scene without fog is shown in FIG. 10(a) and the same scene with fog is shown in FIG. 10(b).

Figure 11:
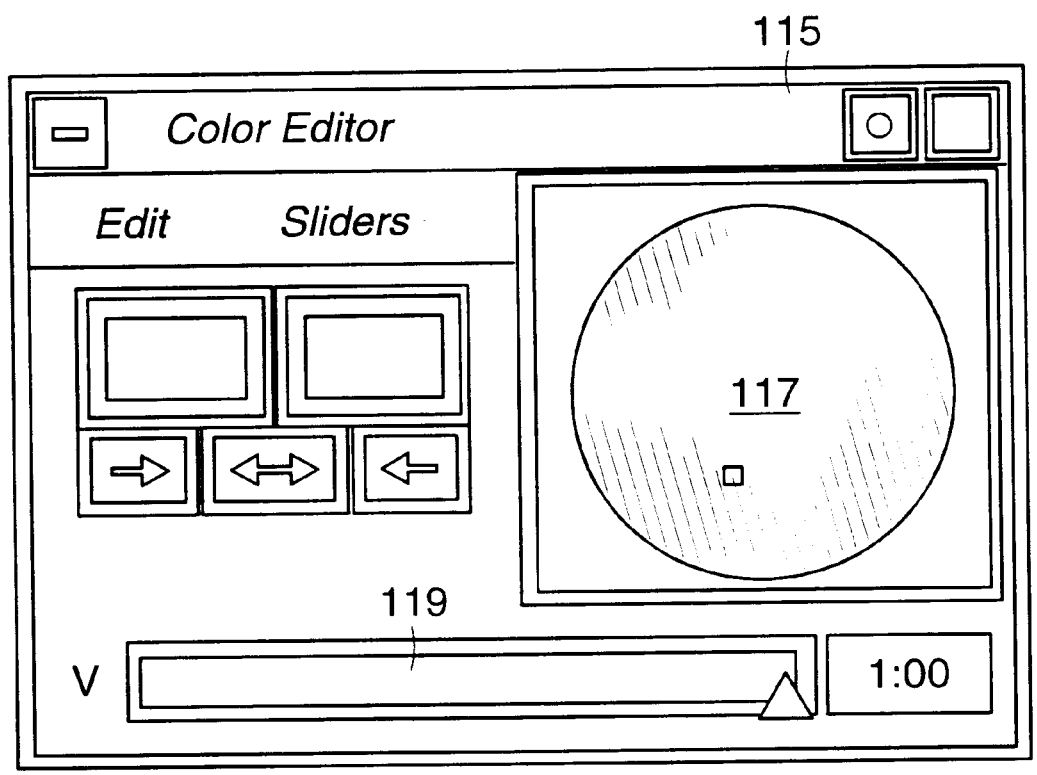
FIG. 11 shows a screen display of the Color Editor window in the LightBox™ application.

The color of an object in a scene may be changed by using the Color Editor window 115 shown in FIG. 11. To do so, the user first selects the object under consideration by clicking on it with the cursor, clicks the cursor at a location within color wheel 117 that corresponds to the desired color, and adjusts the intensity (V) of the selected color with slider 119.

Figure 12A:
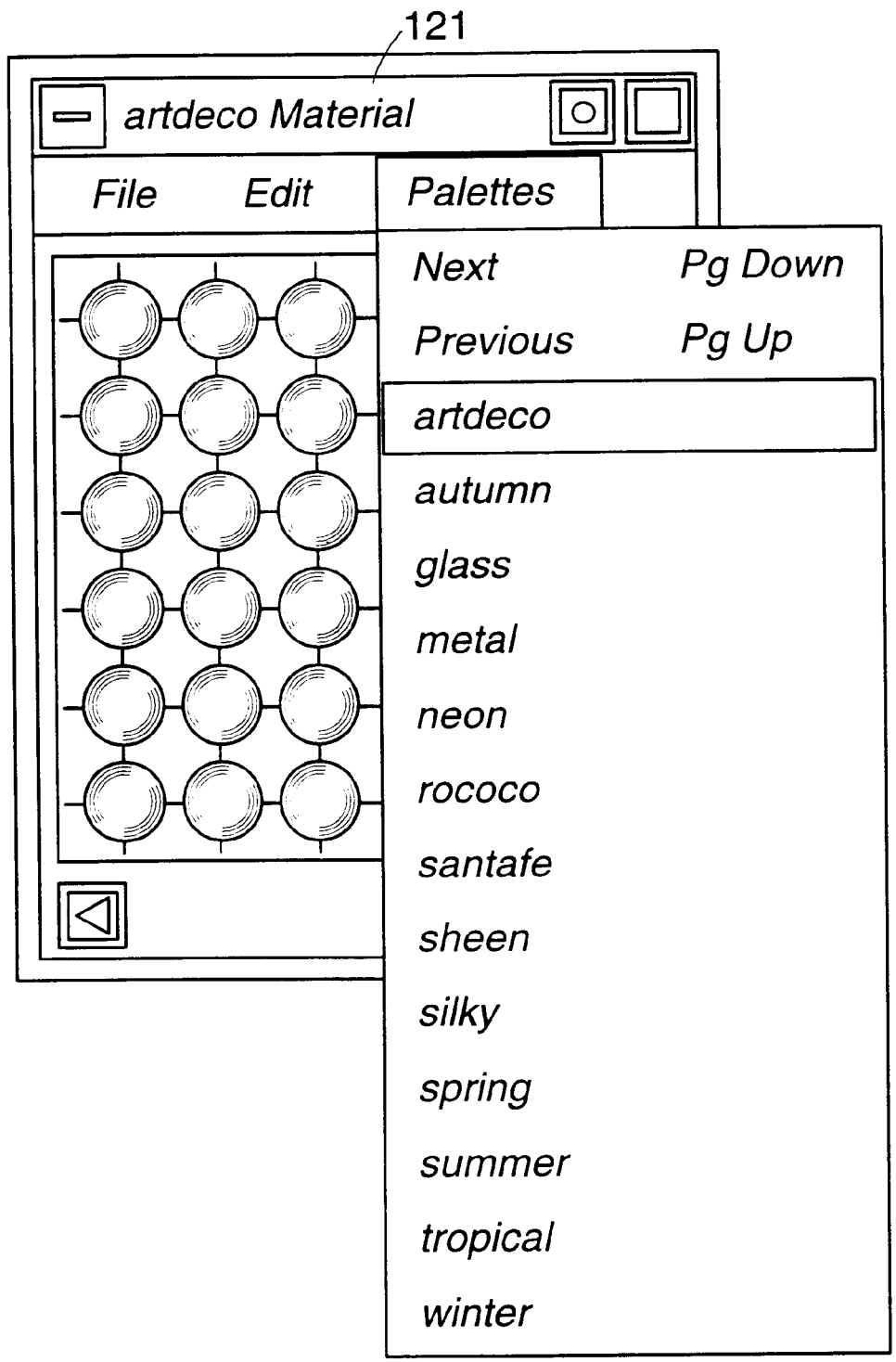
FIG. 12(a) and 12(b) show respective screen displays of the Material Palette window and the Material Editor window in the LightBox™ application.
Figure 12B:
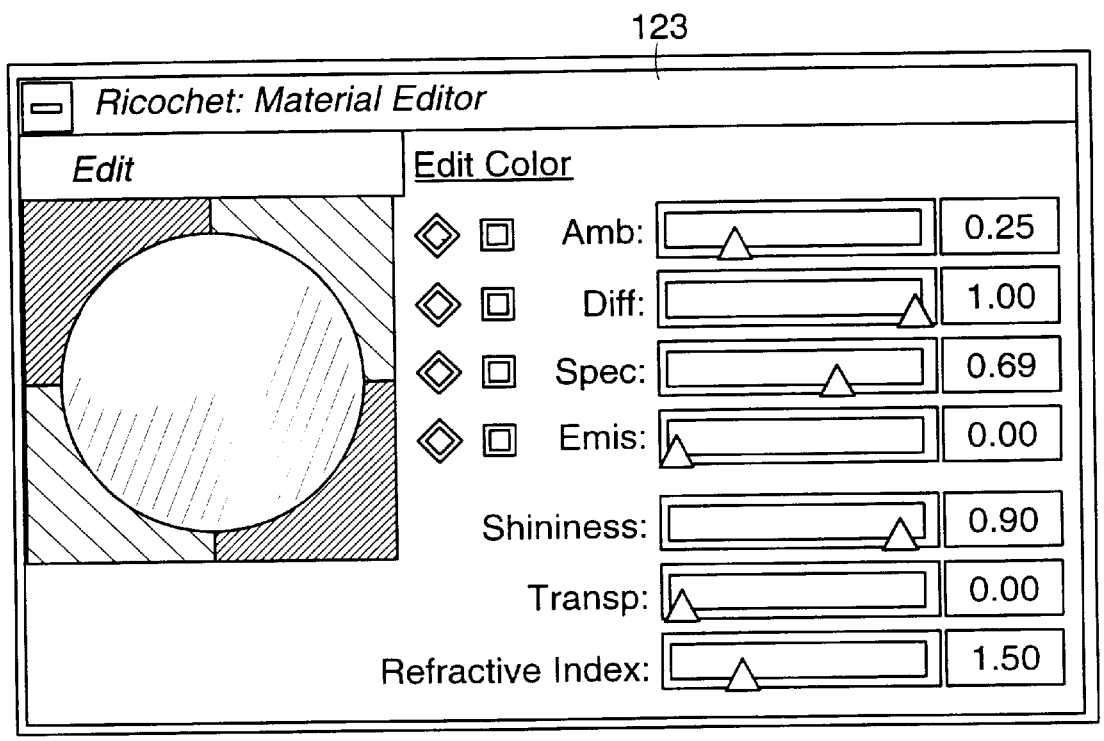
Figure 13:
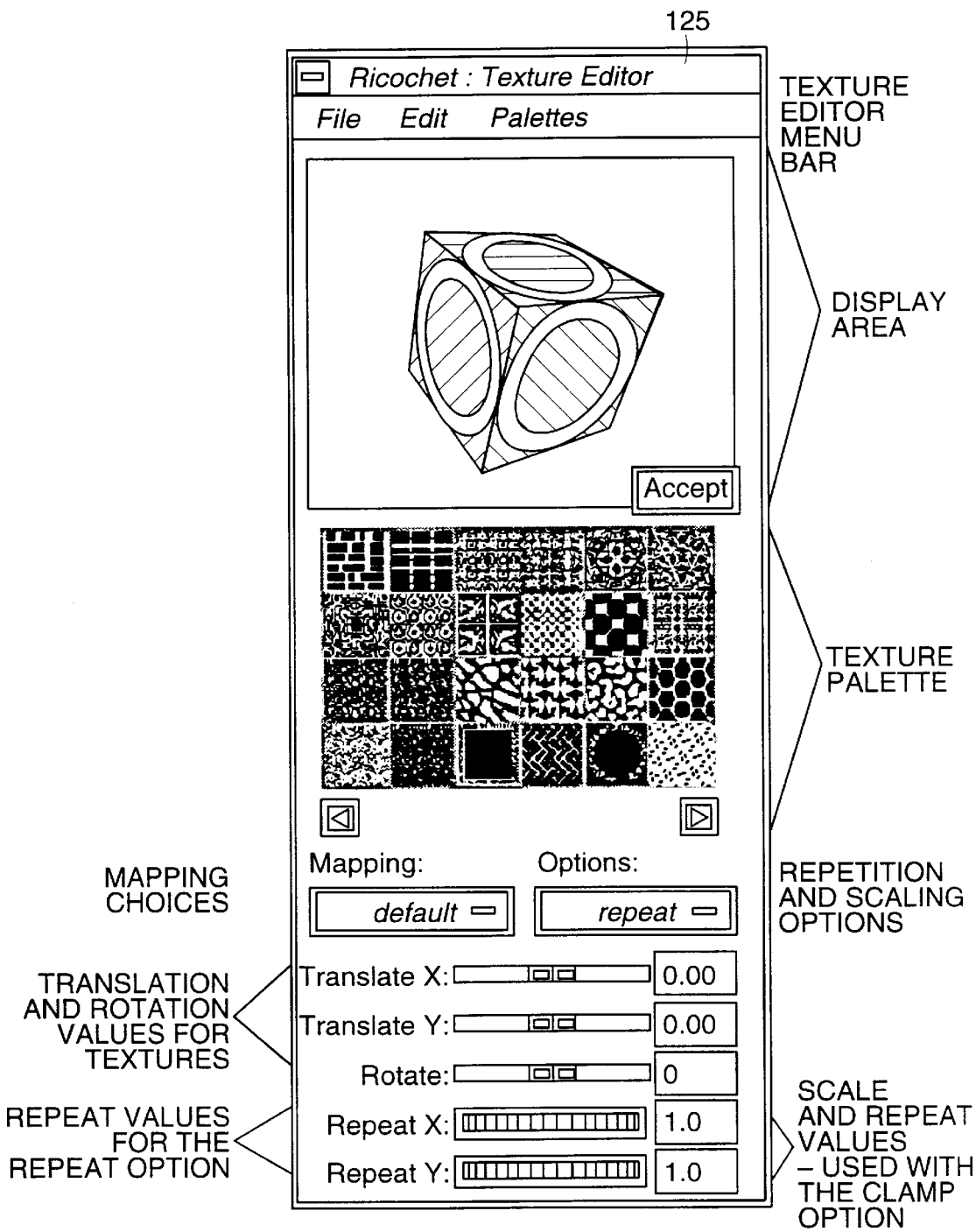
FIG. 13 shows a screen display of the Texture Editor window in the LightBox™ application.

The material from which an object in a scene appears to be made (i.e., the manner in which the chosen material reflects light in the scene) may be selected from among 442 predefined materials (glass, metal, neon, etc.) provided by LightBox™ and shown in the Material Palette window 121 (FIG. 12(a)), which shows one of the 13 palettes provided by LightBox™. Each palette defines 34 materials, plus two default materials, from which the user may select. Alternatively, a user may define a custom material with the Material Editor window 123 (FIG. 12(b)) by specifying values that define how light is reflected by the material. For example, the Material Editor window 123 allows the user to specify values relating to ambient light, diffuse light, specular light, emissive light, shininess, transparency, and the refractive index of the material. Similarly, a user may apply a texture to an object within a scene by using the Texture Editor window 125 shown in FIG. 13.

LightBox™ provides the user with various other options that affect how the 3D scene appears. The user may set the home viewpoint (i.e., the default view that will be displayed upon opening a saved scene file) by manipulating the Dolly, Rotx, Roty thumbwheels 57, 61, 63 until the desired view is obtained and then selecting the "set home" button from among the Examiner Viewer Tools (FIG. 5). The user also may select different lens types (wide-angle, normal, telephoto), zoom levels, resolutions, and transparency settings to change the appearance of the scene. Appendix A describes these features in detail.

LightBox™ provides several "draw commands" in the menu bar 73 which allow the user to specify how the scene's imported 3D objects or its stage, or both, are displayed on the computer screen while the user is building the scene. For example, rather the displaying a scene with its full complement of visual features, the user may selectively display the imported objects or the stage in a scene in wire-frame form, as a series of dots, with no texture, or not at all (i.e., invisible) to minimize screen clutter and the time it takes for the computer to refresh the screen.

FIGS. 8(a) through 8(l) show the 12 predefined stages provided by LightBox™. The stage in FIG. 8(a), named "Simple," includes a cubical drop zone 800 that has an "X and O" reference pattern 802 at its base and which is positioned on a floor 806 with a wall 808 in the background. The Simple stage includes a spot light whose parameters are set to create a soft glow on an object 810 (not part of Simple stage) that has been imported into the stage and which remains positioned within the drop zone 800. The light fades off relatively quickly as the distance from the center of the drop zone increases, thereby drawing a viewer's attention to the center of the drop zone. The home viewpoint (i.e., the default camera view) of the Simple stage is set such that the viewer has a top side view of an object positioned within the drop zone.

Figure 8A:
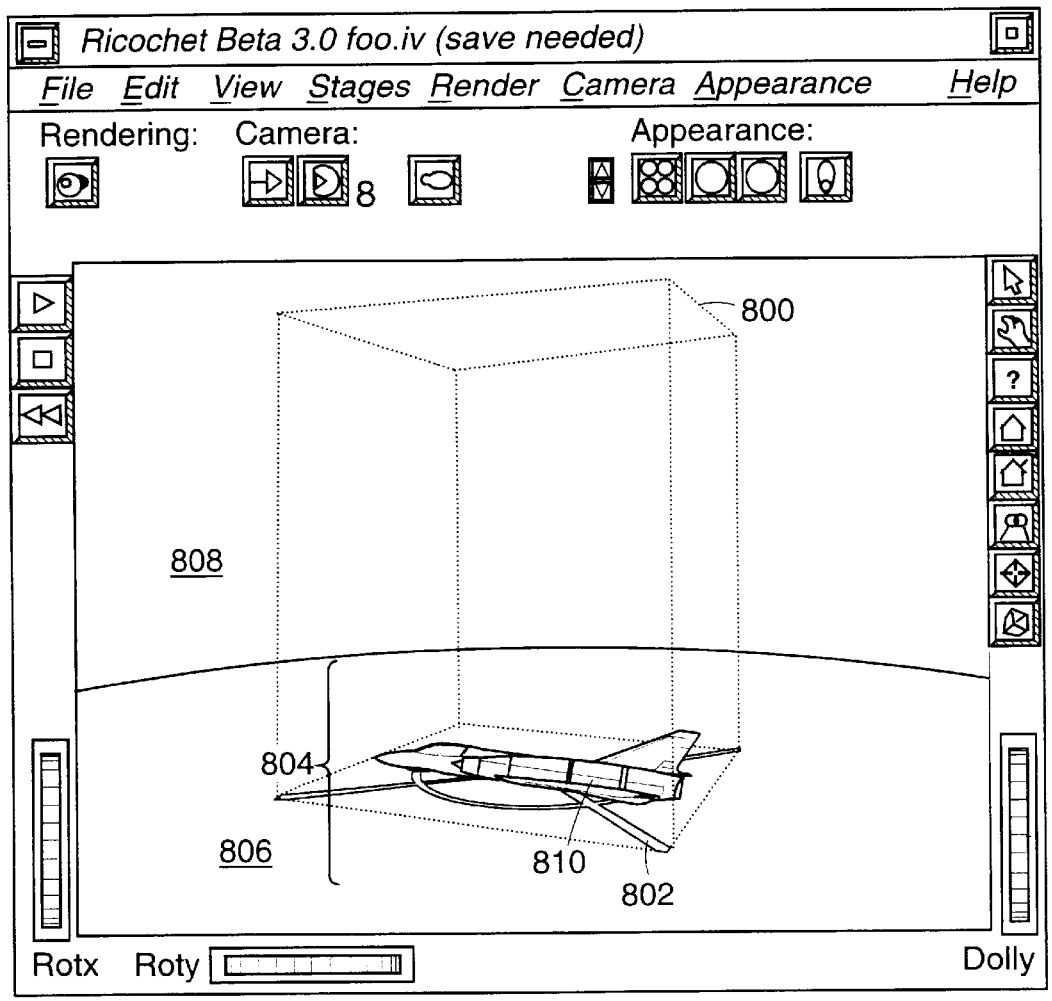
Figure 8B:
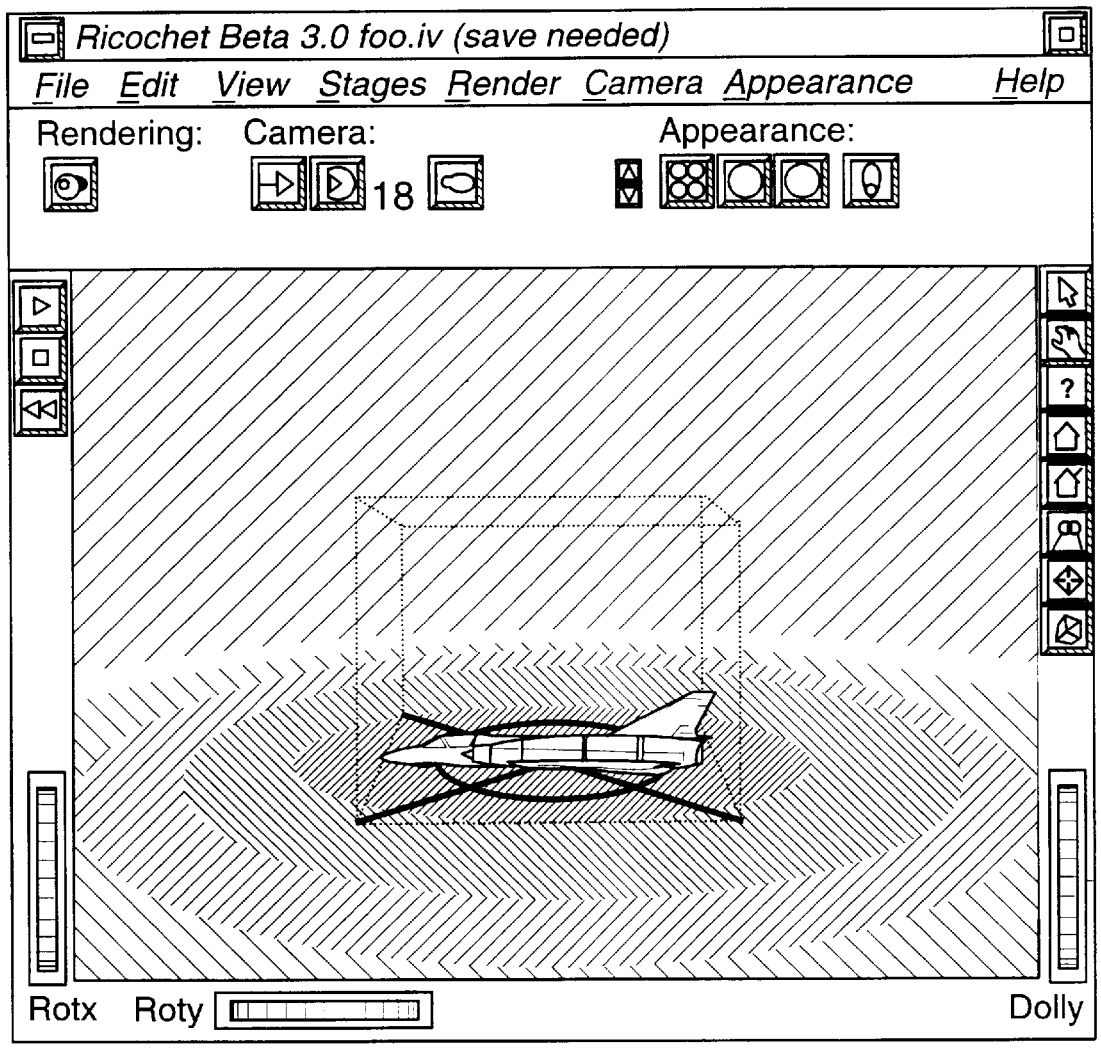

The "New Simple" stage shown in FIG. 8(b) is similar to the Simple stage except that it has modified lighting characteristics to create a slightly different effect. Although not apparent from the figures, each of the predefined stages may use different colors for lights and objects to create the desired atmosphere. For example, the Simple stage uses a green light to illuminate the drop zone whereas the New Simple stage uses a white light for that purpose.

Figure 8C:
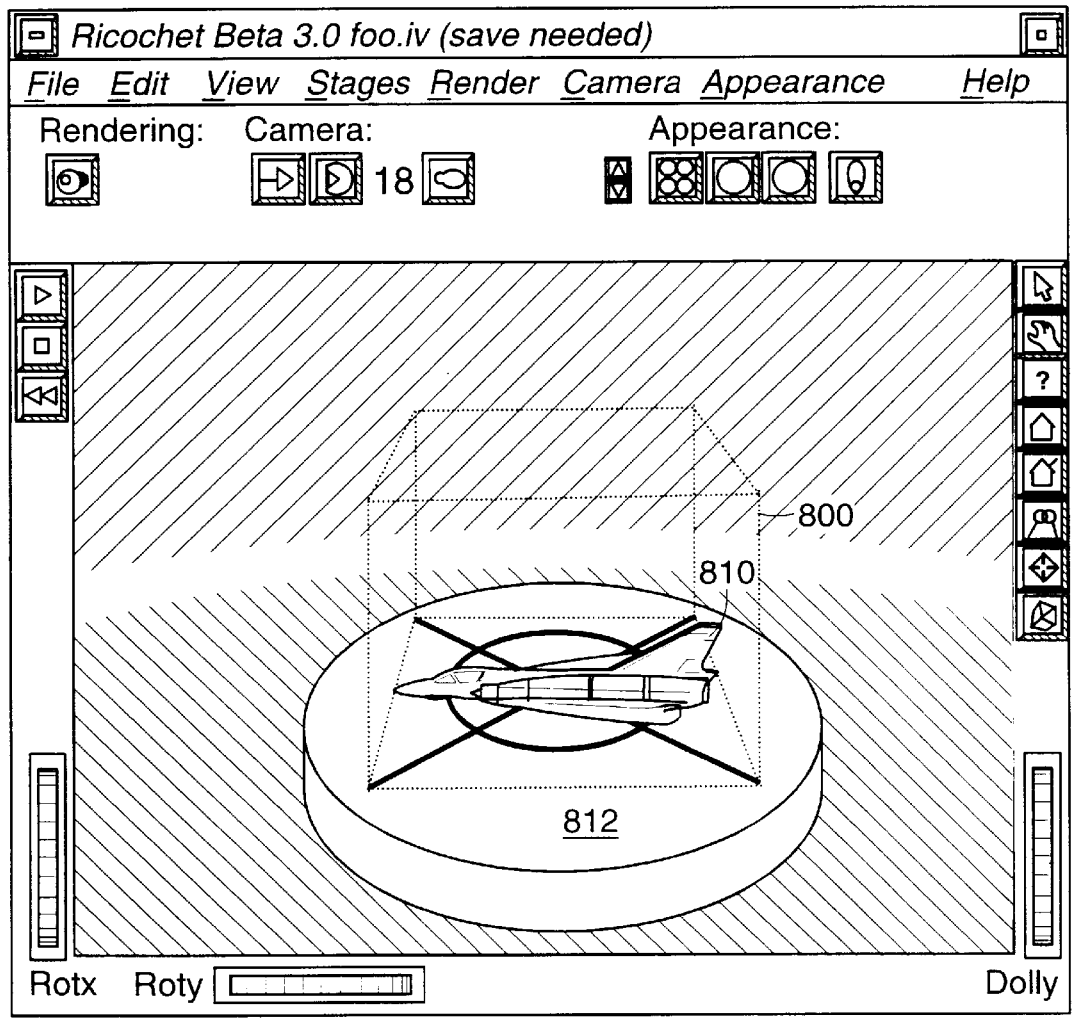
Figure 8D:
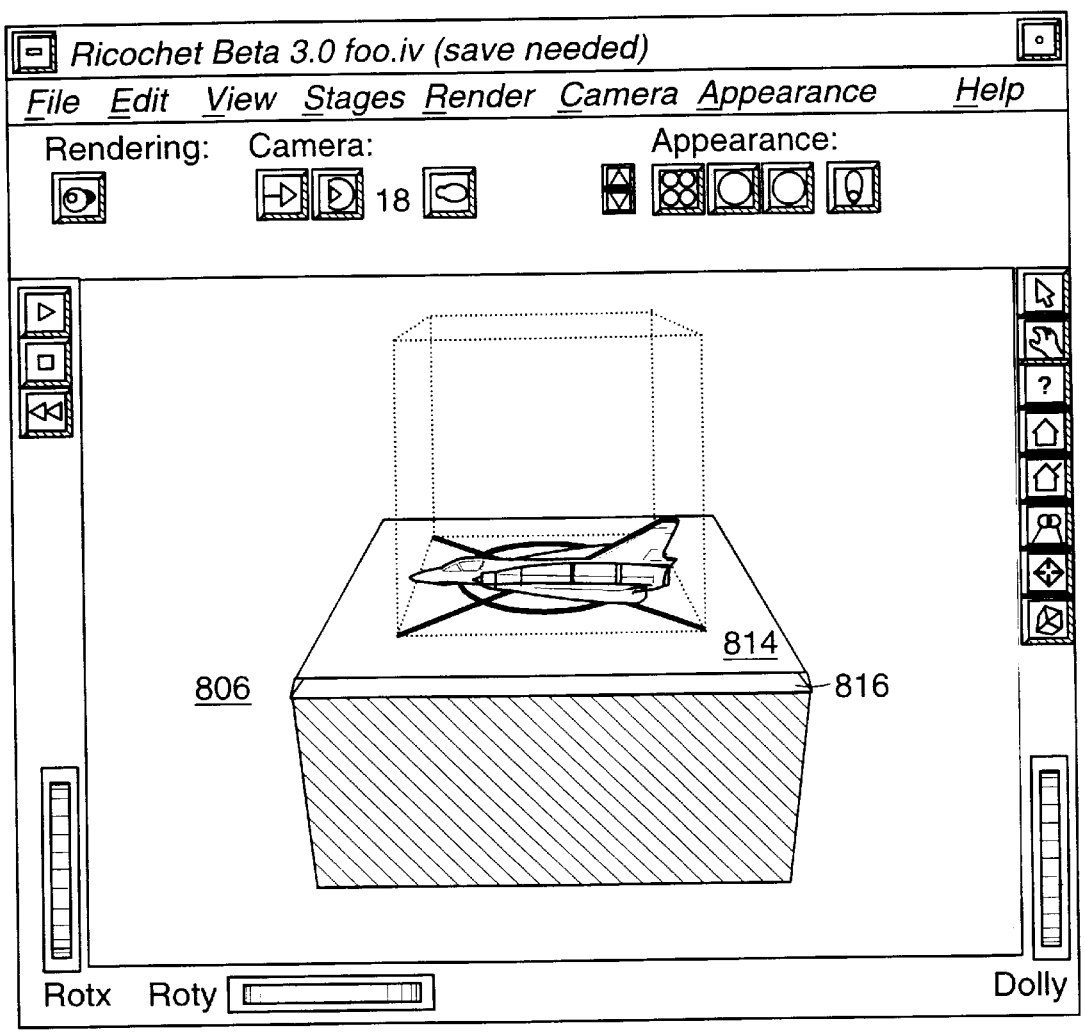

As its name suggests, the "Simple Pedestal" stage (FIG. 8(c)) is substantially similar to the Simple stage except that it adds a red, cylindrical pedestal underneath the drop zone 800 on which imported object 810 rests. The "New Simple Pedestal" stage in FIG. 8(d) differs from the Simple Pedestal stage in that the "new" version includes a tall, metallic green pedestal 814 having beveled edges 816 along its top surface. The New Simple Pedestal stage resents the drop zone in a side angle view by default, and directional lighting is used to illuminate the entire scene uniformly. In addition, a green granite texture is applied to the floor 806. .

Figure 8E:
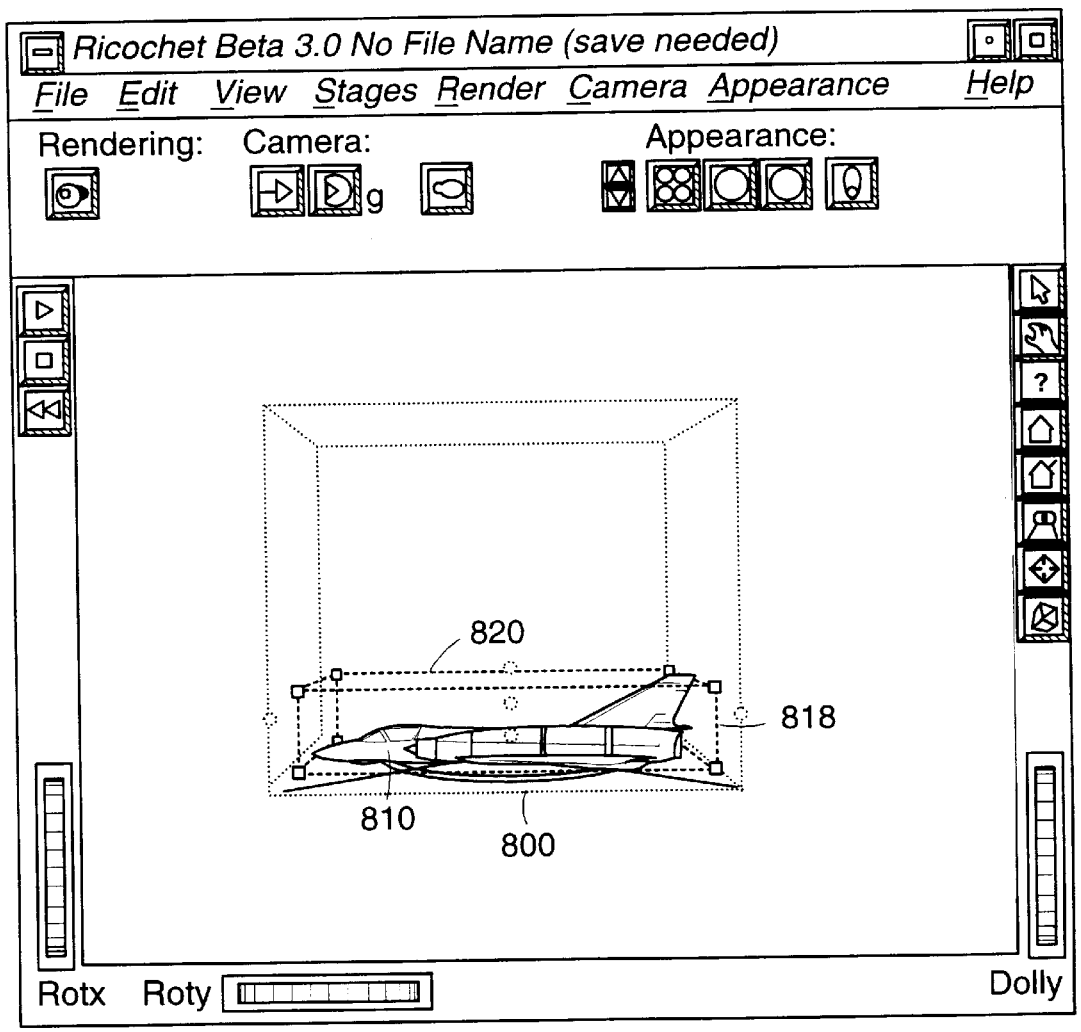
Figure 8F:
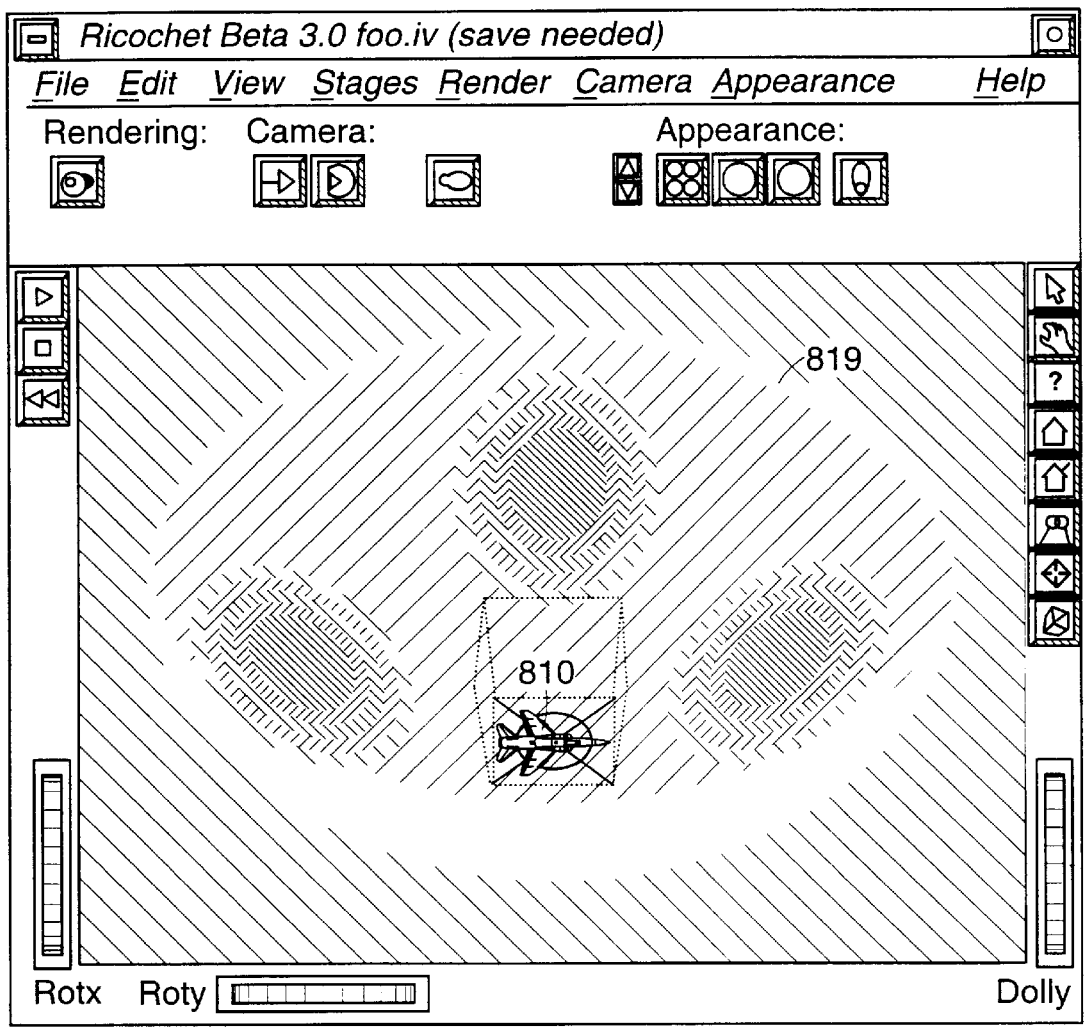

FIGS. 8(e) and 8(f) show the "Bowl" and "New Bowl" stages respectively, in which the imported object 810 is placed at the bottom of a large bowl 819 as shown in FIG. 8(f). The Bowl stage in FIG. 8(e) uses a point light directly above and focused on the drop zone 800 to illuminate the imported object 810 whereas the New Bowl stage (FIG. 8(f)) illuminates object 810 indirectly with four spot lights of different colors aimed at the sides of the bowl. In FIG. 8(e), object 810 is surrounded by a manipulator box 820 that has knobs at its apexes so the user may readily manipulate (translate, rotate, scale) the imported object. The manipulator box 820, which is available to the user regardless of the particular stage or scene being viewed, is not part of the stage but rather appears when the user "selects" an object by clicking on it with the mouse. Any object in the scene, including the graphic elements that make up the stage, may be selected and manipulated in this manner.

Figure 8G:
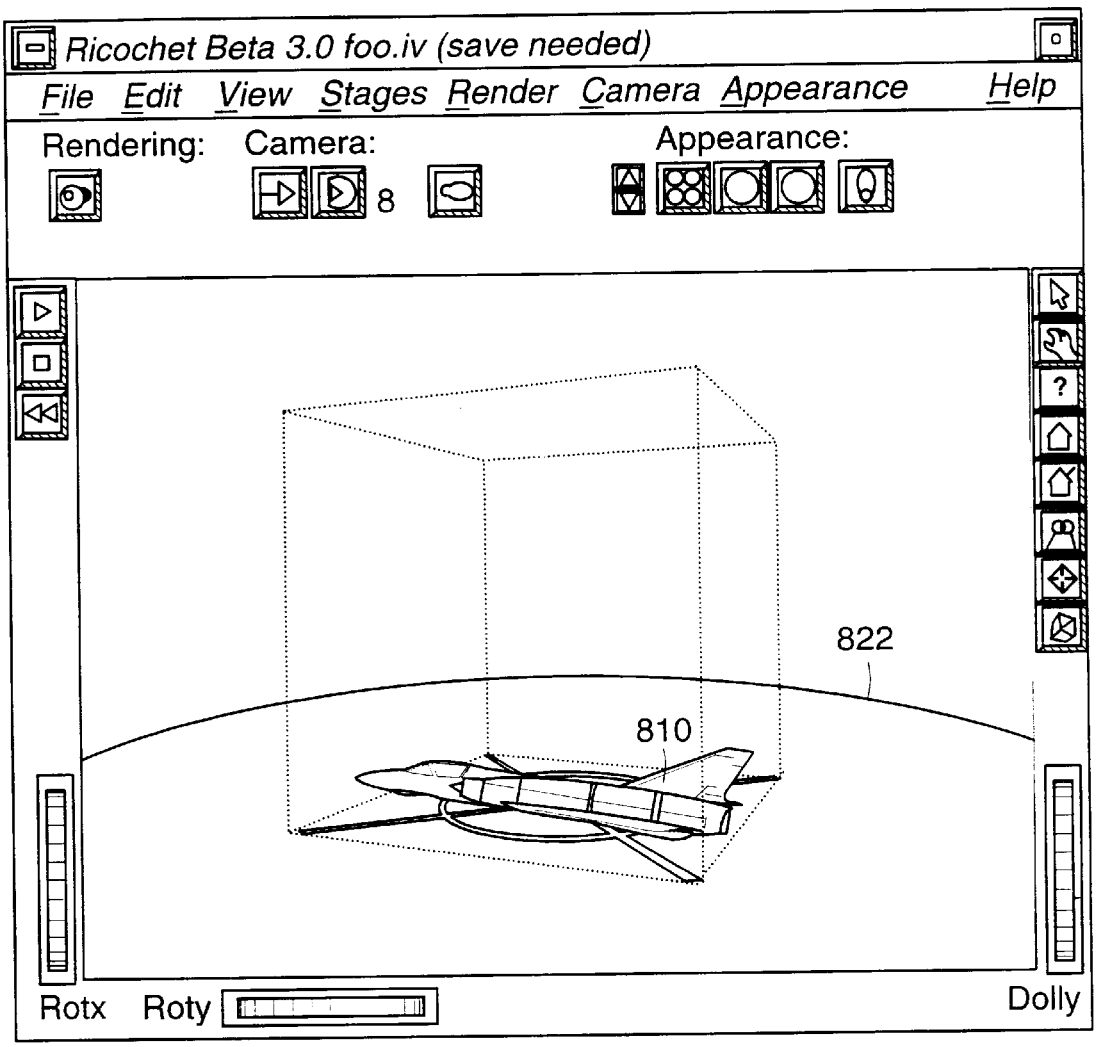

The "Dome" stage shown in FIG. 8(g) is similar to the Bowl stage in FIG. 8(e) in that it presents the drop zone in a side angle view and uses a spot light directly above the drop zone for illumination. The Dome stage, however, is dome shaped rather than bowl shaped. The dividing line 822 between the dome and the floor appears slightly curved thus giving a viewer the sense that the object 810 (an X-29 aircraft) is sitting on the floor of a large hangar that has a domed roof.

Figure 8H:
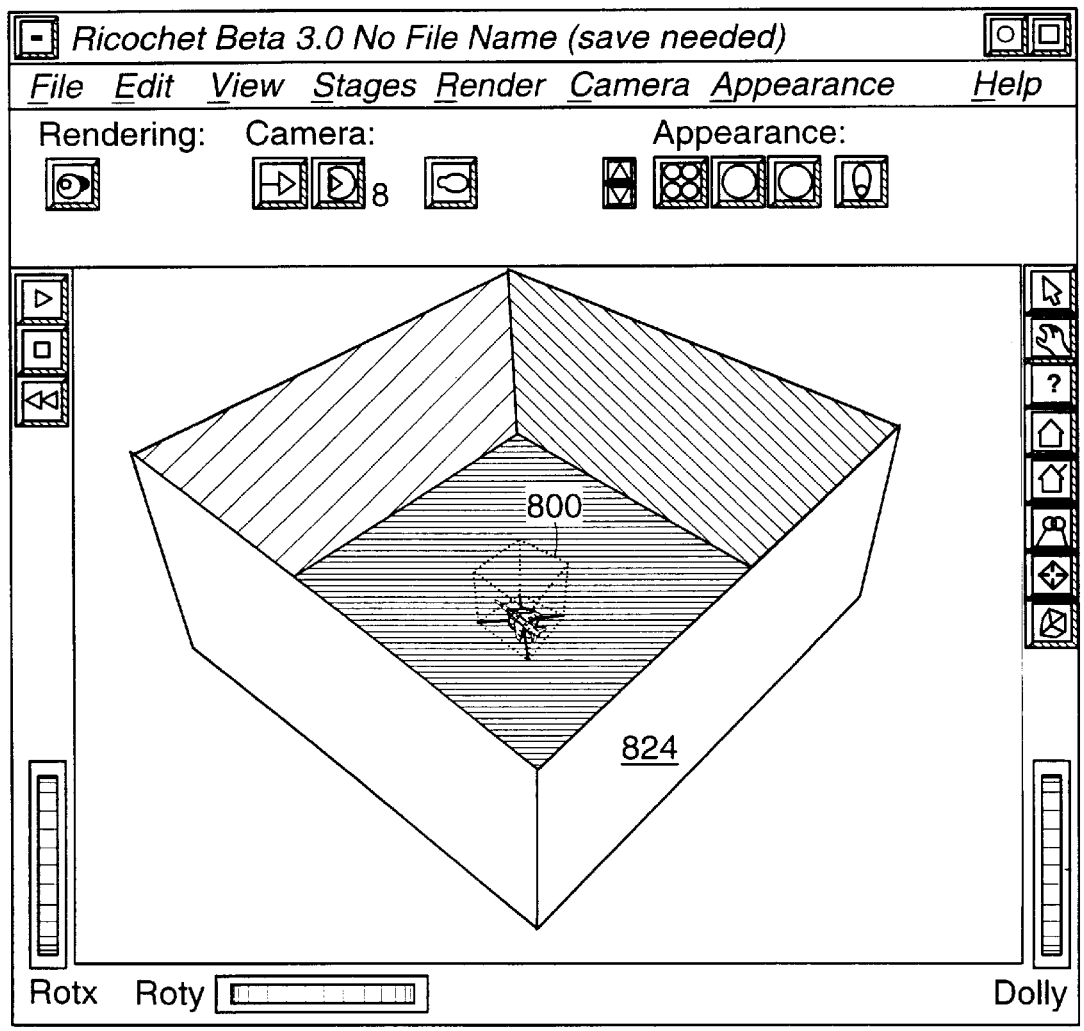

The "New Plainfloor" stage in FIG. 8(h) places the drop zone 800 within a large open room or box 824. The viewpoint shown in FIG. 8(h) is at a position above and a relatively far distance from the drop zone 800. The default viewpoint (not shown) is at a point inside of the box closer to the drop zone. Directional lighting illuminates the interior of box 824 uniformly.

Figure 8I:
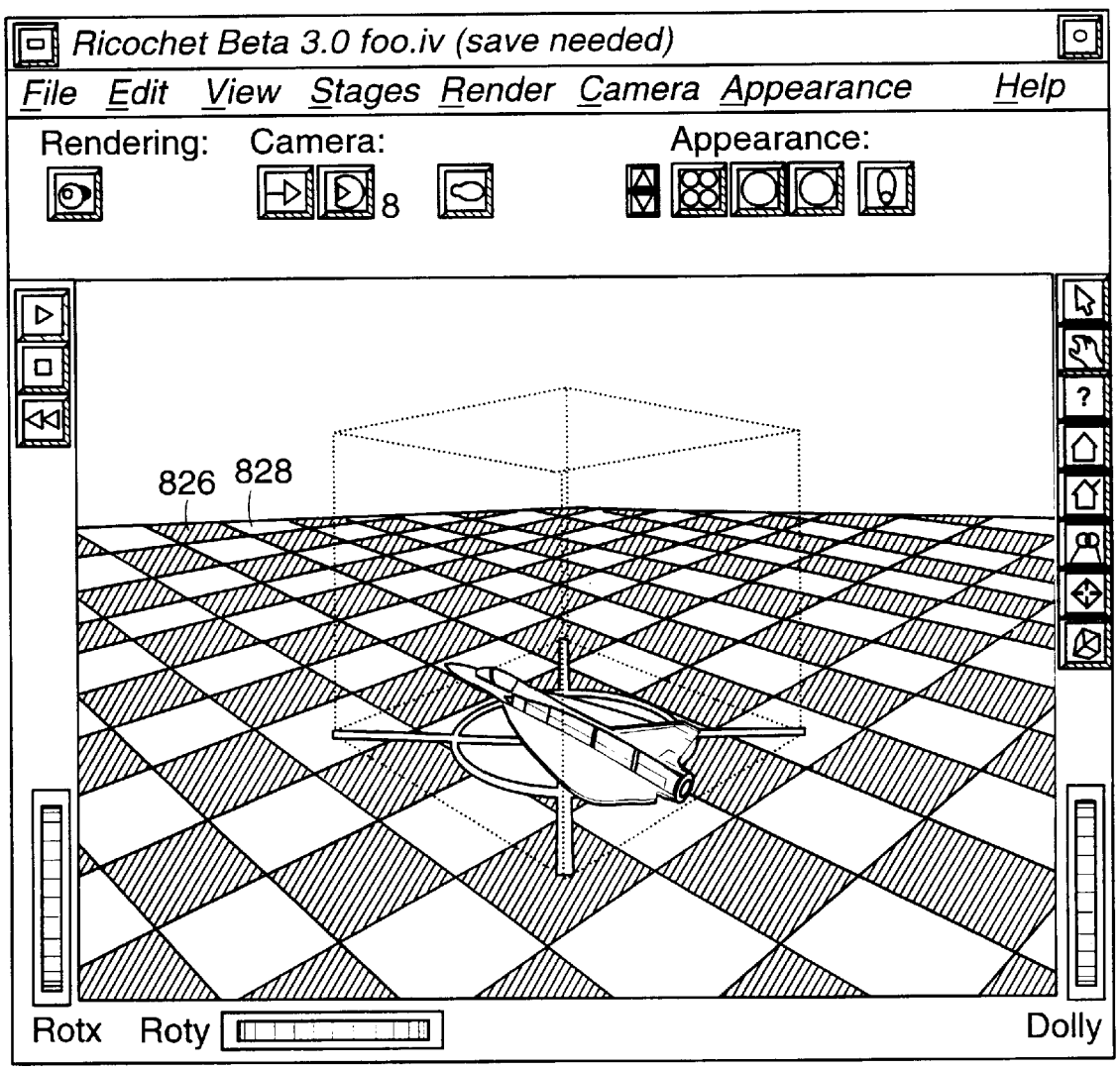
Figure 8J:
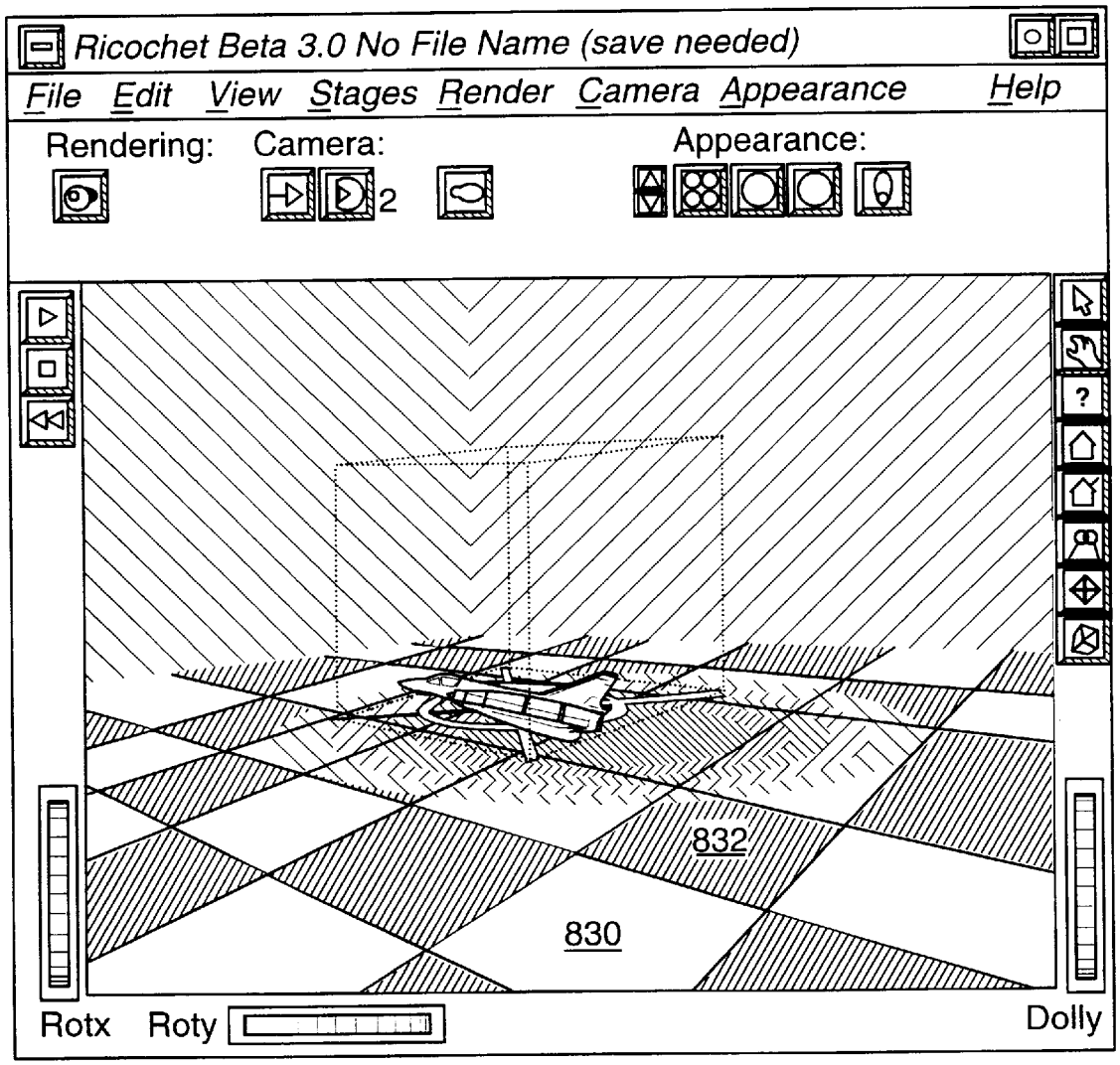

FIGS. 8(i) and 8(j) show two different stages having tiled, checkerboard floors. The "Tile Floor" stage (FIG. 8(i)) uses alternating green tiles 826 and white tiles 828 to give a bolder effect while the "New Tile Floor" stage in FIG. 8(j) uses alternating tiles 830, 832 in slightly different shades of gray to give a more subdued effect. The lighting characteristics of the stages also vary somewhat to alter the atmosphere between the two.

Figure 8K:
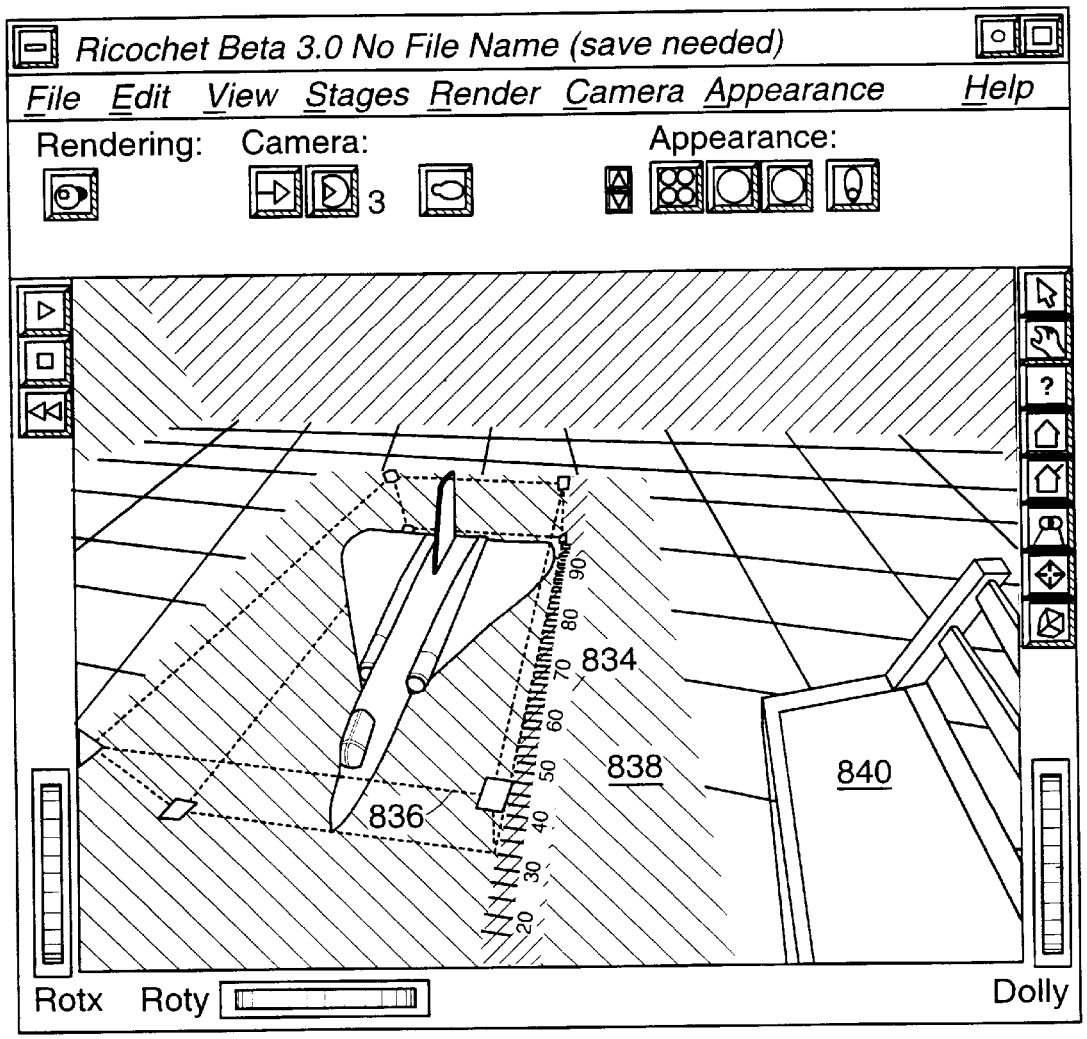
Figure 8I:
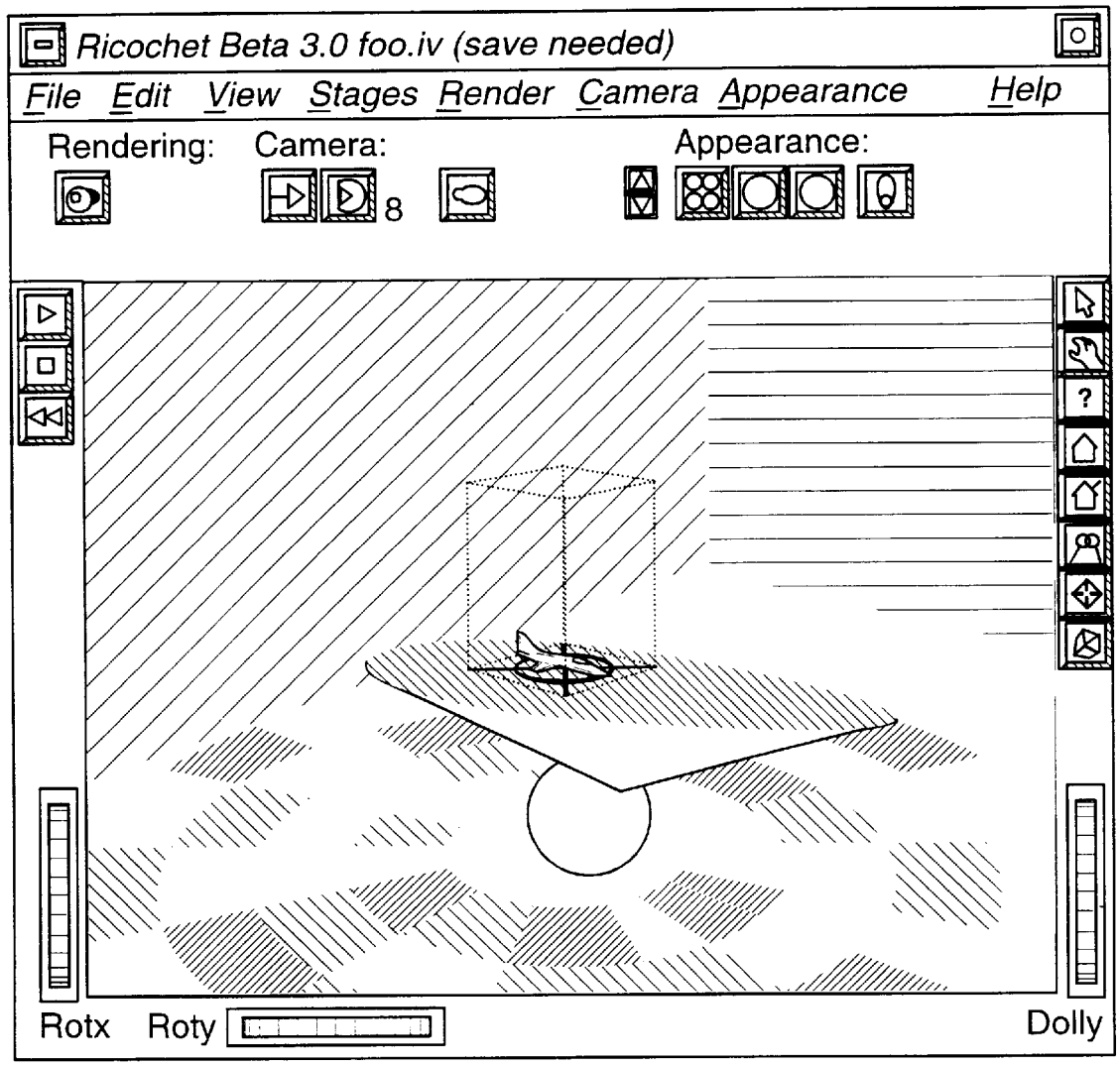

The "New Furniture" stage (FIG. 8(k) and the "Modern Table" stage (FIG. 8(l)) are the most elaborate of the 12 predefined stages. The New Furniture stage includes functional features such as a ruler 834 to allow measurement of the object (shown within manipulator box 836), for example, as it is being resized. The New Furniture stage also includes several objects, such as table 838 and chair 840, that add to the aesthetics of the stage while at the same time providing a frame of reference for qualitatively gauging the size of an imported object. The home viewpoint (not shown) of the New Furniture stage, is at a distance from the drop zone that allows the user to see the table 838 and chair 840 in their entirety.

The Modern Table stage presents an artistic and somewhat whimsical stage in which objects may be placed to build a scene. The varied shapes and colors of the objects used in this stage suggest that it is designed as a template for generating aesthetically pleasing, as opposed to informative or functional, scenes.

Although each predefined stage provided by LightBox™ comes with its own set of default characteristics and graphic objects, these may be changed or set by the user as desired by editing an existing stage or by creating a new stage. In the stage editing mode, the user can add or remove objects from the stage and can change any of the above-described characteristics as desired. In response, LightBox™ redraws the scene in real time to reflect the changes. Similarly, in building a new stage, the user starts with a blank screen and adds objects and/or characteristics as desired. In either case, the user may save the customized stage in a new stage file which can be later invoked to build 3D scenes. The user also may delete unwanted stage files.

Figure 14:
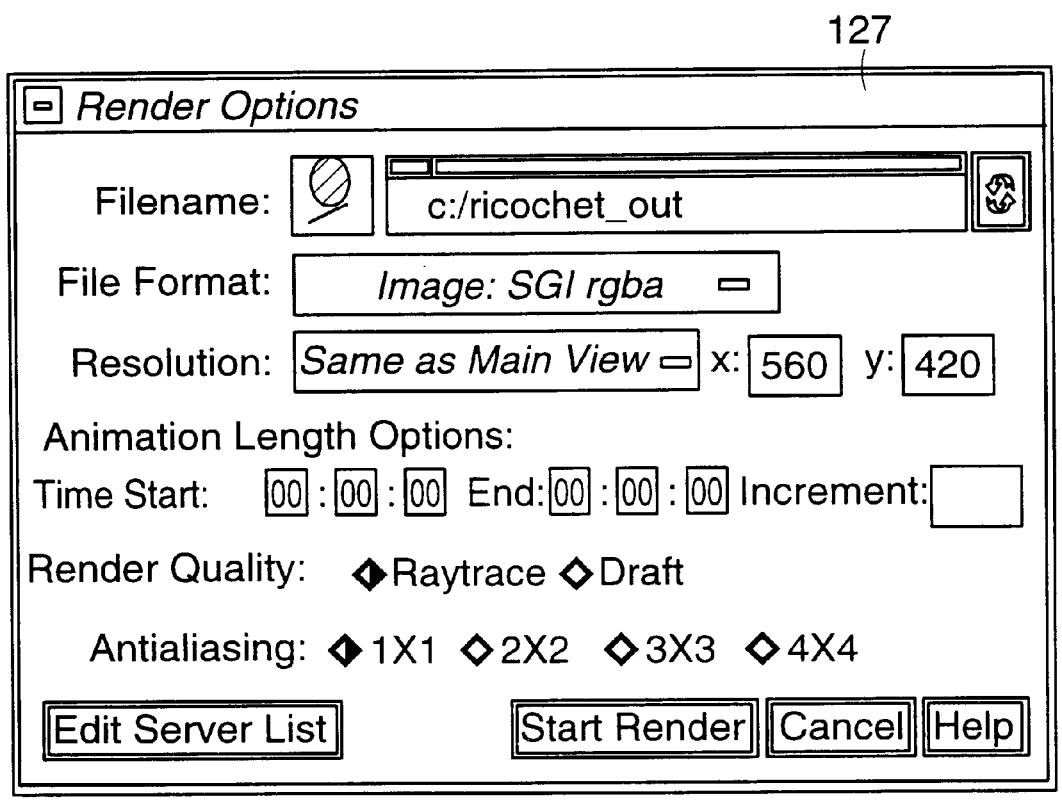
FIG. 14 shows a screen display of the Render Options dialog box in the LightBox™ application.

Once a user has finished creating a 3D scene, it may be output to an image file with the Render Options dialog box 127 (FIG. 14) which allows the user to specify various parameters relating to file format (e.g., JPEG), image resolution, render quality (ray traced or draft) and antialiasing. The Render Options dialog box 127 also allows the user to specify parameters relating to animation length—a feature that has meaning when LightBox™ is being used to generate animated movies as described below.

An animated movie is a series of rendered images of a scene displayed in succession. Typically, each successive scene in a movie represents a relatively minor change from its predecessor to give the viewer the impression of motion, change of state, passage of time or the like. LightBox™ provides several tools that allow a user to create movies easily and quickly with interactive GUI techniques.

Figure 15:
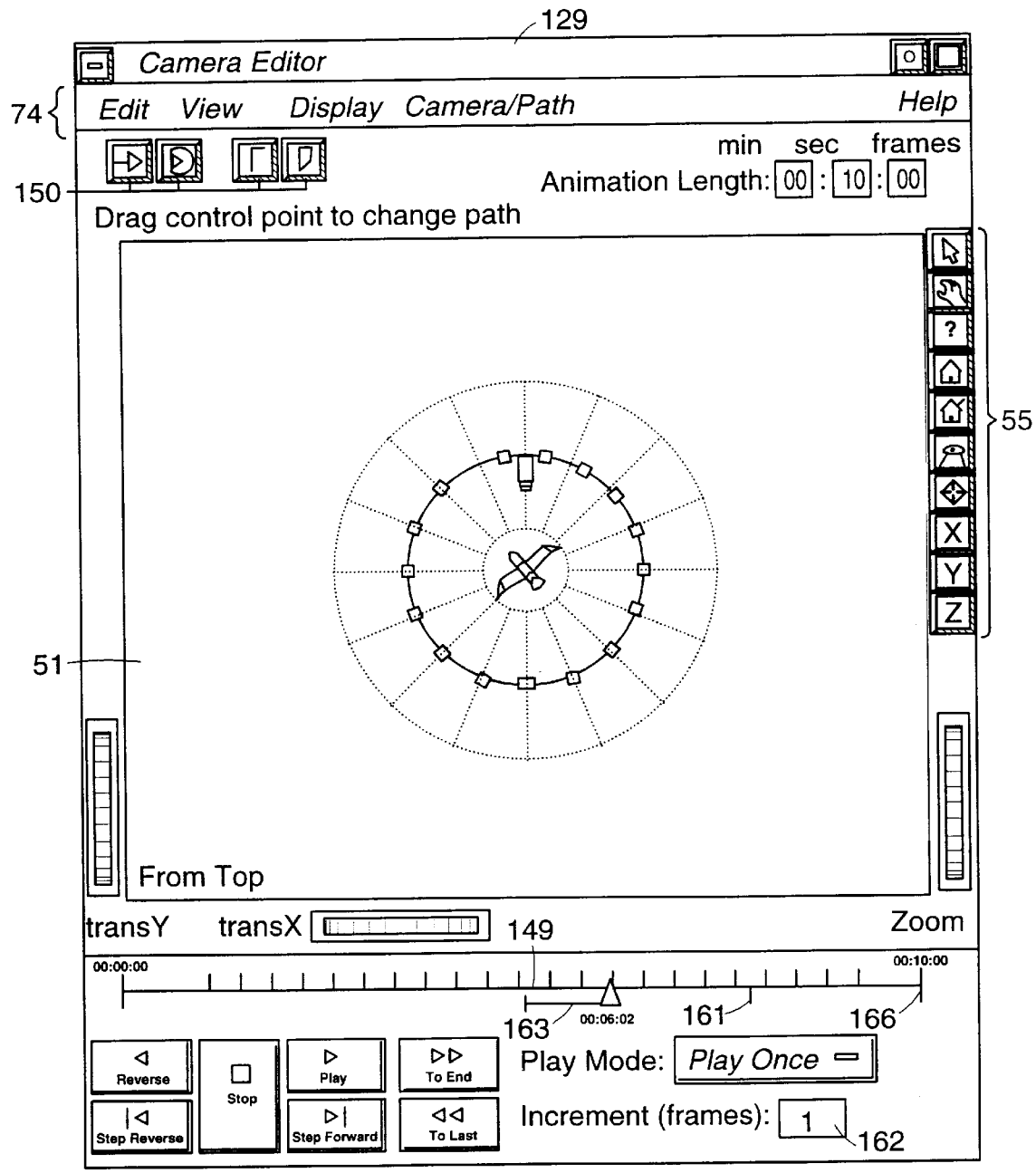
FIG. 15 shows a screen display of the Camera Path Editor window in the LightBox™ application.

One such tool is the Camera Path Editor window 129 shown in FIG. 15. A camera path is a course in 3D virtual space that defines a series of logically connected viewpoints of a scene. An animated movie is the display of the images corresponding to the respective viewpoints one after another in their predefined logical order. Each of the predefined stages provided by LightBox™ has an associated default camera path.

The Camera Path Editor window 129 presents a user with an intuitive, graphical representation of a stage's camera path. The user is able to change the Camera Path Editor's vantage point to view either top or side views of a camera path. Using various widgets (Examiner Viewer Tools 55 and Camera Path Editor Tools 150) and items from menu bar 74 provided by the Camera Path Editor, the user is able to quickly and easily modify a camera path in an interactive manner.

Figure 16A:
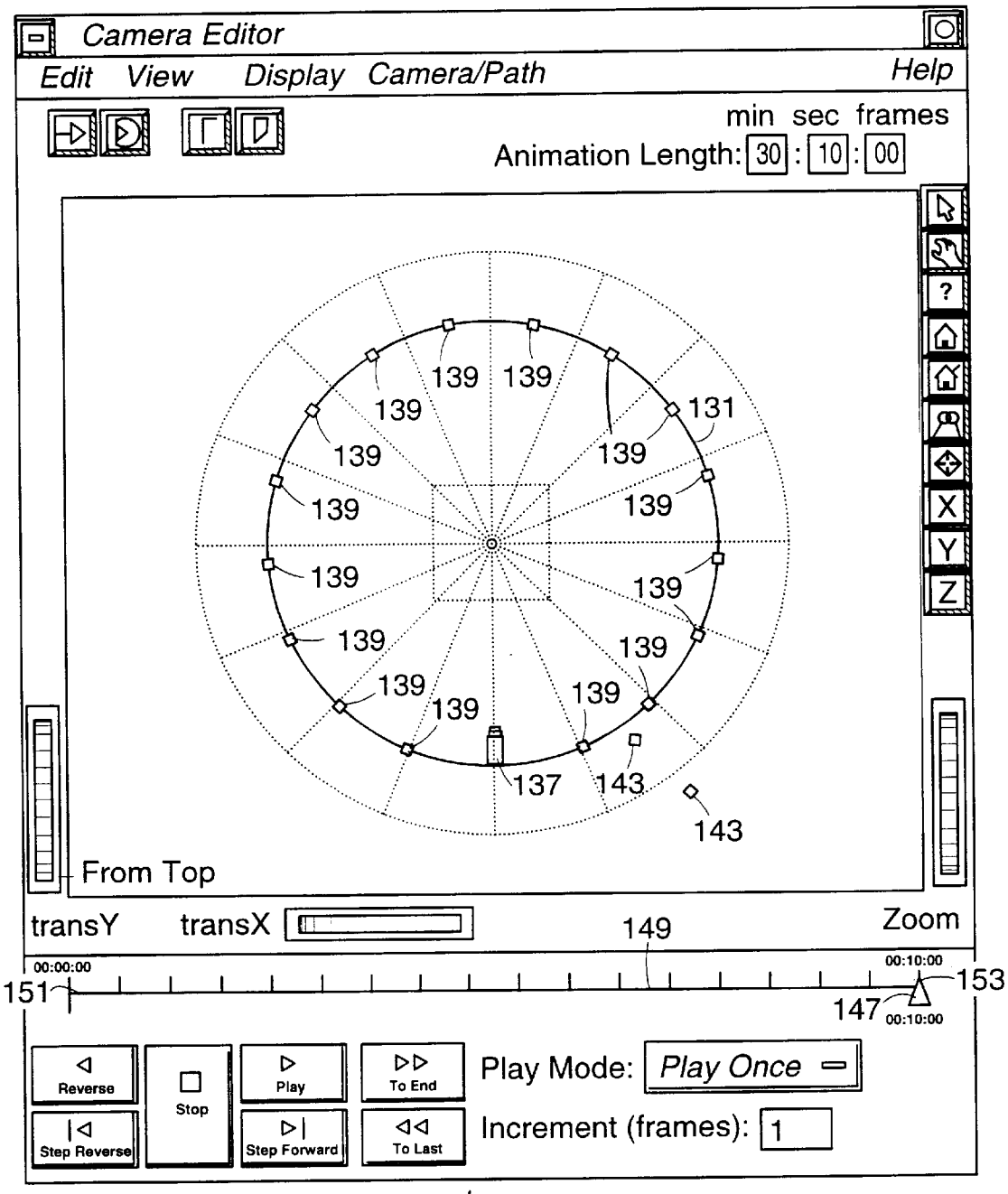
FIGS. 16(a) and 16(b) show screen displays of the Camera Path Editor showing a default camera path from top and right side views, respectively.

A typical default camera path for a stage is shown in FIGS. 16(a) (top view) and 16(b) (right side view). It is a continuous circular path 131, defined by camera points 139, that sits at a uniform height 133 above the floor 135 of the stage. The virtual camera, represented by camera icon 137, travels along the camera path at variable, user-specified speeds and continuously renders new views of the stage (and any objects that may have been imported into the stage). By default, the camera is oriented so that it looks at the center of drop zone 141 at all points along the camera path. As noted above, a stage's lighting and other characteristics are predefined to accentuate the drop zone at which the camera points. As a result, a user need only import a 3D object into the drop zone to generate a high quality movie.

Viewpoints 143, green in color, each represent a single viewpoint that the user has selected in creating a single image of a scene. Because these single viewpoints 143 are not part of the camera path 131, the views represented by points 143 will not appear in any movie made using the camera path 131 of FIGS. 16(a) and 16(b). Rather, viewpoints 143 typically will be rendered as single still images for display by the user apart from any movie associated with the same scene.

To play the movie, the user manipulates controls 145 as desired. If the user presses the "play" key, the camera begins to travel along its specified path—a circle in the case of FIGS. 16(a) and (b). As it does so, an arrow 147 moves along a scrub bar 149 in a manner representative of the camera's movement along the camera path. More particularly, the arrow 147 moves in proportion with the time elapsed as the camera moves along its path. For example, in FIGS. 16(a) and (b), the camera path 131 contains 17 unique camera points 139. Each of these camera points is represented by a corresponding one of the 18 blue tick marks above the scrub bar 149, with the leftmost and rightmost tick marks, 151 and 153, respectively, representing the same camera point—namely, the camera point at which the camera icon appears in FIGS. 16(a) and (b). When the user presses play, the arrow 147 moves from its location at tick mark 151 to tick mark 153 with the same timing that camera icon 137 moves to an adjacent camera point 139. As the camera sweeps along the camera path, new views of the scene are rendered in real time in the display region of the main window 51 shown in FIG. 5.

The number of views that are rendered along the camera path typically is considerably greater than the number of camera points in the camera path. The camera points serve as "control points" that define the shape of the camera path. View are rendered all along the path depending on the speed of the camera motion and the desired number of frames per second as specified by the user. The "Increment (frames)" field 162 of the Camera Path Editor window (FIG. 15) allows the user to specify how many frames to skip when stepping along the camera path using the "Step Forward" and "Step Reverse" buttons.

Figure 17A:
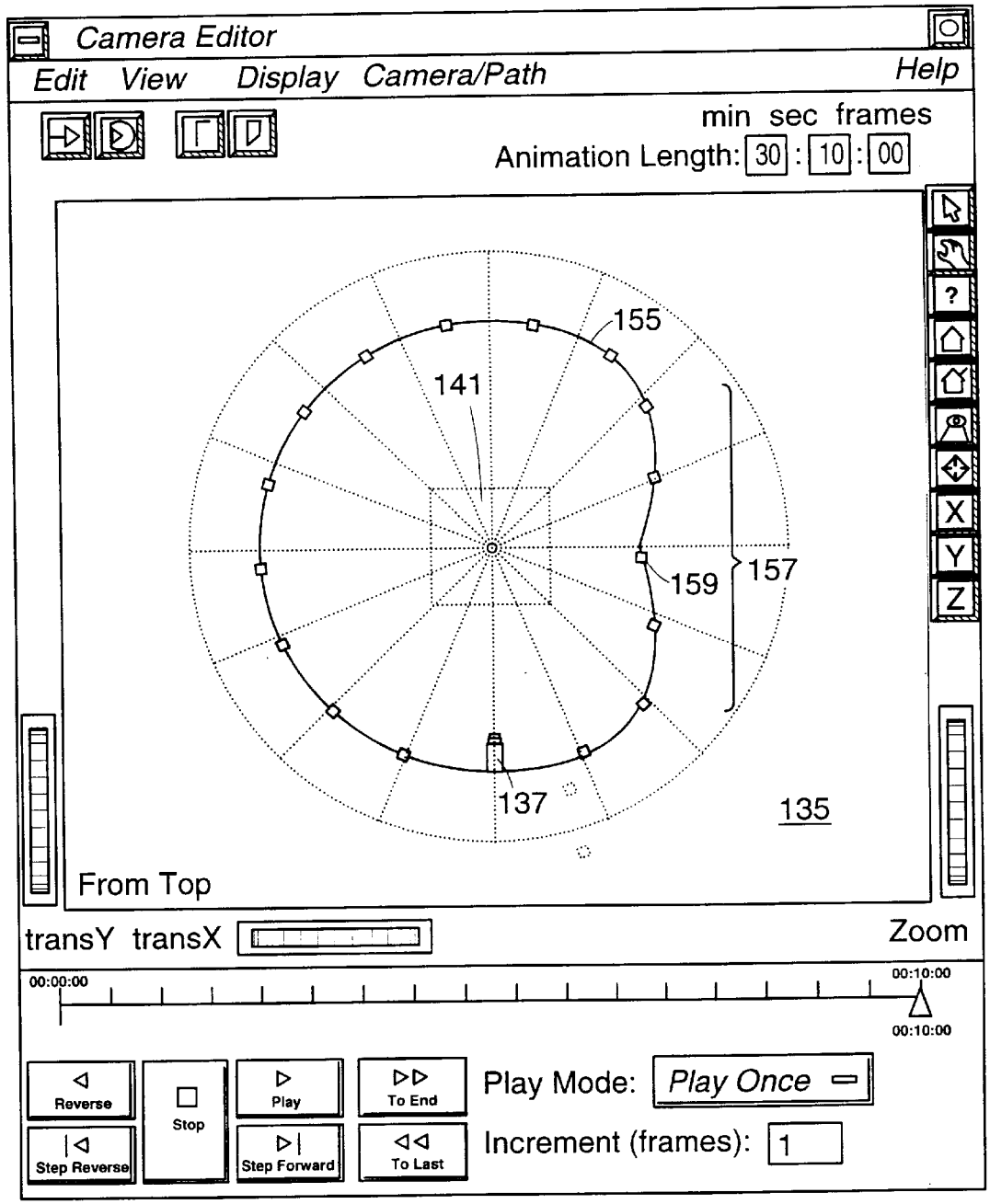
FIGS. 17(a) and 17(b) show screen displays of the Camera Path Editor showing top and right side views, respectively, of a camera path that has been modified by a user.
Figure 17B:
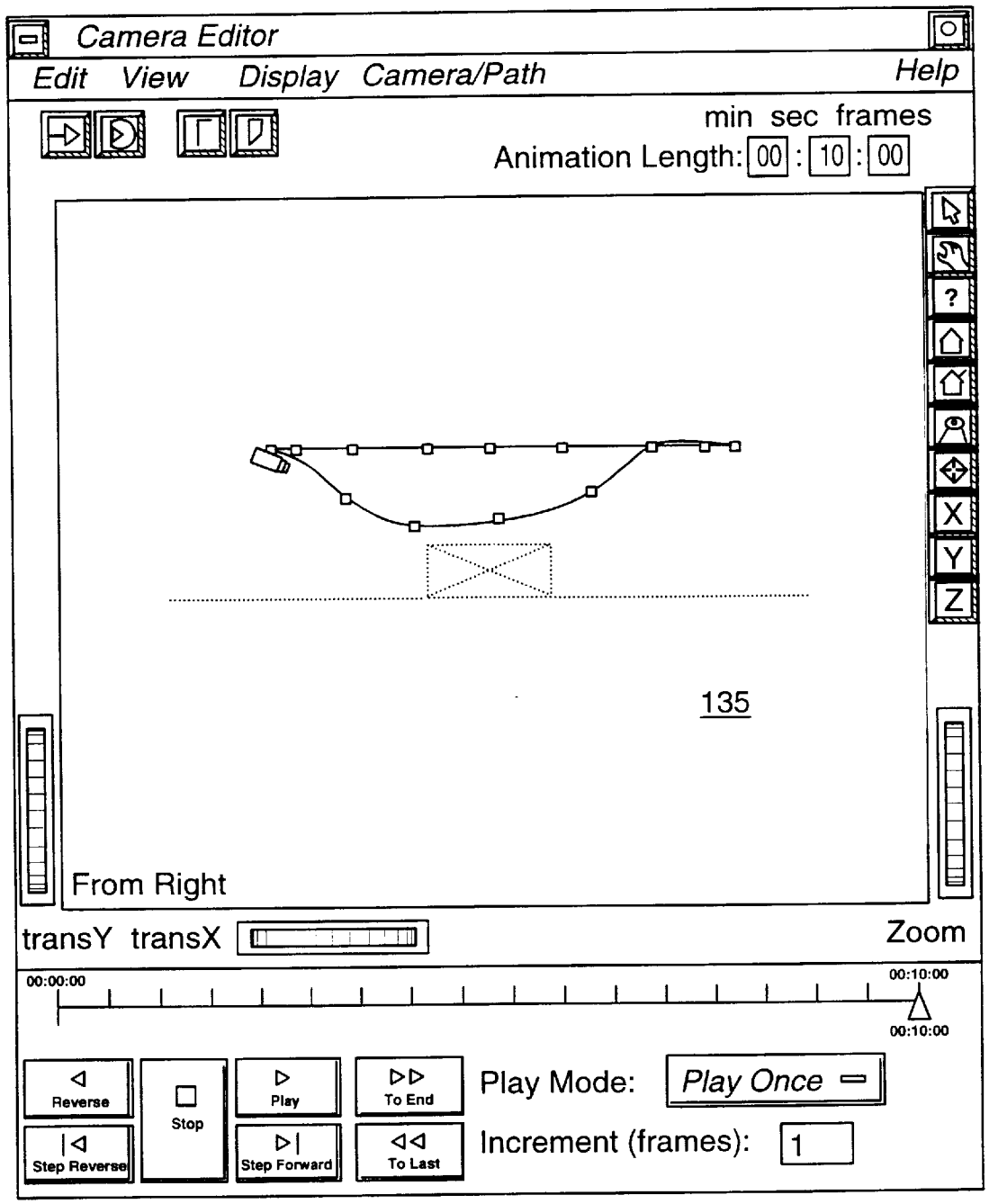

The user is free to alter any of the parameters associated with the camera path to create a custom camera s path and thereby alter the appearance of the movie. In FIGS. 17(a) (top view) and 17(b) (right side view), for example, the user has altered (using standard point-and-click cursor manipulation techniques, for example) the camera path 131 by moving camera points 139 in toward the center (FIG. 17(a)) and down towards the floor 135 (FIG. 17(b)) along the right side of the path. As a result, a new camera path 155, which is no longer circular nor at a constant height above floor 135, is generated.

Figure 16B:
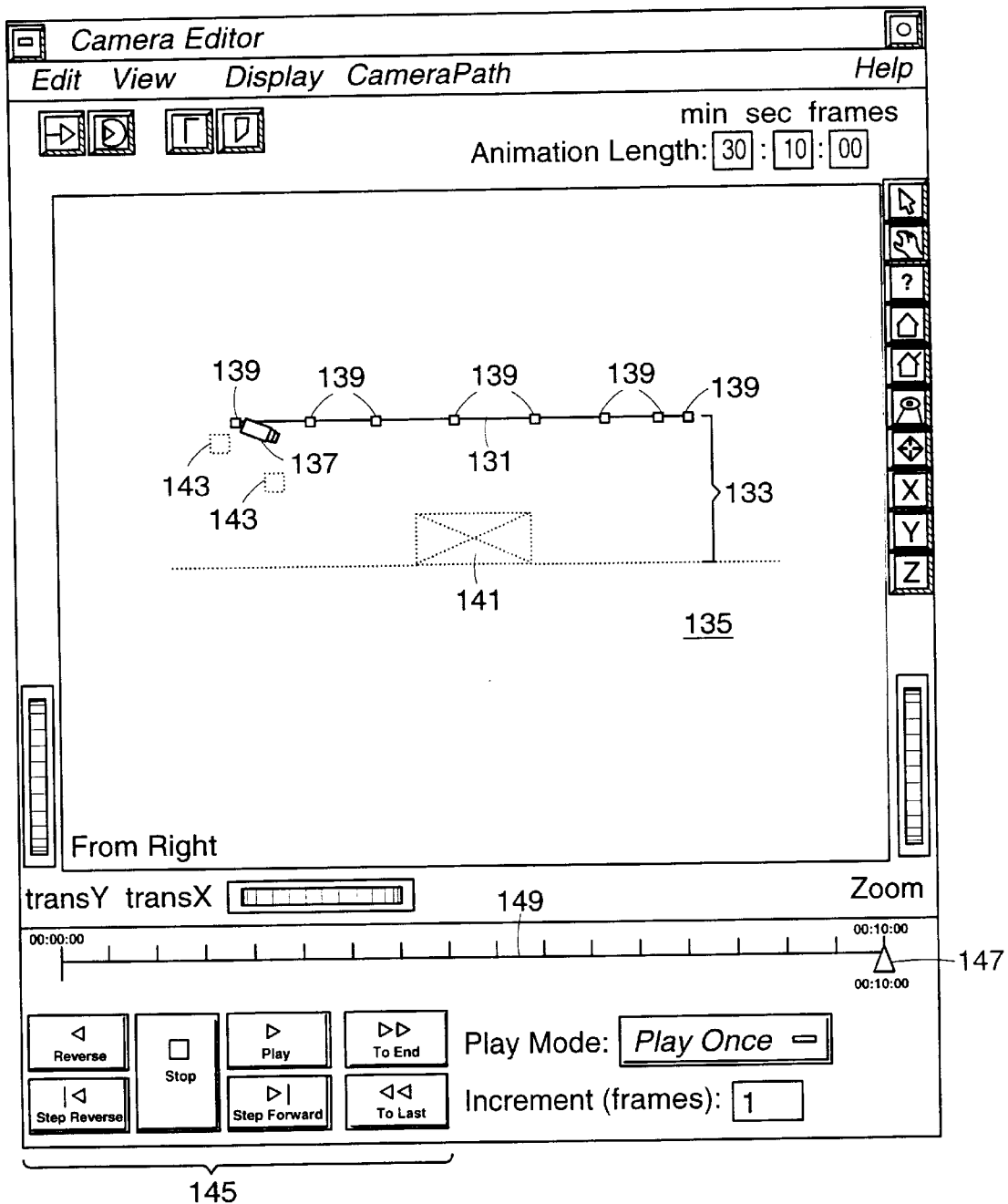

When the user presses play, the movie corresponding to camera path 155 in FIGS. 17(a) and (b) will appear the same as the movie that corresponds to camera path 131 in FIGS. 16(a) and 16(b) until the camera icon 137 enters region 157—the region in which the user has modified the camera path from its original form. Upon entering region 157, the user will be presented with movie images in which the camera, while it rotates around the drop zone 141, appears to move closer to the drop zone. The camera will continue to move toward the drop zone until the camera icon 137 reaches point 159. At that point, the successive movie images displayed will be such that the camera appears to move gradually away from drop zone until a distance corresponding to the original camera path 131 is reached. At the same time (i.e., when camera icon is within region 157), successive movie images will be displayed such that the camera appears to dip down closer to the floor 135 and then rise again until a height associated with the original camera path 131 is reached as the camera icon 137 leaves region 157.

The user has several other options for modifying the camera path. Additional camera points may be added or unwanted camera points may be deleted as desired by the user. An entirely new camera path may be created by starting with a null camera path (i.e., one that contains no camera points), manually generating successive views of the model in the manner describe above and adding each of the viewpoints as they are created to the camera path.

The user may change the "look at" point for any of the camera points to cause the camera to point toward a location in the scene other than at the drop zone. The user also may insert "time ticks" which appear as red tick marks 161 below the scrub bar 149 at the specified locations in the camera path (FIG. 15). Time ticks allow the user to set a time at which the camera will arrive at the specified point in the camera path. Pause ticks 163 also are available to the user to place pauses in the camera path. A pause tick 163 appears as a red horizontal red line below the scrub bar 149, with the length of the line corresponding to the length of the pause.

The speed at which the camera moves along its path at a given time may be varied by the user. The camera does not move at constant velocity but instead obeys the directives placed by the time and pause ticks. If a successive time ticks instruct the camera to be at certain locations along the path at certain times, then the camera may have to slow down and/or speed up in order to arrive at each tick precisely at the user-specified time. The algorithms that govern the camera motion use mathematical techniques to insure that the acceleration and deceleration of the camera proceed smoothly. These algorithms are defined in Foley, van Dam, Feiner and Hughes, Computer Graphics: Principles and Practice, Addison-Wesley (1990), pp. 483–88, which is incorporated by reference.

Once the user has developed the desired scene and has fine-tuned the camera path, a movie file may be rendered by using the Render Options dialog box 127 (FIG. 14) in the manner described above. In the case of rendering a movie file, the user may specify the start and end times ("Animation Length Options") for the sequence to be rendered. The start and end times correspond to the specified time tick marks and may be used to generate a movie file that includes fewer than all of the camera views potentially available in the camera path.

The methods and mechanisms described here are not limited to any particular hardware or software configuration, but rather they may find applicability in any computing or processing environment in which graphic content may be created.

The techniques described here may be implemented in hardware or software, or a combination of the two. Preferably, the techniques are implemented in computer programs executing on programmable computers that each include a processor, a storage medium readable by the processor (including volatile and non-volatile memory and/ or storage elements), at least one input device, and two or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

Ricochet User's Guide          APPENDIX

Chapter 1
Introduction

What is Ricochet?

Ricochet is an application, based on Open Inventor, that allows you to interactively compose a 3D scene and produce a rendered image of a single view of this scene or a movie consisting of a series of rendered views of the scene.

You can use Ricochet to:

- interactively compose a 3D scene.
- render one view of the scene and save it in a file.
- define a camera path through the scene.
- view an animation of the scene by traveling along the camera path.
- make a movie of rendered views from points along the camera path.
- run multiple servers to produce a rendered image or a movie composed of rendered views.

Figure 1–1 shows the sequence of tasks you perform to create a rendered image or a movie of rendered images.

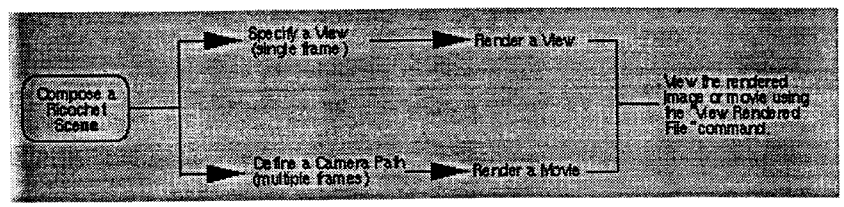

Figure 1–1 Using Ricochet to Produce Rendered Images and Movies

Here are some of the things you can include in a Ricochet scene:

- Open Inventor models
- an Open Inventor scene
- fog effects of varying density and color
- lighting, including spot, directional, and point lights
- modifications to the appearance of all or parts of a model by adding materials or textures Ricochet allows you to use multiple servers to produce a rendered image or a movie composed of rendered views.

Figure 2:
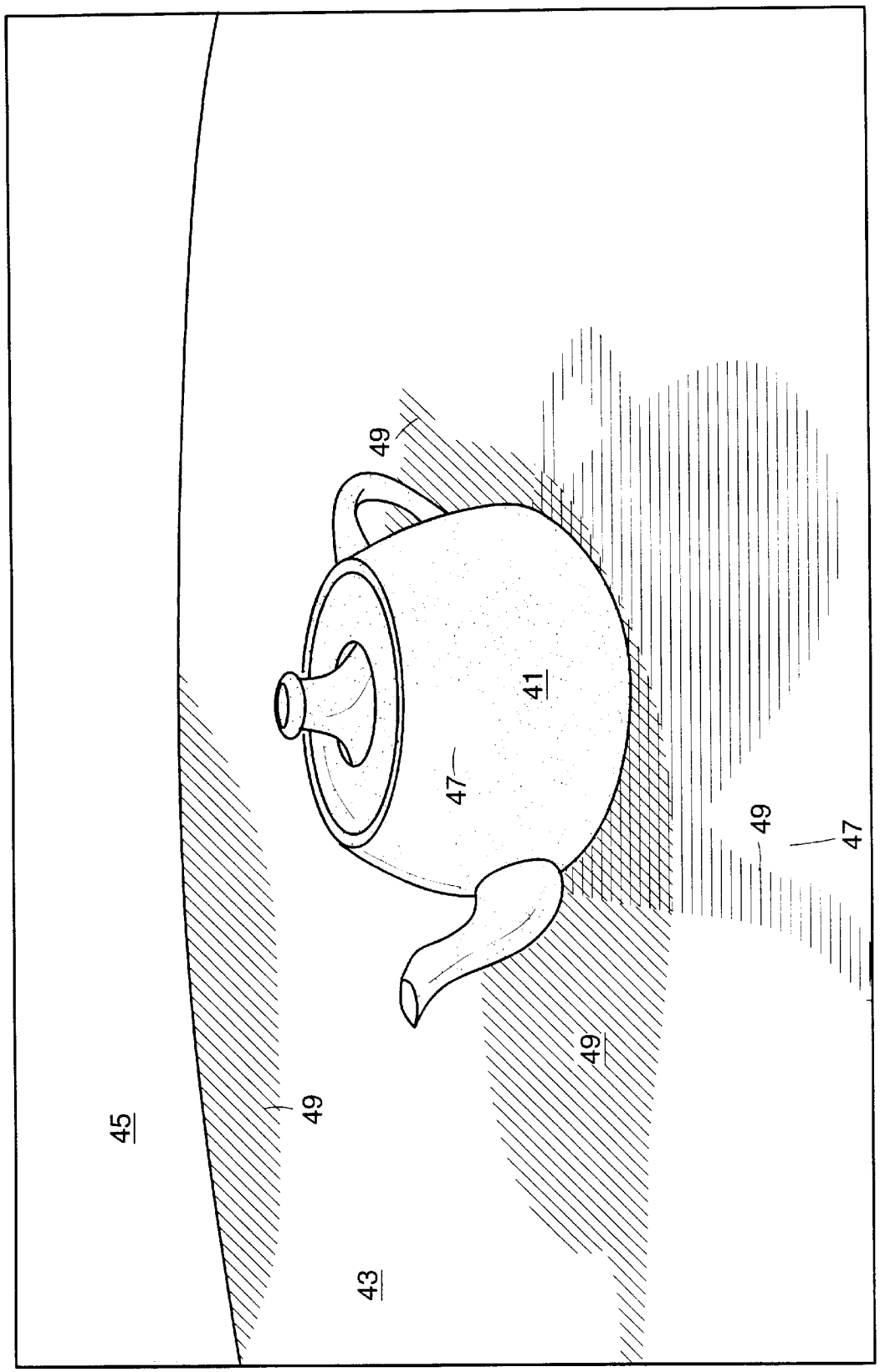
FIG. 2 shows a 3D scene rendered using ray tracing.
Figure 3:
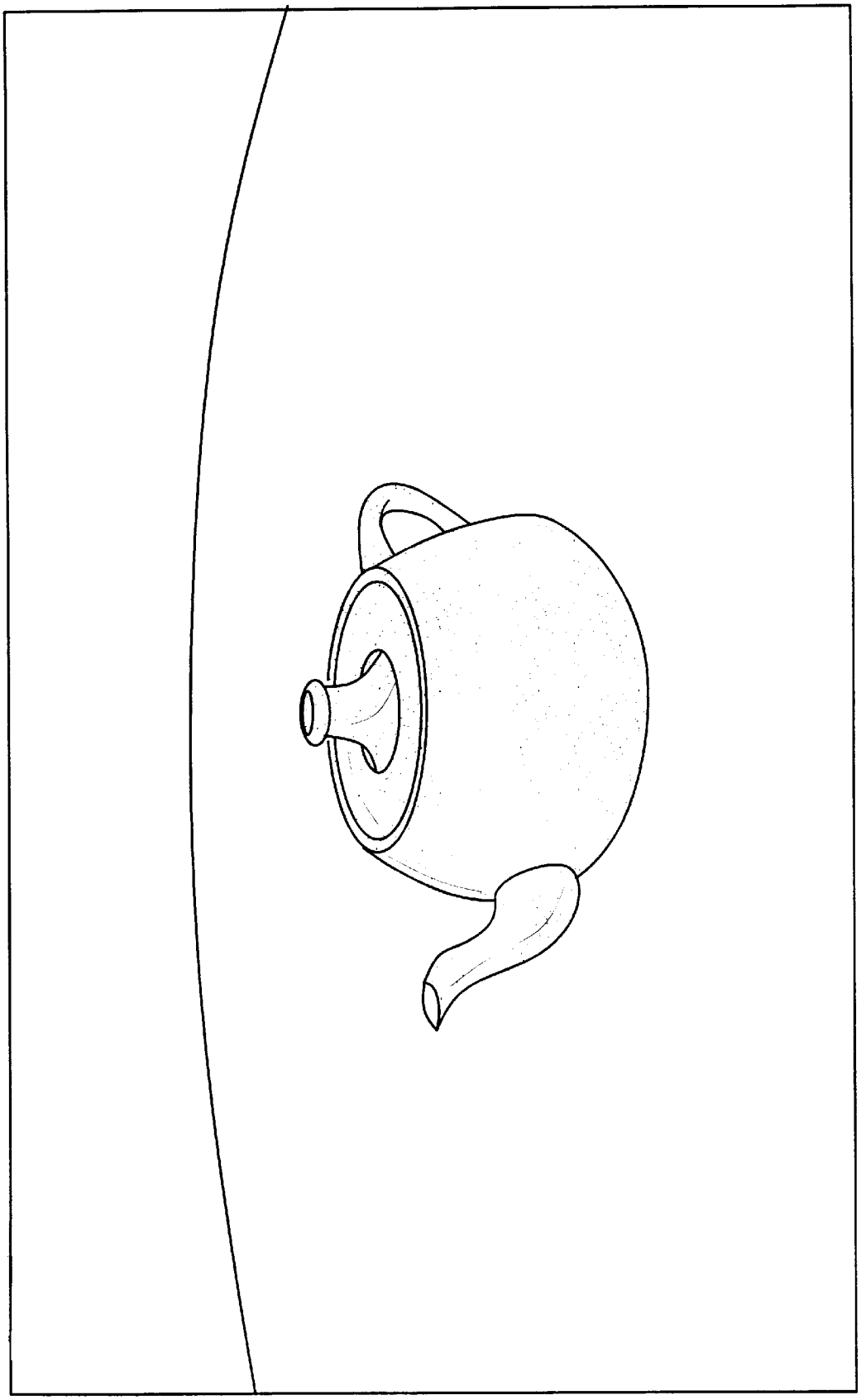
FIG. 3 shows the 3D scene of FIG. 2 rendered without ray tracing.

Ricochet supports two types of rendering:

Ray Traced    Ray tracing is a technique for creating a photorealistic representation in 2D of a 3D scene. The ray tracing technique creates shadows and reflections in a scene by following paths taken by rays of light in the scene. Figure 1–3 shows a Ricochet scene.

OpenGL   Ricochet allows you to produce draft quality images using the OpenGL renderer. This rendering process uses multipass rendering to achieve antialiasing.

Figure 1–3 shows a Ricochet scene as it appears in the display area of a Ricochet window.

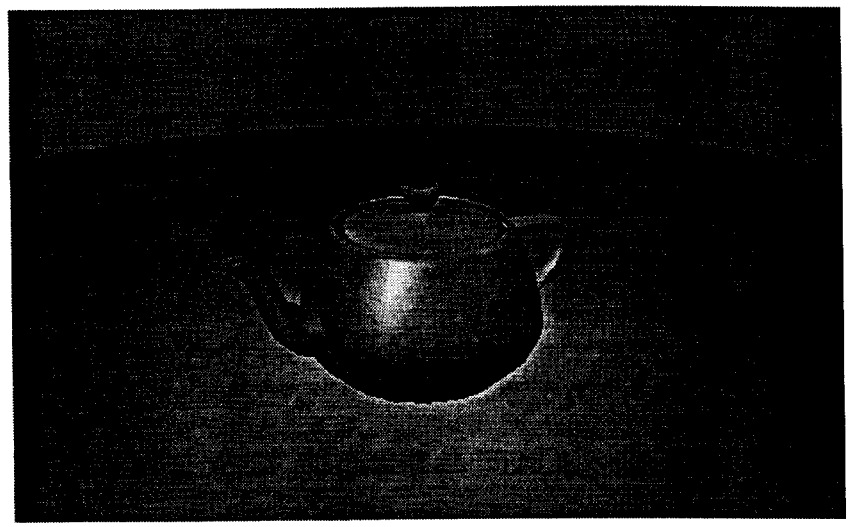

Figure 1-2 View of a Ricochet Scene Before Ray–traced Rendering

Figure 1–3 shows the same scene after ray–traced rendering. This scene contains three spot lights, which enhance the shadows and reflections visible in the ray–traced scene.

Figure 1-3 View of a Ricochet Scene After Ray-traced Rendering

Installing and Running Ricochet

Coming later.

Using This Guide

Ricochet allows you to place an Open Inventor model in a 3D scene and then create a picture or movie of this scene. Ricochet's user interface makes it easy to place your model in a scene and create a picture or movie that shows it off.

- Chapter 2, "Getting Started," gives you the basics you need to create a picture or movie of a scene. Follow the step-by-step instructions in this chapter to import a model into a scene and render a picture or a movie of this scene.

If you want to create a more elaborate scenes, with lighting and camera viewpoints tailored to your unique requirements, this guide tells you how to do that.

- Chapter 3, "Using Models and Stages to Build a Scene," gives you detailed information about creating scenes and stages. Read this if you want to modify the predefined stages or create your own.
- Chapter 4, "Adding Color, Material, and Texture to a Model," tells you how to modify a model you've imported to give the surface a specified color or texture.
- In Chapter 5, "Adding Lights and Fog to a Scene," you learn how to modify a scene by adding lighting and fog.

*Chapter 2*
Getting Started

Ricochet's user interface design makes it easy to create a simple 3D scene and then produce a rendered view or movie of that scene. This chapter presents step-by-step instructions for using basic Ricochet operations to create a simple scene and then make a picture or a movie of that scene.

If you start the Ricochet application and follow the steps in this chapter, you'll have created a single view and a movie of your model by the time you reach the end of the chapter.

Note: You can use your own model or choose from the models in the */usr/share/data/models* directory. A file in this directory with a name of the form *filename.iv* contains an Open Inventor model that you can import into a Ricochet scene.

This chapter includes the following topics:

- "What's a Scene"
- "Understanding the Ricochet Window"
- "Viewing a Scene"
- "Creating a Scene"
- "Interacting with Models"
- "Applying a Material to a Model"
- "Applying a Texture to a Model"
- "Playing a Scene Animation"
- "Rendering a Still View of a Scene"
- "Making a Movie the Easy Way"

What's a Scene

Ricochet allows you to create a scene that contains one or more 3D models placed in an environment (called a stage) that highlights unique features of the models. Figure 2–1 shows a Ricochet scene; the model being exhibited is the teapot. The stage includes the lighting and the pedestal upon which the teapot rests.

- Chapter 6, "Rendering a View," tells you how to create a picture of your 3D scene using one of the Ricochet renderers.
- In Chapter 7, "Defining a Camera Path," you'll learn you to define the series of viewpoints in your scene that determine the camera path for your movie.
- Chapter 8, "Making Movies," tells you how to make a movie from a camera path.

These are reference chapters.

- Chapter 9, "Using the Examiner Viewer," describes in detail how to use the this tool to manipulate the view of your Ricochet scene.

Chapter 10, "Ricochet Menus and Toolbars," contains a summary of the menu items and toolbars found at the top of the Ricochet window.

What You Should Know Before Reading This Book

Who Should Use This Guide?

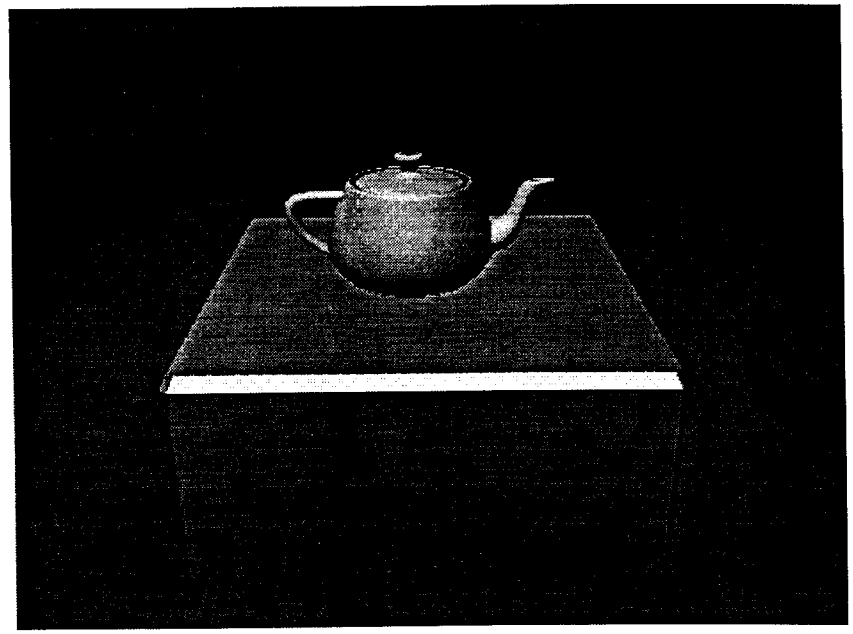

Figure 2-1 A Ricochet Scene

In addition to lighting and objects such as the pedestal, a stage can define atmospheric effects and a camera path for making a movie of the scene. A stage also contains a "drop zone" that defines the space into which Ricochet places imported models. The lighting and camera path for a stage are usually defined so that models in the drop zone are optimally displayed.

You won't need to manipulate a drop zone for the examples described in this "Getting Started" chapter, but you may be curious to know what one looks like. Figure 2-2 shows a Ricochet scene with it's drop zone.

Ricochet User's Guide – Chapter 2, Getting Started – 2

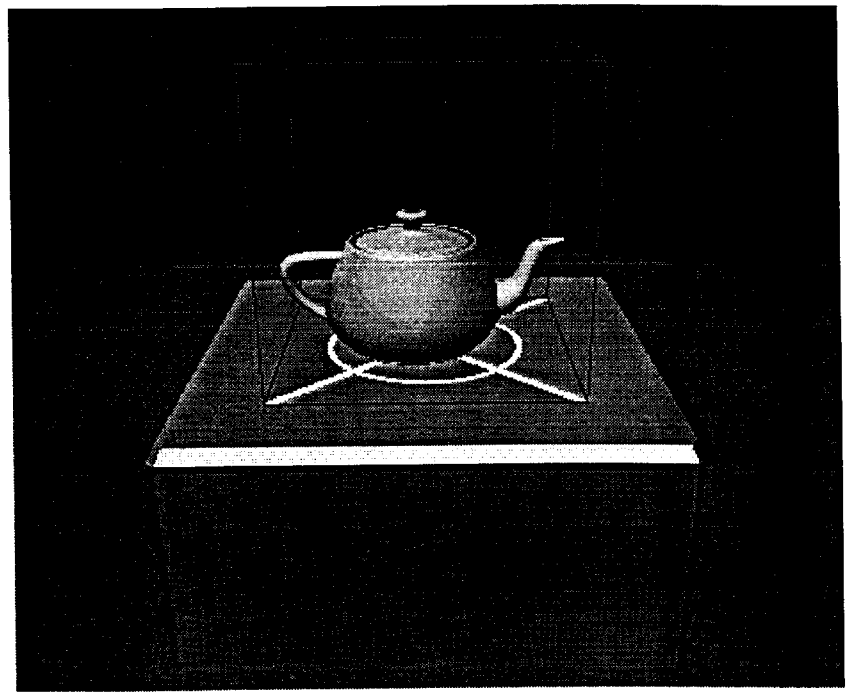

Figure 2-2 A Ricochet Scene Showing a Drop Zone

Ricochet doesn't normally display the drop zone, but you can use the "Display Drop Zone" command on the View menu to turn on and off the display of the drop zone in the Ricochet window.

Ricochet makes scene creation easier for you by providing several predefined stages. If you use one of these predefined stages, you can just import your model into the scene and you're ready to render a view of the scene or make a movie using the camera path defined in the stage.

Read Chapter 3, "Using Models and Stages to Build a Scene," to learn more about scenes and stages.

Understanding the Ricochet Window

When you start Ricochet, the window that appears on your monitor contains menus, toolbars, buttons, and thumbwheels that you can use for scene and movie creation. This window also contains a display area that shows the current Ricochet scene. Figure 2-3 shows a Ricochet window.

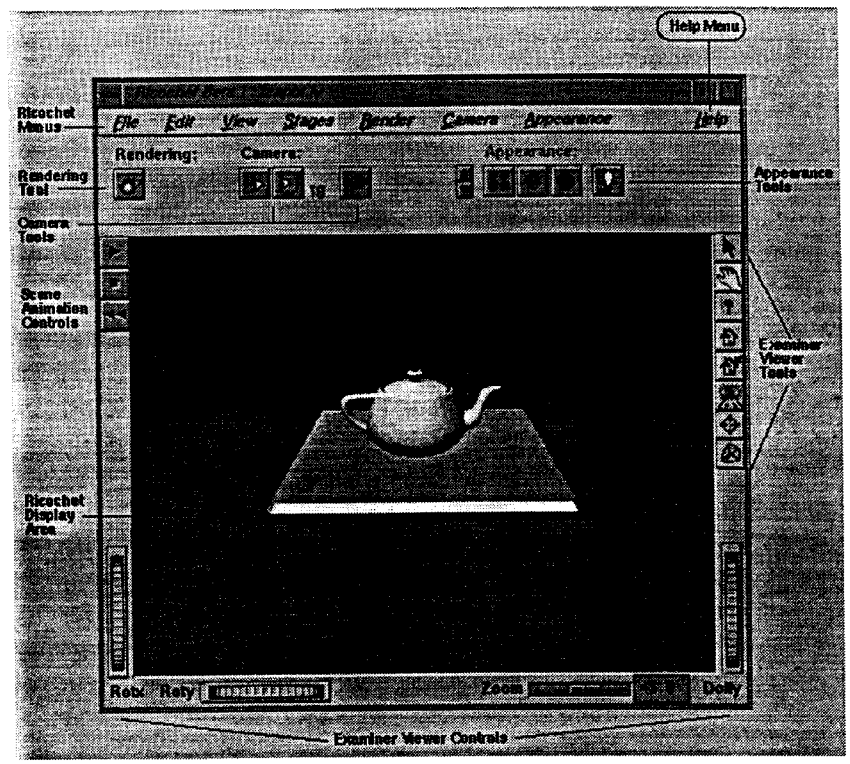

Figure 2-3 Ricochet Window

The Ricochet window contains three functional areas:

- Ricochet command area. This area, at the top of the window, contains the Ricochet menu bar and toolbars. Chapter 10, "Ricochet Menus and Toolbars"contains detailed information about the Ricochet menu items and tools.

Tip: Click on Help, the last item in the Ricochet menu bar, to display a long list of help topics that you can select to learn about Ricochet.

- Display area. Ricochet displays the scene you're currently working on in this area at the center of the window. This area shows changes you make to the material and texture of a model, changes in the lighting, environment, and viewing parameters of a scene, and the animation that results from following a camera path through a scene.

- The Examiner Viewer Controls. This area, at the right side and bottom of the screen, contains controls for the Examiner Viewer. You can use the Examiner Viewer to manipulate the scene in the Ricochet window. Read Chapter 9, "Using the Examiner Viewer," to learn more about the Examiner Ricochet window. Read Chapter 9, "Using the Examiner Viewer," to learn more about the Examiner Viewer.

- Scene Animation Controls. These controls allow you to view a scene animation that is generated from views along camera path—if a camera path is defined in the scene.

Viewing a Scene

This section tells you how to bring a previously-created scene into the Ricochet display area and how to manipulate your view of the scene.

Opening a Scene File

To open Ricochet and Open Inventor scene files:

1. Choose "Open" from the File menu.
2. Browse through the directory structure until you find the name of the file containing the Ricochet or Open Inventor scene you want to view.
3. Place the cursor over the name of this file, then click the left mouse button.

The selected file is surrounded by black.
4. Click the *OK* button.

The scene appears in the display area of the Ricochet window.

Interactively Changing the View of a Scene

You can think of the views of a 3D scene that appear in the Ricochet display area as views seen through a camera lens as the camera moves about the scene. The camera can move to any point in the scene but it always points at the center of the scene unless you specify another camera orientation.

Cursor motions in Ricochet simulate camera movements that result in the changing views of a scene shown in the Ricochet display area. These changes in viewpoint include:

- "Scene Rotation"
- "Dollying"
- "Zooming"
- "Scene Translation"

The Examiner Viewer is an Open Inventor tool that allows you to change your viewpoint (actually the camera location) of a Ricochet scene interactively. The Examiner Viewer tools appear at the left and along the bottom of the Ricochet window (See Figure 2–3). These tools include the Viewer tool, the dolly thumbscrew, and the zoom slider.

Click on the Examiner Viewer Help button, shown in Figure 2–4, to learn more about the Examiner Viewer controls.

Figure 2-4 Examiner Viewer Help Button

Chapter 9, "Using the Examiner Viewer,"describes the Examiner Viewer in detail.

Scene Rotation

The Viewer tool, shown in Figure 2-5, lets you change your view of a Ricochet scene by rotating the camera in any direction about the center of the scene.

Figure 2-5 The Viewer Tool

To perform scene rotation:

1. Click the left mouse button over the Viewer tool, shown in Figure 2-5.
2. Place the cursor in the display area, press the left mouse button, and drag the cursor.

The scene rotates as you move the cursor. You'll notice that the cursor resembles a hand when you're using this tool.
3. Release the mouse button when you are at the desired view.

If you release the mouse button as you move the mouse, the camera continues rotating. To stop the rotation, click anywhere with the left or middle mouse button.

In addition to Viewer tool rotation, you can also use the Rotx and Roty thumbwheels at the lower left corner of the window to rotate the camera in either a horizontal or vertical direction. Figure 2-6 shows the Rotx and Roty thumbwheels.

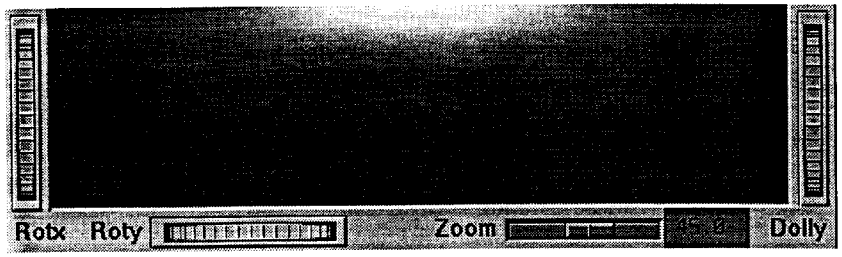

Figure 2-6 Examiner Viewer Thumbscrews and Zoom Slider

Dollying

If you want a closer view of a scene, you can use the Dolly thumbwheel to move the camera closer to or Ricochet User's Guide – Chapter 2, Getting Started – 6 farther from the scene. Figure 2-6 shows the dolly thumbwheel, which appears in the lower right corner of the Ricochet window.

Drag the thumbwheel up to make the scene appear smaller; drag the thumbwheel down to make the scene appear larger.

Zooming

Using the Zoom slider is comparable to changing the lens on a camera. Your view of a scene changes as the viewing angle of the camera becomes larger or smaller. Using the Zoom slider allows you, effectively, to change the viewing angle of the camera. Move the slider to the left to narrow the viewing angle; move the slider to the right to widen the angle. Figure 2-6 shows the Zoom slider as it appears in the lower right of the Ricochet window.

Tip: Changing the zooming angle introduces distortion. It's better to dolly if you want to move closer to or further away from the model.

Scene Translation

You can change the portion of the scene you're viewing by moving the scene in either a vertical or horizontal direction.

1. Select the Viewer tool (the hand in the Examiner Viewer tool bar).
2. Place the cursor in the viewing area, then press the middle mouse button and drag the cursor.
3. The cursor changes to the form shown in Figure 2-7.

Figure 2-7 The Translating Cursor

Drag the translating cursor to move the scene in a horizontal or vertical direction.

Setting a Home View

You can save a particular view of your scene by using the "Set Home" command on the View menu or the Set Home button shown on the right in Figure 2-8. When you set a home view, Ricochet saves the direction and the distance from which you're viewing the scene. To return to the home view, choose "View Home" on the View menu or click the View Home button shown on the left in Figure 2-8.

Figure 2-8 The View Home and Set Home Buttons

When you save a scene in a Ricochet file, the view defined by the Set Home command is saved with the scene. When you later open the file, Ricochet views the model as you were viewing it when you saved the file. This is the default home view.

Selecting a Model

Instead of changing your view of a scene, you may want to manipulate one model in a scene—for example, making it larger or moving it from one location to another. The first step in this operation is to select the model you want to manipulate. You can use the Examiner Viewer Selection tool, shown in Figure 2-9, to select the model.

Figure 2-9 The Examiner Viewer Selection Tool

To perform model selection:

1. Click the left mouse button over the Selection tool.

The cursor becomes an arrow.

2. To select a model, place the cursor over a model in the display area and click the left mouse button.

When you select a model, it appears in the scene surrounded by a bounding box. The bounding box contains little white cubes and green knobs that you can use to move, resize, or rotate the model within the scene. "Interacting with Models" describes how to use the bounding box to manipulate models.

Click outside the bounding box if you want to deselect the model. If the bounding box is so large it fills the screen, you may have to select "View All" on the View menu to view the scene from a more remote location. Selecting another model automatically deselects the current selection.

Changing the Way Models Display

The Examiner Viewer pop-up menu provides several options for displaying 3D models. If you need faster interaction with the models, consider choosing one of the lower quality display options. The alternate display options include displaying a model in wireframe form or as a series of points. To select an alternate drawing style:

1. Place the cursor over the viewing area, then press the right mouse button.

A pop-up menu appears.

2. Place the cursor over the words "Draw Style," to reveal a rollover menu.

3. Choose an item from the menu.

See "The Examiner Viewer Pop-Up Menu" for more information about the Examiner Viewer pop-up menu.

Changing the Background Color

By default, the background of the display area is black. To change the background color:

1. Choose "Background Color..." from the Edit menu.

A Color Editor window appears on your monitor.

2. Place the cursor over the color wheel, then press the left mouse button and drag the cursor.

The slider at the bottom of the window shows the color under the cursor. The leftmost edge shows the color at the lowest intensity (black) and the rightmost edge shows the color at the full intensity.

3. When the cursor is above the color you want to use, release the mouse button.

4. Move the slider to the right until the color is the shade that you want; then release the mouse button.

By default, the slider is positioned in the leftmost position, which results in the color black. As you move the cursor to the right, the left square at the top of the window changes color; so does the background of the viewing area.

Note: These instructions describe the default behavior of the Color Editor. You can use commands on the Edit and Sliders window to change this behavior. See "The Color Editor" for more details.

The background color remains a part of a scene and does not change if you remove a scene and insert a new scene. When you save a Ricochet scene, the background color is saved as part of the scene.

Viewing All Models in a Scene

If you import several models into a scene, they can be dispersed so they are not all visible. If you want to change the view so all models appear in the display area, choose "View All" from the View menu. This command also centers the scene within the viewing area.

Note: The "View All" command doesn't change the size of any models; the camera moves and repositions so that all the models are visible.

Creating a Scene

A scene contains one or more models and an environment (a stage) into which you place these models to show them to their best advantage. Read this section to learn how to create a scene using one or more models and a stage.

Inserting a Stage

To insert a stage in your scene:

1. Choose the "Insert Stage..." command on the File menu.

The file browser appears with a list of the filenames of the stages provided by Ricochet.

2. Place the cursor over the name of the file containing the stage you want to insert in your scene.

3. Click the OK button.

The stage appears in the display area of your Ricochet window.

Ricochet User's Guide – Chapter 2, Getting Started – 9

Importing a Model

To insert a model into a Ricochet scene.

1. Choose "Import Model..." from the File menu.
2. Browse through the directory structure until you find the name of the file containing the model you want to add to the scene.
3. Place the cursor over the name of that file, then click the left mouse button.

The selected file is highlighted in black.
4. Click the *OK* button; the model appears in the Ricochet scene.

Copying and Pasting Models

Use the "Copy" and "Paste" commands on the Edit menu to copy and paste a selected model into a scene.

1. Use the Examiner Viewer Selection tool to select the model you want to copy.
2. Choose "Copy" from the Edit menu.
3. Choose "Paste" from the Edit menu.

The model appears in the display area in wireframe form. You can drag this wireframe to any point in the scene. Click to place the model at this point.

Deleting Models

If you decide you don't want a particular model in your scene, you can delete it.

1. Use the Examiner Viewer Selection tool to select the model you want to delete.
2. Remove the model by doing one of the following:
   - Choose "Delete" from the Edit menu or press the <Backspace> key.
   - Choose "Cut" from the Edit menu. The model disappears. You can paste the model elsewhere by choosing "Paste" from the Edit menu.

If you change your mind about the model deletion, use "Undo" on the Edit menu to restore the model to the scene.

Interacting with Models

The Examiner Viewer allows you to change your view of the whole Ricochet scene—for example, by rotation or zooming in and out. Another tool, the Open Inventor Transformer Manipulator, allows you to manipulate a single model in a scene—for example, to resize the model or change its location within the scene. To use the Transformer Manipulator, you must first select the model using the Examiner Viewer Selection tool (see "Selecting a Model").

After you select a model, you can manipulate it while other parts of the scene are unchanged. A model, when selected, appears surrounded by a bounding box. Figure 2–10 shows a model with its bounding box.

Ricochet User's Guide – Chapter 2, Getting Started – 10

Figure 2-10 Model With Bounding Box

You can click on the white cubes, green knobs, or plane surfaces of the bounding box to control movement, rotation, and resizing of the model. The manipulator tool performs model manipulations that are controlled by your use of the bounding box components. These manipulations include:

- "Moving a Model"
- "Resizing a Model"
- "Rotating a Model"
- "Selecting a Portion of a Model"

Note: You can select only one model at a time. Selecting a model automatically deselects a previously selected model.

Moving a Model

You can move a model using the bounding box that appears when the model is selected.

1. Use the Selection tool to select the model you want to move (see "Selecting a Model").

A bounding box appears. Each side of the bounding box defines a different plane in which you can move the model.

2. Place the cursor over one side of the bounding box.

The side of the bounding box you've chosen is outlined in orange.

3. Press the left mouse button, then drag the cursor.

When you press the left mouse button, the edges on that side of the bounding box are highlighted in yellow. In addition, arrows appear. They show you the directions in which you can move the model. Figure 2-11 shows the plane in which a model can be moved and the arrows that define possible directions of movement.

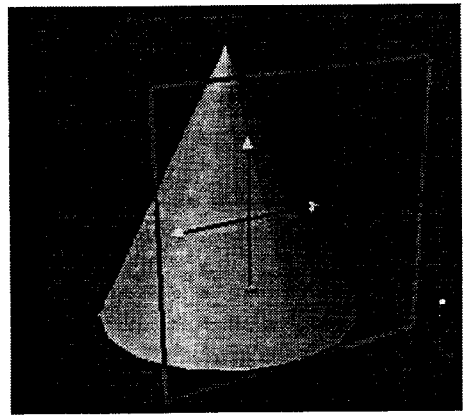

Figure 2-11 Arrows for Moving a Model

4. Release the mouse button when the model is positioned where you want it.

Each side of the bounding box lets you move the model in two directions. For example, one side lets you move the model left and right and up and down. Press the <Shift> key and the left mouse button to constrain movement to one direction—either left and right or up and down. The direction in which you move depends on your initial gesture with the mouse.

Press the <Alt> key to move the model in a line perpendicular to that side of the bounding box. For instance, if that face of the box lets you move the model to the left and right and up and down, press the <Alt> key and you can move the model toward or away from you.

Resizing a Model

You can resize a model using the bounding box that appears when you select the model.

1. Use the Examiner Viewer Selection tool to select the model you want to resize (See "Selecting a Model").

A bounding box appears.

2. Place the cursor over one of the white cubes that appear on the corners of the bounding box and press the left mouse button.

Purple arrows appear to show the directions in which you can drag the cursor. See Figure 2-12.

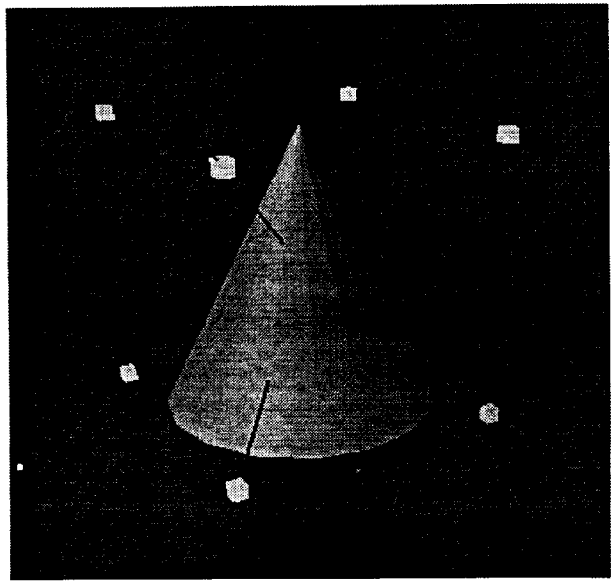

Figure 2-12 Purple Arrows for Resizing a Model

3. Drag the cursor along the purple arrow.

The model becomes larger as you move the cursor away from the model and smaller as you move toward the model.

4. Release the mouse button when the model is the desired size.

Tip: The technique described lets you scale a model uniformly. To resize a model in one dimension, press the <Shift> key when you click the white box. Orange arrows appear; they show you the directions in which you can scale the model.

Continue pressing the <Shift> key and drag the cursor in the direction of one of the orange arrows. Once you start dragging the cursor, the model stretches in that direction and you see a single yellow arrow; the arrow shows the direction in which you're scaling the model. See Figure 2-13.

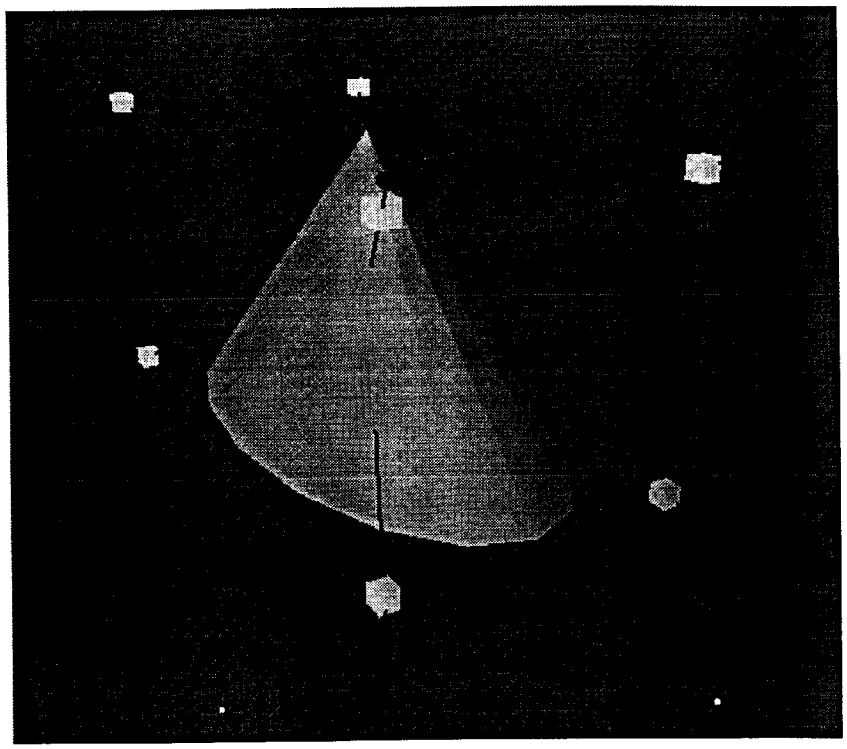

Figure 2-13 Distorting a 3D Model

Ricochet User's Guide – Chapter 2, Getting Started – 13

Rotating a Model

You can use the green knobs on the bounding box to rotate a selected model. After rotation, the position of the model relative to other models in the scene is changed.

1. Use the Selection tool to select the model you want to rotate (see "Selecting a Model").

A bounding box appears around the model. You can use the small green knobs in the bounding box (see Figure 2-10) to rotate the model.

2. Place the cursor over one of the small green knobs, then press the left mouse button.

Orange arrows appear to show you the direction in which you can rotate the model. In addition, purple circles appear to provide guidance. See Figure 2-14.

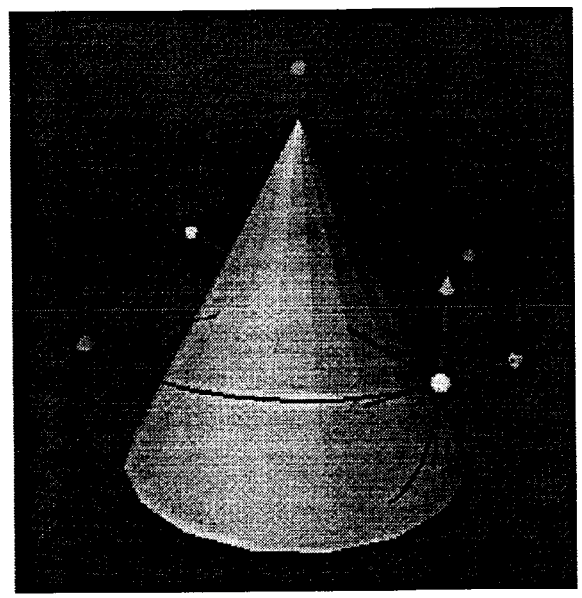

Figure 2-14 Green knobs for Rotating a 3D Model

3. Drag the cursor to rotate the model around one of the circles.

Each rotation knob lets you rotate the model in two directions—left or right and up or down, for example. You rotate the model in whichever direction you first move the cursor. For instance, if you begin by moving the cursor to tne left, you can rotate about the horizontal circle only. Figure 2-15 shows the model after a rotation.

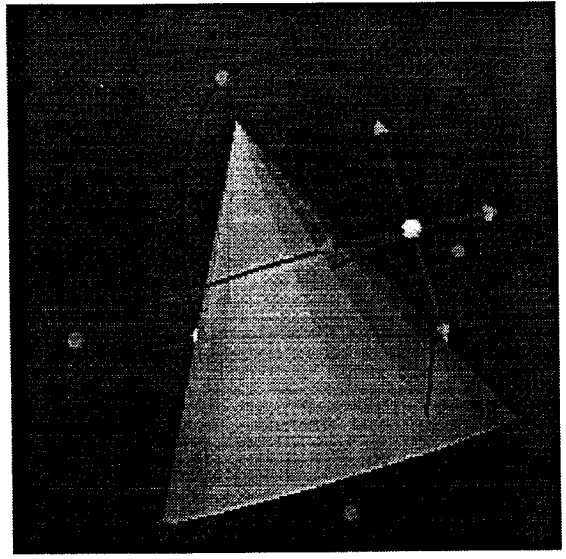

Figure 2–15 A Model After Rotation

4. Release the mouse button when the model is positioned the way you want it.

Tip: To rotate the model freely in all directions, press the <Shift> key while dragging the cursor.

Selecting a Portion of a Model

Many 3D models are constructed from a hierarchy of smaller shapes. For example, a car model can be constructed from several shapes, including the wheels. In turn, each wheel can consist of a hub and a tire.

You can select a portion of a model by starting at the top (or bottom) of the hierarchy and moving down (or up) the hierarchy of shapes until you reach the part of the model you want to use. Use the "Select Parent" and "Select Child," commands on the Edit menu to move up and down the hierarchy. Alternatively, you can use the arrow keys shown in Figure 2–16 to move up and down the hierarchy of shapes.

The up arrow lets you pick the parent; the down arrow lets you ——— 
pick the child.

Ricochet User's Guide – Chapter 2, Getting Started – 15

Figure 2-16 A Shortcut for Picking Portions of a Model

In Ricochet, the default action is to start at the top of the hierarchy and move to progressively smaller shapes in the hierarchy. Thus, if you place the cursor on a model and click, this selects the top level of the hierarchy (the whole model). Subsequent selections of the "Select Child" command or the down arrow key move down the hierarchy of shapes that are located under the initial cursor click on the model. A bounding box shows you the part of the model currently selected. To select the tire in the car model, perform these steps:

1. Place the cursor over the tire and click the left mouse button.

A bounding box appears around the whole model (the car).

2. Choose "Select Child" on the Edit menu or the down arrow key shown in Figure 2-16.

A bounding box appears around the wheel.

3. Again, choose "Select Child" on the Edit menu or the down arrow shown in Figure 2-16.

A bounding box appears around the tire.

Figure 2-17 shows you how this works using a flying bird as a model.

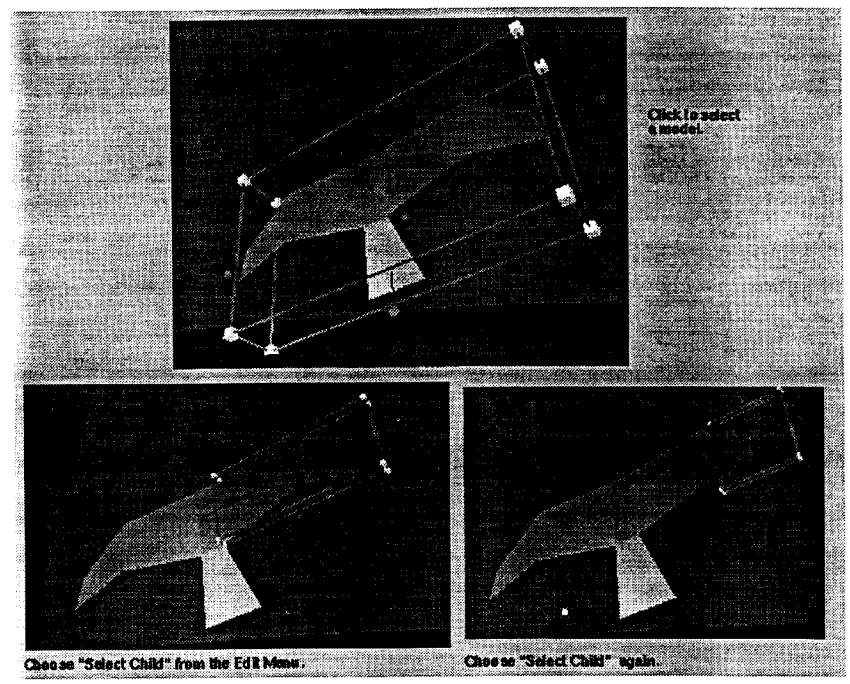

Figure 2-17 Selecting One Part of a Model

If the "Select Child" command and the down arrow key are active (black), there is a smaller shape in the hierarchy for you to select. If the "Select Parent" command and the up arrow key are black (active), there is a shape above the current one in the hierarchy. If any of these commands or keys are inactive (gray), you've gone as far as you can go in the indicated direction.

If you want your initial click on a model to start the shape selection at the bottom of the hierarchy rather than the top, choose the "Select Lowest" command on the Edit menu. You would then choose the up arrow key or the "Select Parent" command on the Edit menu to move up the hierarchy.

Applying a Material to a Model

A model's appearance is determined by the material from which it's made. The material determines the color of the model, whether it looks plastic or metallic, whether it appears rough or smooth, and whether it is opaque or transparent.

Ricochet provides several palettes of materials for you to chose from when you define the appearance of your model. Figure 2-18 shows one of these Material Palettes.

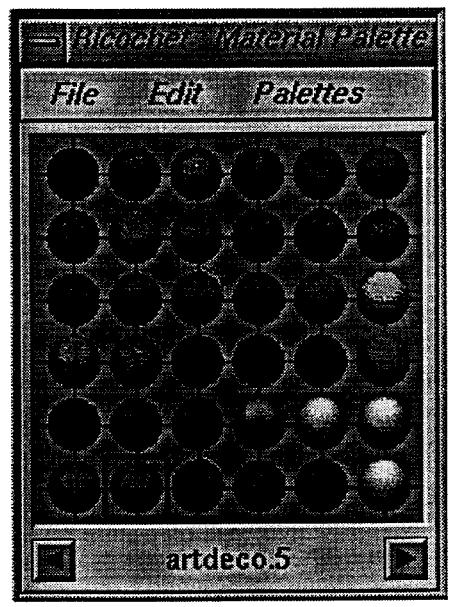

Figure 2-18 A Material Palette

To change the material on a model:

1. Select the model to which you want to apply material (see "Selecting a Model").

A bounding box appears around the model.

2. Choose "Material Palette" from the Appearance menu or click the button shown in Figure 2–19 to open the Material Palette.

Figure 2–19 The Button That Opens a Material Palette

A window containing a material palette appears on your monitor (see Figure 2–18). This palette contains 36 materials for you to choose from, each shown in a small sphere in the palette.

3. Choose the palette containing the material you want for your model.

You can choose a material for your model from the first material palette that appears, or you can look at some of the other palettes. Use one of the two methods shown below to view the available palettes:

- Use the arrows in the lower left and right corners of the Material Palette window to step through the available palettes.

- Click on Palettes to display a list of all palettes (see Figure 2–20). Choose a palette from this list.

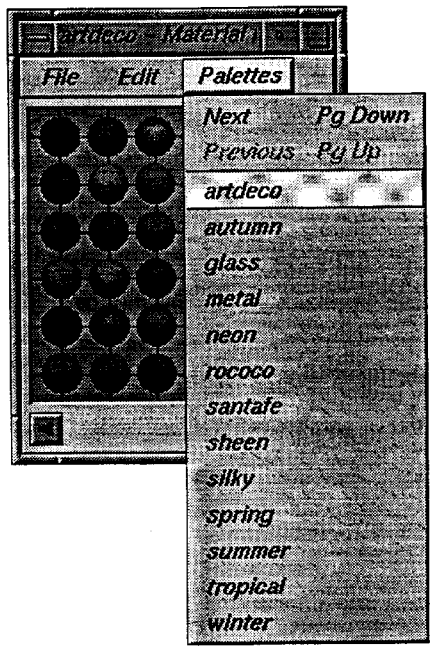

Figure 2-20 The Menu for Changing Material Palettes

4. Place the cursor over a sphere in the palette you've chosen to select a material for your model.
5. Click the left mouse button to apply that material to your model.

A red square appears around the material you've chosen and the selected model in the Ricochet display changes to that material.

The material palettes supplied with Ricochet provide you with a wide variety of materials for your models. You can select one of these materials or you can use the Material Editor to create a custom material by modifying a material after you've applied it to a model. If you want this modified material available for later use, you can add it to an existing palette, or even create a new palette that contains customized materials for your applications.

Read Chapter 4, "Adding Color, Material, and Texture to a Model," to learn more about materials and material palettes.

Applying a Texture to a Model

A texture is an image or pattern that you can apply to the surface of a model. For example, you might apply a wood grain texture to a model of a table or chair. Figure 2-21 shows a model of a table before and after application of a wood grain texture.

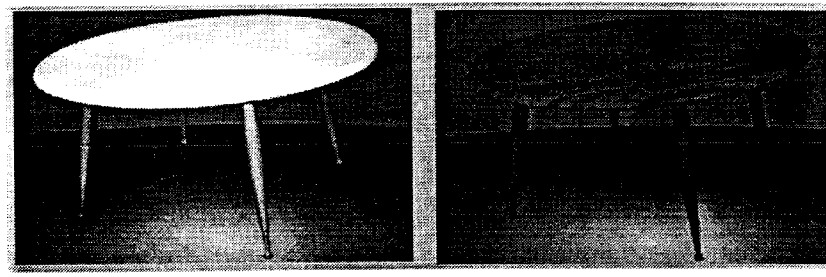

Figure 2-21 Applying a Texture to a Model

You can choose textures for your models from several palettes of textures provided with Ricochet. The Texture Editor tool, which you can invoke from Ricochet, allows you to:

- display the textures in a texture palette.
- select a texture from a texture palette and apply this texture to a model.
- create custom textures.

To apply a texture to a model, follow the steps listed below:

1. Select the model to which you want to apply a texture (see "Selecting a Model").

A bounding box appears around the model.

2. Choose the "Texture" command from the Appearance menu or click the button in the Ricochet Appearance toolbar shown in Figure 2-22.
Figure 2-22 The Button That Opens the Texture Editor
A window containing the Texture Editor appears on your screen. Figure 2-23 shows this window.
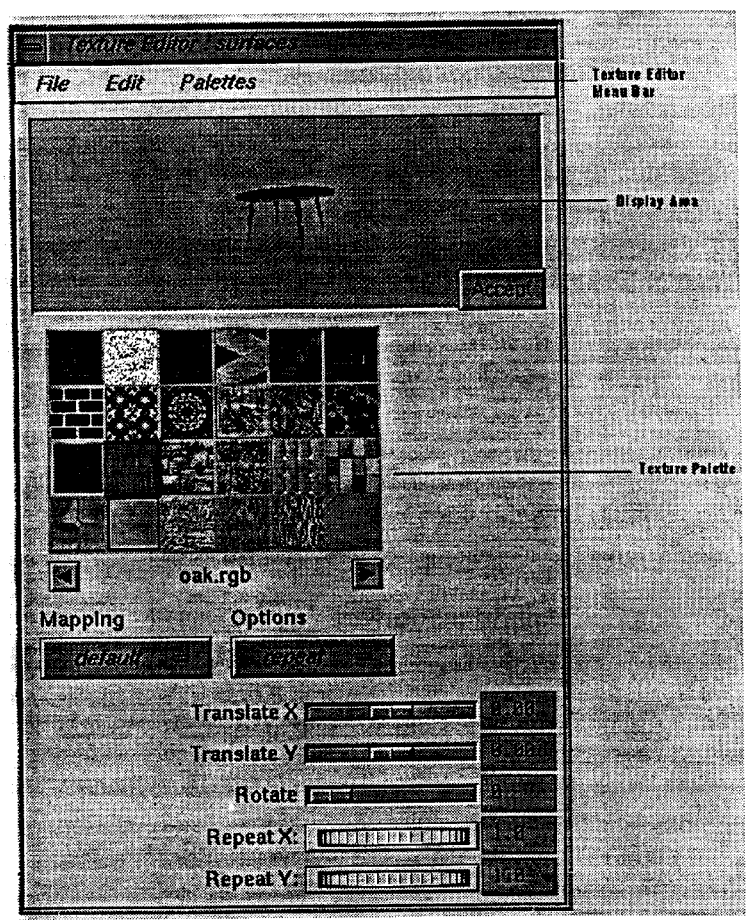
Ricochet User's Guide – Chapter 2, Getting Started – 20

Figure 2-23 Texture Editor

A copy of the selected model appears in the display area of the Texture Editor. A palette of textures appears below the display area.

Note: The controls below the palette aren't needed for the simple texture application being described here; they're described in detail in "The Texture Editor."

3. Display the texture palette containing the texture you want to apply to your model.

You can do this in one of two ways:

- Use the left and right arrows below the texture palette to step through the available palettes
   - Click on the "Palettes" command to view a list of the available palettes. Place the cursor over the name of a palette to select it.

4. Place the cursor over the desired texture in the palette; then click the left mouse button to select that texture.

The Texture Editor applies the selected texture to the model in the Texture Editor display area. In Figure 2-23, the *oak.rgb* texture, outlined in red, in the *surfaces* palette is applied to the model (a table).

5. Click the *Accept* button.

The selected model in the Ricochet display area changes to the texture you selected.

Note: If you later view the file on a system that is missing the texture you selected, Ricochet displays the model without any texture.

6. To view the model in the Texture Editor display area from different angles, place the cursor over the model; then press the left mouse button and drag the cursor.

The model rotates so that you can see different sides.

Note: Decide whether you want to change the model's material before applying the texture. If you plan to apply a color texture, you might want to make the material gray or white. Using a neutral material preserves the appearance of the texture.

See "The Texture Editor." to learn more about using textures on your models.

Playing a Scene Animation

You can define a camera path through your 3D scene and view the scene from the perspective of a camera following that path. A camera path is a connected series of viewpoints of the scene in 3D space. Defining a camera path can get complicated. Fortunately, each of the predefined stages provided by Ricochet defines a camera path that presents clear and well-lighted views of your model, provided you place the model in the drop zone defined by the stage. If you insert a stage first, and then import a model, the model is automatically placed in the drop zone.

To play an animation of a scene using a predefined camera path, follow these steps:

1. Use the "Insert Stage..." command on the File menu to insert a stage into your scene.

The file browser presents you with a list of the filenames of the predefined stages provided by Ricochet. Click on one of these names to select a stage for your scene. Each of these stages contains camera path definition 2. Use the "Import Model..." command on the File Menu to import a model into your scene.

When you select "Import Model...", the file browser window appears. You can specify the filename of one of your own models or you can select a model from the */usr/share/data/models* directory.

3. Click on the "Play Animation" button on the Ricochet menu.

This is the topmost button of the three shown in Figure 2-24.

Figure 2-24 The Animation Play Buttons

An animation of your scene appears in the Ricochet display area, with views determined by the camera path. The animation stops when the end of the camera path is reached.

4. To stop the animation play at any point, click on the middle button shown in Figure 2-24.

5. To go back to the beginning of the camera path, click on the bottom button shown in Figure 2-24.

Rendering a Still View of a Scene

Ricochet can create a file containing a rendered view of your scene. Rendering produces an image of a scene from the definitions of the scene components in a Ricochet file. Ricochet produces two types of rendered images:

- Draft-quality images that look just like the view you see in the Ricochet display area.
- Ray-traced images that contain shadows, reflections, and more accurate lighting than the draft-quality images.

To produce a rendered image of a scene that contains one or more models and a predefined stage, follow these steps:

1. Create a scene that contains the models, placed in the drop zone, and a stage.

2. Start the rendering process by selecting the "Begin Rendering" command on the Render menu, or by clicking on the button shown in Figure 2-25.

Figure 2-25 The Begin Rendering Button

A Render Options dialog box, shown in Figure 2-26, appears on your monitor.

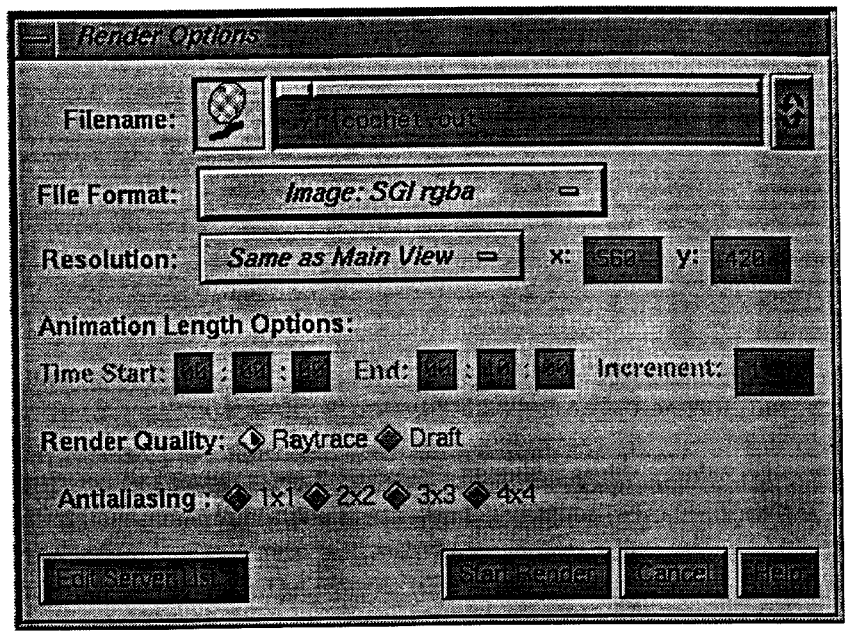

Figure 2-26 The Render Options Dialog

3. Specify the name of the file into which Ricochet saves the rendered image.

The default file for the rendered image is *ricochet.out*.

4. Use the Render Quality line in the dialog box to select the type of rendering for your image. You can select:

- Draft to obtain an image that looks just like the image you see in the Ricochet display area.
   - Raytrace to obtain a Ray-traced image This image contains shadows, reflections, and more accurate lighting than a draft-quality image.

5. Use default values for the remaining options in the RenderOptions window.

6. Click the Start Render button to start rendering.

Ricochet opens a renderpanel window that lets you view the output of the rendering process, tile-by-tile as the rendered image is created.

Figure 2-27 shows the renderpanel window with a ray traced version of a scene containing a stage and a single model—a table onto which a woodgrain texture has been applied.

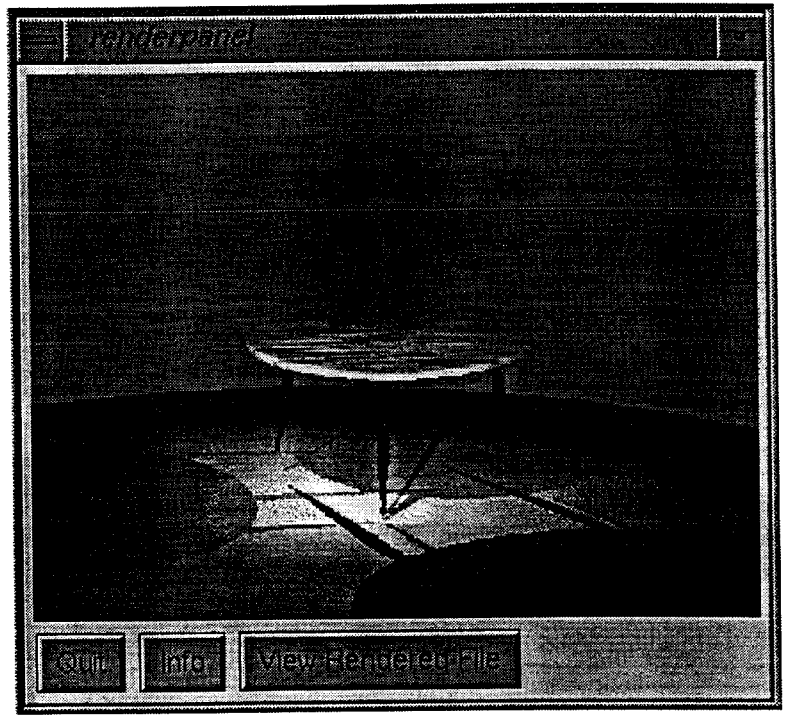

Figure 2-27 A Rendered Scene

The Quit button in the renderpanel window remains active while rendering is in progress, allowing you to terminate rendering at any time.

7. At completion of rendering, the file you specified in the Render Options window contains the rendered image. You can select:

• The Quit button to close the renderpanel window.

• The Info button to request information about the image file.

• The View Rendered File button to bring up a window that shows an enlarged view of the rendered file.

Read Chapter 6, "Rendering a View," to learn more about the rendering features of Ricochet.

Making a Movie the Easy Way

You can create a movie of a scene where the frames of the movie consist of rendered views of the scene taken along the camera path. Ricochet saves the frames of the movie in a file that you can play later with Movie Player. A Ricochet movie can contain:

- Draft-quality images that look just like the view you see in the Ricochet display area.
- Ray-traced images that contain shadows, reflections, and more accurate lighting than the draft-quality images.

You can define your own camera path for a movie, but this can get complicated. If you use one of the predefined stages provided by Ricochet, you can use the camera path defined in the stage. This path provides clear and well-lighted views of your scene provided you place your models in the drop zone (automatic if you import a model after inserting a stage).

To create a movie using the camera path in a predefined stage, follow these steps:

1. Create a scene that contains a model, placed in the drop zone, and a stage.
2. Start the rendering process by selecting the "Begin Rendering" command on the Render menu, or by clicking on the button shown in Figure 2-25.

A Render Options dialog, shown in Figure 2-26, appears on your monitor.

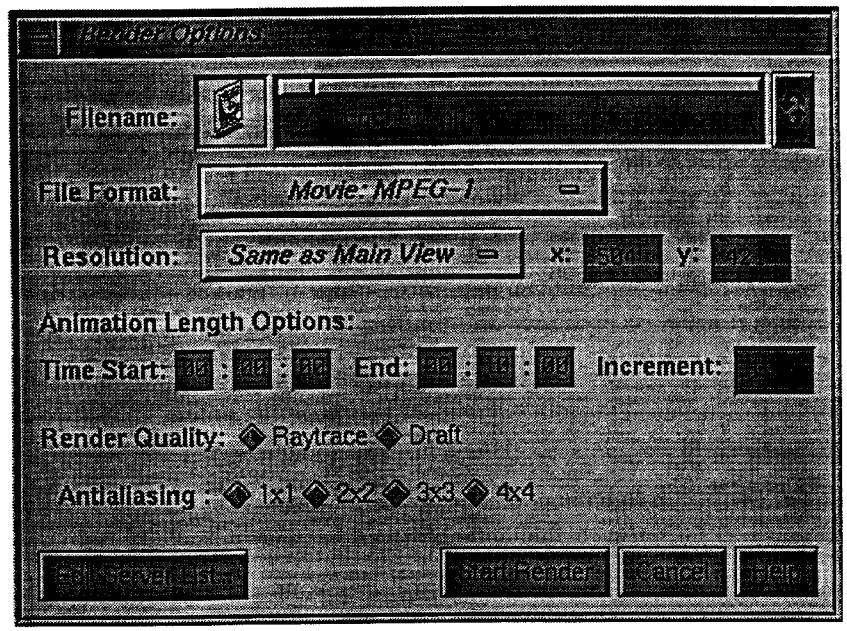

Figure 2-28 The Render Options Dialog for Movie Rendering

3. Click on the File Format command and select one of the movie formats. For this example, select *Movie:MPEG-1*.

This tells Ricochet to create a movie.

Chapter 3
Using Models and Stages to Build a Scene

This chapter describes how you can create a Ricochet scene by importing Open Inventor models and inserting a Ricochet stage into the scene.

What's in a Ricochet Scene?

When you use Ricochet to construct a scene for rendering, this scene can contain one or more of the following components:

- Open Inventor models
- a stage
- lighting
- an environment
- a camera path

A Ricochet scene, to be meaningful, should contain at least one model and some lighting. In addition, this scene can contain a predefined stage that makes scene creation easier by providing a setting for the models you import into the scene. A scene also can contain an environment (fog) and a camera path if you want to generate an animated view of the scene.

As Figure 3-1 illustrates, a Ricochet scene contains a custom and a global component.

4. Use the Render Quality item in the dialog box to select the type of rendering for your movie.

You can select:
   - Draft to obtain movie views that look just like the view you see in the Ricochet display area.
   - Raytrace to obtain Ray-traced images in your movie. These images contain shadows, reflections, and more accurate lighting than the draft-quality images.

5. Specify the name of the file into which Ricochet saves the rendered movie.

The default file for the rendered movie is *ricochet.out*.

6. Click the Start Render button in the Render Options dialog window to start rendering.

A renderpanel window appears on your monitor. This window displays the output of the rendering process, tile-by-tile, as each rendered frame of the movie is created.

The Quit button in the renderpanel window remains active while rendering is in process, allowing you to terminate rendering at any time.

7. At completion of the rendering, *ricochet.out* contains the rendered movie. You can select:
   - The Quit button to close the renderpanel window.
   - The Info button to request information about the image file.
   - The View Rendered File button to view the rendered movie. Ricochet starts Movie Player and a dialog box appears that allows you to control the playback of the movie.

Read Chapter 8, "Making Movies," to learn more about making a movie of Ricochet scene.

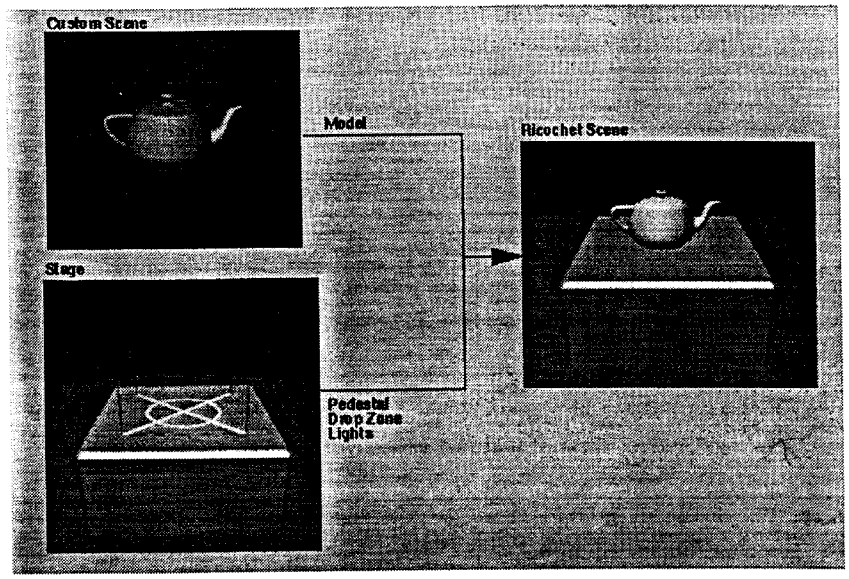

Figure 3-1 Components of a Ricochet Scene

A stage adds global (predefined) elements to a Ricochet scene. The custom scene you create (using elements such as Open Inventor models and lighting) defines the part of the Ricochet scene that satisfies your unique presentation requirement.

A stage is normally visible when you create or edit a custom scene but the elements of the stage are not accessible (editable). To edit a modify elements of a stage, you must enter the edit stages mode (see "Editing a Stage").

You'll notice that some items, for example models and lights, can originate in either the custom scene or the stage. You can define these elements in either part of the scene you like.

Note: In this document, the terms custom scene and stage refer to the components of a Ricochet scene as shown in Figure 3-1. When the term scene appears without a qualifier, it refers to whole Ricochet scene.

For additional information about creating a Ricochet scene, read:

- Chapter 4, "Adding Color, Material, and Texture to a Model" to learn how to modify the appearance of models in a Ricochet scene.
- Chapter 5, "Adding Lights and Fog to a Scene," to learn about adding environment and lighting effects to the scene.
- Chapter 7, "Defining a Camera Path," to learn about defining a camera path in the scene.

What's in a Stage?

A stage is the part of a Ricochet scene that includes the global properties of the scene—a camera path, lights, and the models that are a fixed part of the scene. Like the stage upon which a play at the theater is presented, a Ricochet stage provides the setting in which objects are presented or an animated view of these objects takes place.

A stage can contain one or more of the following components:

- drop zone
- lighting
- models
- camera path

Drop Zone

A stage always contains a drop zone: it is the only required component of a stage. A drop zone is a box into which Ricochet places all models that you import into your custom scene. The drop zone appears on the screen outlined in red. Figure 3-2 shows a typical Ricochet stage with its drop zone.

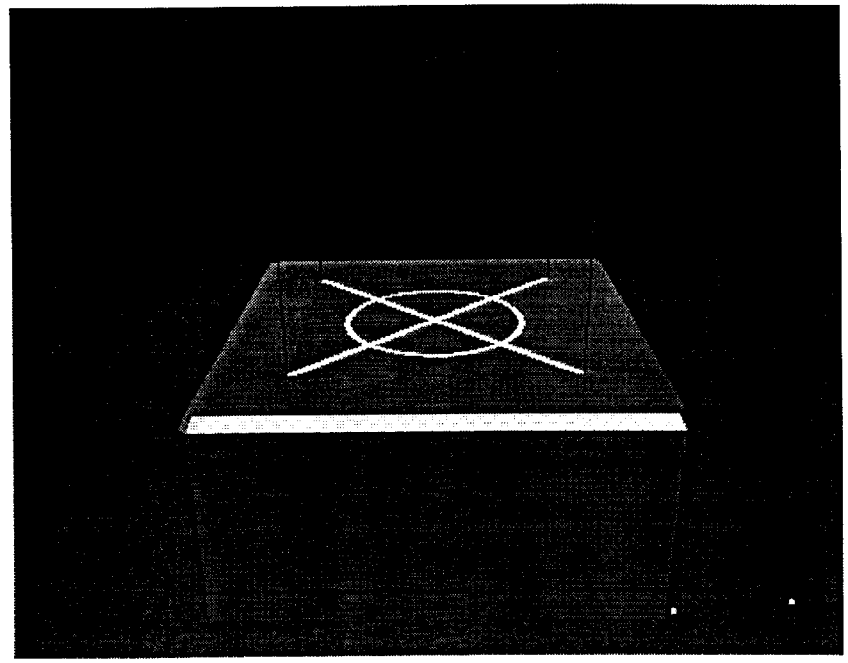

Figure 3-2 A Simple Stage

Ricochet places each imported model at the bottom of the drop zone and scales the model to be as large possible to fit in the drop zone and still retain its original proportions. After you have imported a model, you can move it out of the drop zone to any point in the Ricochet scene.

The drop zone feature in a well-designed stage provides these advantages:

- The scaling of models imported into the drop zone means that models whose sizes vary widely have similar sizes when imported into the scene.
- In a stage containing lighting and a camera path, a model imported into the drop zone is optimally placed for this lighting and camera path.

The drop zone is always visible when you are editing a stage (when you are in edit stage mode). When you are creating or editing a custom scene, the drop zone is not visible unless you select "Display Drop Zone" on the View menu.

Models, Lights, and a Camera Path

In addition to the required drop zone, a stage can contain lighting, Open Inventor models, and a camera path. When you are in edit stage mode, you can add these elements to a stage in the same way you add them to a custom scene:

- use "Import Into Stage..." on the File menu to import models into the stage
- use the Lighting Editor to add lights
- use the Camera Path Editor to add a camera path Figure 3-3 shows a scene containing an imported model and the stage shown in Figure 3-2. In this illustration, the drop zone doesn't appear because "Display Drop Zone" on the View menu is not selected.

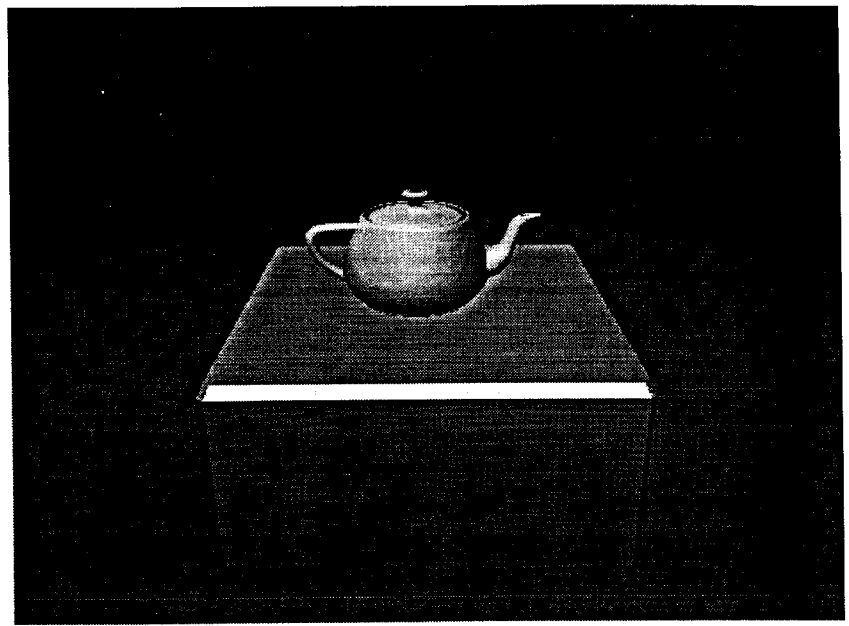

Figure 3-3 Scene with a Stage and a Model

Working With Stages

A stage is a separate entity, stored in its own file. You can use "Insert Stage..." on the File menu to select a file containing a stage to be inserted into your scene.

After you've inserted a stage into a Ricochet scene, it becomes a part of the scene and is saved as part of the scene when you use either "Save All" or "Save All As..." to save the scene. However, Ricochet recognizes the stage component of a scene as a separate unit and allows you to:

- edit it (while in edit stages mode)
- save it (using "Save Stage" or "Save Stage As...")
- replace it (using "Insert Stage..." on the File menu).

Since Ricochet recognizes the stage as a distinct part of the Ricochet scene and separate from the custom part of the scene, you can edit the stage (when in edit stage mode) without disturbing the contents of the custom scene.

Inserting, Replacing, and Removing Stages

To insert a stage into your scene or to replace an existing stage:

1. Select "Insert Stage..." on the File menu.
2. From the File Browser menu, select the file containing the stage to insert.
3. Click the OK button.

To remove a stage from a scene, select "Delete Stage" on the Stages menu. This command removes all components of the stage, including the drop zone.

Suppressing Display of a Stage

You may want to suppress the display of all or part of a stage while you are editing the custom scene. This suppression improves the speed of rendering to the screen and allows you to focus your attention on the models in the scene. The display options on the Stages menu allow you to:

| | |
|---|---|
| "Draw As Is" | Draw the stage with all components present— material and textures, lighting. |
| "Draw No Texture" | Draw models without textures. |
| "Draw Wireframe" | Display just a wireframe version of the models in the stage. |
| "Draw Invisible" | Don't display any part of the stage. |

Editing a Stage

To edit a stage, select "Edit Stage" on the Stages menu. In edit stages mode, the models contained in the custom scene disappear from the screen and you see only the contents of the current stage, including the drop zone. In this mode, you can move or resize the drop zone but you cannot delete it.

In edit stages mode, you can add models, lights, and a camera path to a stage in the same way you add them to a local scene:

- use "Import Into Stage" on the File menu to import models
- use the Lighting Editor to add lights
- use the Camera Path Editor to add a camera path When you finish editing a stage, select "Edit" on the Stages menu to turn off Edit Stages mode. The checkmark next to the Edit command disappears when you turn off edit stage mode. The Ricochet main window then shows the new stage with whatever local scene existed before you edited the stage.

Creating a Stage

You can create a new stage from the models and lights of the custom scene currently displayed. To create this new stage, follow the steps shown below:

1. Select "Delete Stage" on the Stages menu to remove the existing stage (if any).
2. Click "Make Stage From Models" on the Stages menu. Ricochet creates a new stage that contains:
   - all the models and lights from the custom scene.
   - a drop zone large enough for all the models contained in the custom scene. This drop zone determines the size of models subsequently imported into a Ricochet scene of which this stage is a part.

3. To save this stage for later reference:
    1. Select the "Edit Stage" command on the Stages menu to enter edit stage mode. A checkmark appears in the box next to "Edit Stage" indicating that you are in edit stage mode.
    2. Select "Save Stage As..." on the File menu to save the stage in a file.

Saving a Stage

If you create a new stage or modify an existing one, you may want to save that stage for use later in other scenes. To save a stage:

1. Choose "Edit" on the Stages menu to turn enter Edit Stages mode. A checkmark appears in the box next to Edit indicating that you are in the edit stage mode.
2. Choose "Save Stage" to replace the existing stage or "Save Stage As..." to write the new stage to a file

Choosing a Stage

This section describes:

- the stages provided with Ricochet– the models, lighting, and camera path (if any) contained in the scene.
- tell you where to find these stages
- give suggestions about why you might choose each of these stages (Coming later)

Building a Scene

To create a new Ricochet scene, you can either build a totally new scene or modify an existing one.

Building a New Scene

When you build a new scene, you can either:

- import models first and, optionally, insert a stage later.
- insert a stage as the first step, and subsequently import one or more models into the scene.

Importing Models Before Inserting a Stage

If you import models into a scene that has no stage, you lose the advantage of the scaling of models that happens when models go into a drop zone.

When you insert a model into a Ricochet scene that has no stage, the model appears in a bounding box. Ricochet positions the camera so the view of the imported model fills most of the screen. You can use the handles of the bounding box to reposition or resize the model in the scene.

Any models you import after the first model appear in wireframe form. You can move the wireframe object to position the model to the desired location, then click to import the model at that location. Ricochet leaves the camera at the position used for the first model imported. Thus, if the sizes of models imported after the first model vary significantly from the each other or from the original model, your scene can be badly proportioned. Some models can be very tiny, others so large they don't fit into the screen. You can use "View All" on the View menu or the View All tool in the Examiner Viewer toolbar to position the view point so all objects appear.

Note: If you import several models into a scene with no stage and then insert a stage into a scene, all models in the scene are treated as one unit and this unit is scaled to fit into the drop zone of the new stage.

Inserting a Stage Before Importing Models

You may choose to select and insert a stage into your newly created scene before you import models. Follow these steps:

1. Select "Delete Stage" on the Stages menu to remove an existing stage, if any.
2. Select "New" on the File menu to remove all elements of an existing custom scene.
3. Select "Insert Stage..." on the File menu. Then use the File Browser menu to select the file containing the stage for your new scene.
4. You can now create the custom part of your scene.
   - Use "Import Model..." on the File menu to insert models
   - Use the Open Inventor Manipulator tools (see "Interacting with Models") to reposition and resize models

Modifying an Existing Scene

You can use an existing scene as a starting point for creating a new scene.

1. Select "Open" on the File menu to read the desired Ricochet scene.
2. I f you want to use a different stage, select "Insert Stage" on the File menu to load the stage that is to replace the existing stage.
3. If you want to modify the stage:
   1. Select "Edit Stage" on the Stages menu to enter Edit Stages mode.
   2. Enter desired changes to the drop zone, models, lighting, and camera path.
   3. Select "Edit Stage" on the Stages to leave Edit Stages mode
4. Enter the desired modifications to the custom scene.
5. Use "Save All" or "Save All As..." on the File menu to save the new scene.

Chapter 4
Adding Color, Material, and Texture to a Model

The Color Editor

The Color Editor appears when you choose "Background Color..." from the Edit menu or when you edit colors using the Material Editor. Figure 4-1 shows the editor.

Figure 4-1 The Color Editor

The Main Display of the Color Editor

The right side of the window shows a color wheel. Press the left mouse button and drag the mouse to move the selection box within the wheel. The slider at the bottom of the window changes color as you move the selection box. The leftmost edge of the slider shows the color at the lowest intensity (black); the rightmost edge shows the color at full intensity. By default, the cursor in the slider is positioned in the leftmost position (the color black).

The two rectangles at the left of the color wheel allow you to experiment with a new color while saving the previous color. As you move the cursor, the left square changes color; so does the target area. The rectangle on the right shows the saved color. Use the arrow keys to manipulate the colors in the target and the slider:

| | |
|---|---|
| Right arrow | Moves the color in the left rectangle to the right rectangle; this new color becomes the saved color. |
| Left arrow | Restores the slider, the target, and the left rectangle to the color in the right rectangle (the saved color). |
| Double arrow | Exchanges the colors in the left and right rectangles; the target and the slider change |

Ricochet User's Guide – Chapter 4, Adding Color, Material, and Texture to a Model – 1 to the color moved to the left rectangle.

The Edit Menu on the Color Editor

The Edit menu contains "Copy" and "Paste" commands and several commands that change the behavior of the Color Editor.

"Continuous"  This is the default setting for the Color Editor. As you move the slider at the bottom of the window, the target color is continuously updated.

"Manual"  Lets you experiment with colors. When you're ready to change the target color, click the *Accept* button that appears when you chose "Manual." This setting is useful if redrawing the scene is slow.

"WYSIWYG"  Changes the way sliders are displayed. For example, by default, the RGB sliders show a range of colors—from black to red, from black to green, and from black to blue. You can change the color by adding more or less red, green, or blue paint. More than likely, however, you won't know what color you're going to create if you add more red to the existing color.
Choose "WYSIWYG" and the sliders change to show the actual colors you'll create. You click directly on the color you want to use. Think of a paint store. When you're in WYSIWYG mode, choosing a color is like selecting from paint chips; when you're not, you select a color by mixing the paint yourself.

"Copy"  Copies the current color. The pair of boxes in the upper left corner of the window show the current color (left) and stored color (right).

"Paste"  Lets you paste a color that you copied. For instance, select a model, then choose "Copy" from the Edit menu on the main window. Choose "Paste" in the Color Editor. The current color changes; it matches the color of the model you copied.

The Sliders Menu on the Color Editor

By default, the Color Editor displays one slider—the slider for setting the intensity value. You use this to make a color darker or lighter. You can choose to hide this slider or display additional sliders.

"None"  Choose "None" to hide all sliders.

"Value"  Choose "Value" to display the value slider. This slider is shown by default.

"RGB"  Choose "RGB" to display three sliders—one for red, one for green, and one for blue. You can modify a color by adding or subtracting each of these colors.

"HSV"  Choose "HSV" to display three sliders—one for hue, one for saturation, and one for *value*.

"RGB V"  Choose "RGB V" to display four sliders—one for red, one for green, one for blue, and one for *value*.

"RGB HSV"  Choose "RGB HSV" to display all six sliders—one each for red, green, blue, hue, saturation, and *value*.

The Material Palette

Ricochet User's Guide – Chapter 4, Adding Color, Material, and Texture to a Model – 2

The appearance of a model is determined by the material covering its surface. Ricochet provides several palettes of materials from which you can choose materials for your models. Figure 4-3 shows one of the Ricochet material palettes.

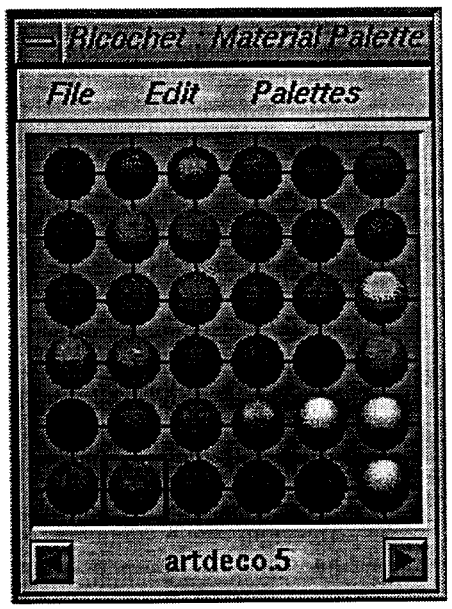

Figure 4-2 A Material Palette

Each material palette provided by Ricochet contains a group of 36 materials; each material is represented by a sphere in the palette. A palette has a descriptive name; for example, *artdeco* is the name of the palette shown in Figure 4-3. Each material in the palette has a name composed of the name of the palette followed by a number. The material name appears below the palette when you select a material. InFigure 4-3, the material selected is *artdeco.5*.

Applying a Material to a Model

To apply a material to a model in a Ricochet scene:

1. Select the model to which you want to apply material (see "Selecting a Model").

2. Choose "Material Palette" from the Appearance menu or click the button shown in Figure 4-3 to open the Material Palette.

Figure 4-3 The Button You Click to Open the Material Palette

The Material Palette window appears on your screen.

3. Choose the palette containing the material you want for your model.

Use one of the two methods shown below to view the available palettes:

- Use the arrows in the lower left and right corners of the Material Palette window to step through the available palettes.
    - Click on Palettes in the Material Palette menu bar to display a list of all palettes. Choose a palette from this list by dragging the cursor to the name of the desired palette.

4. Place the cursor over a sphere in the palette you've chosen to select a material for your model.
5. Click the left mouse button to apply that material to your model.

A red square appears around the material you've chosen and the selected model in the Ricochet display changes to that material.

6. Double click on a material to apply a material to a model and then edit the material.

A Material Palette Editor window appears, which allows you to edit the color you just applied to the model. See "The Material Editor" to learn about editing a material.

The File Menu on the Material Palette

You can create new palettes and customize existing palettes. Commands on the File menu help you do that.

| | |
|---|---|
| "New..." | Lets you create a custom palette. A dialog box appears; into it you enter a name for the new palette, then click *OK*. A palette filled with rows of gray spheres appears. See "Creating a Custom Material Palette." |
| "Save" | Saves the palette being displayed. Choose this if you've modified an existing palette or created a new one. The palette is saved in your home directory. |
| "Save As..." | Lets you choose a new name for the palette. You might choose this if you want to maintain the original palette and use it as the basis for a new, custom palette. |
| "Reset" | Lets you return to the default palette. Choose this if you've modified a material and want to revert to the original. |
| "Delete" | Lets you delete any custom palettes that you've created. You can not delete the default palettes. |
| "Close" | Closes the material palette. |

The Edit Menu on the Material Palette

Use the commands on the Edit menu to cut, copy, and paste materials. You can copy and paste material between palettes as well as between a selected model and the palette.

| | |
|---|---|
| "Cut" | Removes the material from the selected sphere and stores it in a buffer. The sphere turns gray. You can retrieve the material using the "Paste" command. |
| "Copy" | Copies the material from the selected sphere and stores it in a buffer. |

Ricochet User's Guide – Chapter 4, Adding Color, Material, and Texture to a Model – 4

"Paste"   Pastes the material from the buffer onto the selected sphere. You can also paste materials from selected models in the Ricochet file. See "Copying a Material From a Model to the Palette."

"Delete"   Removes the material from the selected sphere. The sphere turns gray.

Creating a Custom Material Palette

You can create a custom material palette. To do so:

1. Select a model in the scene.
2. Choose "Material Palette" from the Appearance menu or click the button shown in Figure 4-3.

The Material Palette appears.
3. De-select the model by clicking in an empty area of the Ricochet viewing area.
4. Choose "New" from the File menu on the Material Palette.

A dialog box appears.
5. Enter a name for the palette you're creating, then click the OK button.

The Material Palette window changes. It contains a palette whose spheres are all gray.
6. Double-click a sphere to open the Material Editor and create a new material.

See "The Material Editor" to learn about creating a new material.

Copying a Material From a Model to the Palette

You may import a model whose material is not available in any of the default material palettes. If this happens, you can add the material to a palette by doing the following:

1. Select the model whose material you want to add to the palette.
2. Choose "Copy" from the Edit menu.
3. Choose "Material Palette" from the Appearance menu.

The Material Palette appears.
4. De-select the model by clicking in an empty area of the Ricochet viewing area.
5. Place the cursor in the palette, over the material you want to replace, then click the left mouse button to select that sphere.

A thick red outline surrounds the sphere when it's selected.
6. Choose "Paste" from the Edit menu on the Material Palette.

The sphere changes colors.
7. Choose "Save" from the File menu on the Material Palette.

Next time you open that palette, you'll see the new material.

Note: If you don't want to replace an existing material, you can create a custom palette. See"Creating a Custom Material Palette" for details.

The Material Editor

Use the Material Editor to change the material of the selected model or to change one of the materials in a palette. Figure 4–4 shows the Material Editor.

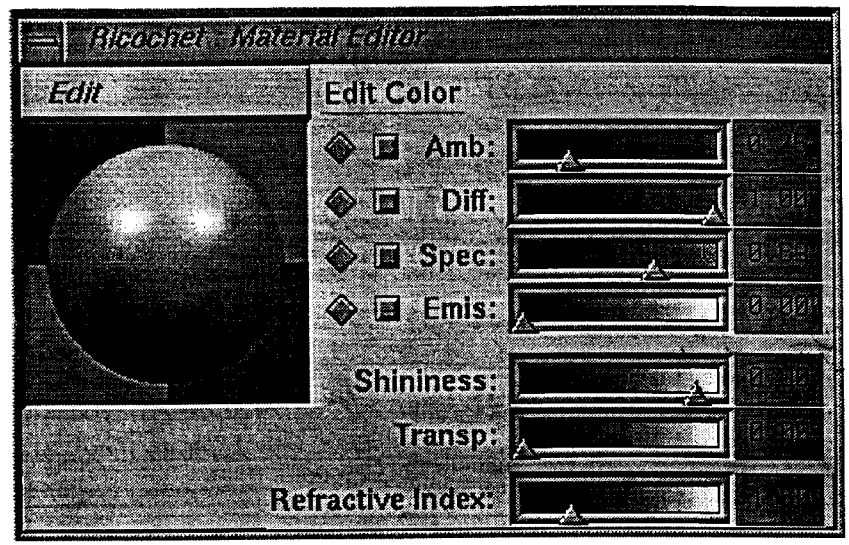

Figure 4–4 The Material Editor

To learn about using the Material Editor, read the following sections:

- "Opening the Material Editor"
- "The Edit Menu on the Color Editor"
- "The Sliders on the Material Editor"

Opening the Material Editor

You might open the Material Editor for one of several reasons—to change the material of the selected model to create a new material, or to modify a material that's part of an existing palette. The following text lists each reason and explains how you would open the Material Editor in each case.

- To change the material for a particular model

Select the model whose material you want to change, then choose "Material Editor" from the Appearance menu. You can also click the button shown in Figure 4–5. The Material Editor opens. Any changes you make apply to the selected model; they do not affect the material palettes.

Figure 4-5 The Button You Click to Open the Material Editor

- To modify a material in one of the existing palettes

Select a model, then choose "Material Palette" from the Appearance menu or click the button shown in Figure 4-6. The Material Palette appears. Deselect the model unless you want to change its material. Find the material that you want to modify, then double-click the sphere. If you want to create a new palette of materials, choose "New" from the File menu.

Figure 4-6 The Button You Click to Open the Material Palette

The Edit Menu on the Material Editor

The Edit menu contains four commands:

"Material List"   Opens a window that contains a list of all the materials installed on your system. Click on a name to load that material. If a model is selected, you change the material of the selected item.

"Continuous"   Changes the selected model as you edit the material. This is the default setting.

"Manual"   Lets you edit a material without automatically updating the selected model and material palette. Click *Accept* when you're ready to apply the change.

"Copy"   Lets you copy a material in the palette.

"Paste"   Lets you paste a material into the palette. See "Copying a Material From a Model to the Palette."

The Sliders on the Material Editor

The Material Editor contains six sliders. Each slider affects the material by controlling how it reacts to light and, in most cases, the reflected color of the light. The list below explains each slider. You will probably need to experiment a bit to get the look that you want.

Amb   The Ambient slider helps you control how dark or light a material is. Imagine you're in a room with light emanating from all areas of the room.
Click the box to the left of the label "Amb" to display a Color Editor. Use this to change the color of the ambient material.

Diff   The Diffuse slider determines the main color of the material. In addition, it determines whether the material looks rough, like a fabric, or smooth.
Click the box to the left of the label "Diff" to display a Color Editor. Use this to change the color of the diffuse material.

Spec   The Specular slider controls the amount and color of the specular light. Think of a specular light as a laser beam. The light hits the object and bounces back sharply. As

| | |
|---|---|
| | you drag the slider to the right, the material begins to look shiny. As you drag the slider to the left, the material looks flat. |
| | Click the box to the left of the label "Spec" to display a Color Editor. Use this to change the color of the specular light. |
| Emis | The Emissive slider determines how much light emanates from inside the object. As you drag the slider to the right, the material looks as if it's glowing in the dark. |
| | Click the box to the left of the label "Emis" to display a Color Editor. Use this to change the color of the emissive light. |
| Shininess | The Shininess slider works with the Specular slider. Together, they determine how shiny or smooth a material appears. The higher the value, the smoother the material appears. |
| Transp | The Transparency slider controls how much light passes through the material. As you drag the slider to the right, the material becomes increasingly transparent. |
| Refractive Index | |
| | *(Need definition)* |

Note: The first four sliders are preceded by a radio button (diamond-shaped button) and a checkbox. Click the radio button to edit the color for that slider only. Click checkboxes if you want to open a Color Editor that lets you change the color for multiple sliders.

The Texture Editor

The Texture Editor allows you to enhance the Ricochet scenes you create by applying textures (patterns or images) to models in the scene. You might open the Texture Editor to:

- apply an image or a pattern (a texture) to the surface of a model
- change the existing texture on a model
- create a new texture The Texture Editor appears when you choose "Texture" from the Appearance menu or click the button shown in Figure 4–7.

Figure 4–7 The Button You Click to Open the Texture Editor

The Main Display of the Texture Editor

Figure 4–8 shows the Texture Editor. The model you've selected appears in the display area of the editor. Click a square in the texture palette to select a texture. The model in the display area of the Texture Editor changes to that texture. Click *Accept*; the selected model in the Ricochet display area changes to the texture you chose.

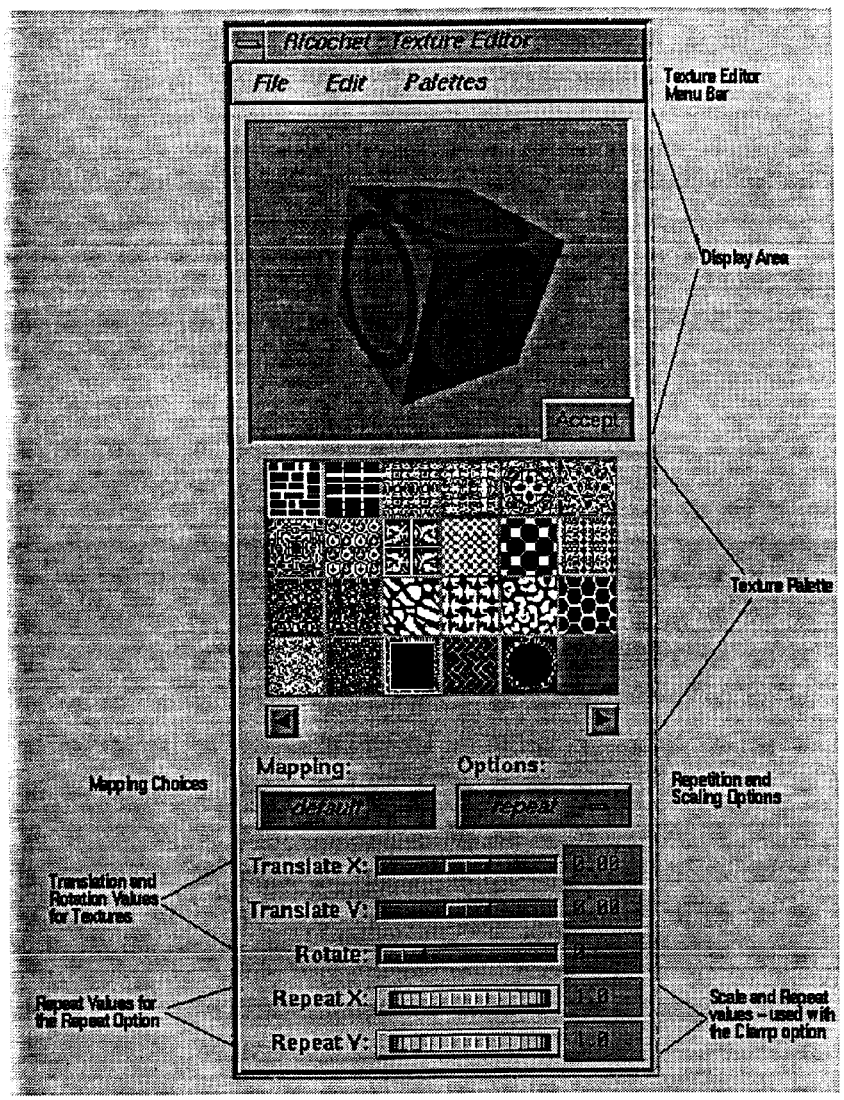
Figure 4–8 The Texture Editor
If you select a texture in the palette, you can view an enlarged version of the texture by double clicking on the texture, or by selecting Show Image on the Edit menu.

If the texture you select is black and white, you can use the Edit Texture Color on the Edit menu to edit the color of the texture. When you edit a texture this way, you change the texture that's in the installed palette. See "The Edit Menu on the Texture Editor" and "Creating a Custom Texture Palette."

Use the Palettes command in the Texture Editor menu bar or the arrows in the lower left and right corners of the window let you move from one palette to another.

The Texture Editor Menu Bar

The File Menu on the Texture Editor

You can create new palettes and customize existing palettes. Commands on the File menu help you do that.

| | |
|---|---|
| "New..." | Lets you create a custom palette. A dialog box appears; into it you enter a name for the new palette, then click *OK*. An empty palette appears. See "Creating a Custom Texture Palette." |
| "Reset" | Lets you return to the default palette. Choose this if you've modified a texture and want to revert to the original. |
| "Delete" | Lets you delete any custom palettes that you've created. You cannot delete the default palettes. |
| "Close" | Closes the Texture Editor |

The Edit Menu on the Texture Editor

| | |
|---|---|
| "Show Image" | Shows a larger image of the selected texture. |
| "Import" | Lets you import a file to create a custom texture palette. See "Creating a Custom Texture Palette." |
| "Delete" | Removes the texture from the selected square. |
| "Edit Texture Color" | |
| | On black and white images, lets you edit the black part of the selected texture. The right side of the Texture Color window shows a color wheel. Press the left mouse button and drag the mouse to move the selection box within the wheel. The slide at the bottom of the window changes. The leftmost edge shows the color black; the rightmost edge shows the color underneath the cursor. |
| | By default, the slider is positioned in the leftmost position, which results in the color black. As you move the cursor to the right, the left square at the top of the window changes color; so does the color of the model in the top portion of the Texture Editor. |

The Palettes Menu on the Texture Editor

This menu provides a list of the texture palettes installed on your system. Entries for palettes that you create appear at the bottom of the menu. "Next" and "Previous" let you page through the palettes.

The Mapping Menu on the Texture Editor

You can use the pop-up mapping menu to specify the way in which a texture maps to your model. You can choose from the following options:

| | |
|---|---|
| "default" | Wraps the texture around the model. |
| "reflection" | Reflects the texture onto the surface of the model. |
| "xy plane" | Maps the texture to the xy plane and smears it across the other sides. |
| "xz plane" | Maps the texture to the xz plane and smears it across the other sides. |
| "yz plane" | Maps the texture to the yz plane and smears it across the other sides. |

The Options Menu on the Texture Editor

You can use the pop-up options menu, along with the repeat and scale thumbscrew values, to specify scaling and repetition of textures on a model. You can choose from the following options:

| | |
|---|---|
| "repeat" | Specifies the number of times you want the texture to appear on a model. Use the "Repeat X" and "Repeat Y" thumbwheels or the type-in fields to specify. |
| "clamp" | Makes the texture larger or smaller on the model without repeating it. The edge of the texture is smeared across the object instead. Use the thumbwheels labeled "Scale X" and "Scale Y" to make the texture larger or smaller. |
| "repeat x" | Repeats the texture on the x dimension of the model. Use the thumbwheel labeled "Repeat X" to display more or fewer repetitions. |
| "repeat y" | Repeats the texture on the y dimension of the model. Use the thumbwheel labeled "Repeat Y" to display more or fewer repetitions. |

The Sliders on the Texture Editor

| | |
|---|---|
| "Translate X" | Sets the position of the texture on the model horizontally. The default is centered. Use the scrollbar to move the texture from left to right. Or type the number of degrees by which you want to move it in the pink type-in field. |
| "Translate Y" | Sets the position of the texture on the model vertically. The default is centered. Use the scrollbar to move the texture from up or down. Or type the number of degrees by which you want to move it in the pink type-in field. |
| "Rotate" | Specifies whether the texture is applied in an upright position, or rotated. Use the scrollbar to rotate the texture. Or type the number of degrees by which you want to rotate it in the pink type-in field. |

Thumbwheels on the Texture Editor

| | |
|---|---|
| "Repeat X" | Sets the number of texture repetitions in the X dimension. Move the wheel to the left to display fewer repetitions; move it to the right to display more repetitions. |
| "Repeat Y" | Sets the number of texture repetitions in the Y dimension. Move the wheel to the left to display fewer repetitions; move it to the right to display more repetitions. |
| "Scale X" | Sets the value by which a texture is scaled in the X direction before it is applied to a model. A scale value of 1.0 maps the texture so it just fits the surface. A value less than 1.0. |

*Chapter 5*
Adding Lights and Fog to a Scene

This chapter tells you how you can add lighting and fog to your scenes using the Light and Environment editors.

Using Lights in a Scene

Ricochet allows you to add lights to your scene to enhance the appearance of models. You can assign color, location, intensity, and direction to the lights to increase their effect.

Choosing Lights

You can add any combination of the following light sources to a scene:

Spot Light
A spot light illuminates from a point along a primary direction. Its illumination is a cone of light diverging from the light's location. Spot lights have two characteristics that Ricochet allows you to set. These are:

- Drop off. This is the rate at which light intensity drops off.
- Cut off. This is the angle outside of which the light intensity is 0.0.

Directional Light
A directional light is infinitely far away (has no location) and illuminates uniformly along a particular direction.

Point Light
A point light has a location in space and radiates light equally in all directions from this location; it has no direction.

Ricochet uses icons to represent the optional light sources in a scene. You can hide or show these icons when you display a scene. Figure 5–1 shows a Ricochet scene with a three light sources. In this figure,

- the blue icon represents a blue directional light.
- the yellow icon represents a yellow point light.
- the magenta icon represents a magenta spot light.

Scale Y  Sets the value by which a texture is scaled in the Y direction before it is applied to a model. A scale value of 1.0 maps the texture so it just fits the surface. A value less than 1.0.

Creating a Custom Texture Palette

To create a custom texture palette, follow these steps:

1. Select a model in your Ricochet scene for which you want to create a custom texture palette.
2. Choose "Texture" from the Appearance Menu or click the button that's shown in Figure 4–7.

The Texture Editor appears.
3. Choose "New" from the File menu on the Texture Editor. Figure 4–8 shows the Texture Editor.

A dialog box appears.
4. Enter a name for the palette you're creating, then click the *OK* button.
5. The Texture Editor changes. The title bar displays the name of the new palette. The box of palettes is empty and the cursor appears as a red square.
6. Click the left mouse button. The square becomes darker red.
7. Choose "Import" from the Edit menu.

The file browser appears.
8. Browse through the directory structure until you find the name of the file containing the image for your new texture, then click the left mouse button.

The selected file is highlighted in black.
9. Click the *OK* button.

The new texture appears in the red square on the palette. If you open the Palettes menu, you'll see the name of the texture you created at the bottom of the list.

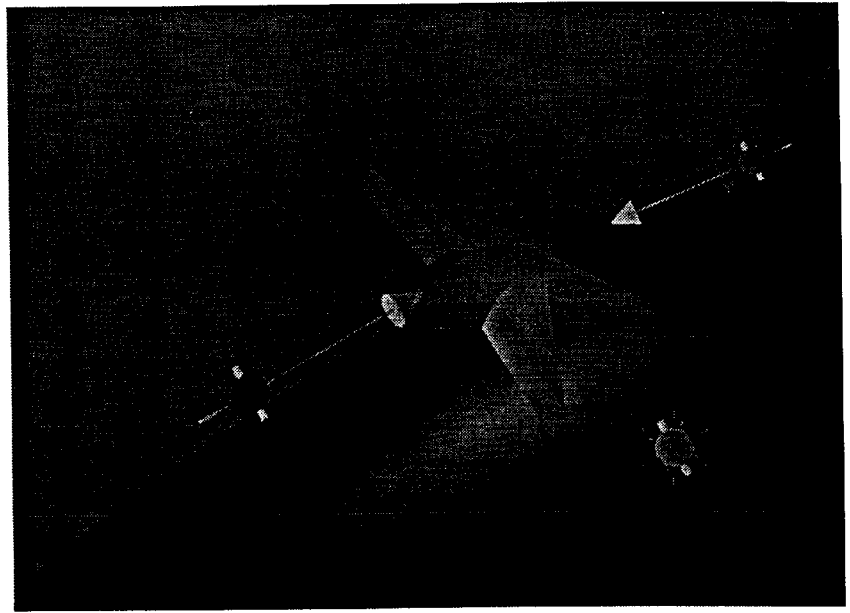

Figure 5-1 A Ricochet Scene with Light Icons

In addition to the optional light sources, all scenes have a headlight that you can turn on or off. A headlight is a light that illuminates a scene from the point at which the camera views the scene. It is thus a moveable light that moves automatically as you use the Viewer tool to change the view point of the scene. Unlike the optional lights, which can have any color, the headlight always provides white light. There is no icon associated with a headlight. In the scene shown in Figure 5-1, the headlight is turned off to make the effect of the light sources more obvious

Using the Light Editor

The predefined stages provided by Ricochet contain lighting that is centered on the drop zone. You may find this lighting suitable for your scene or you may wish to define your own lighting. The Light Editor allows you define lighting and turn lights on and off. Open the Light Editor by selecting the "Lighting" command on the Appearance menu or by clicking on the Ricochet toolbar button shown in Figure 5-2.

Figure 5-2 The Button You Click to Open the Light Editor

The window that appears when you open the Light Editor allows you to place lights in either a custom scene or a stage, and to customize those lights to achieve your lighting needs. Figure 5-3 shows the Light Editor.
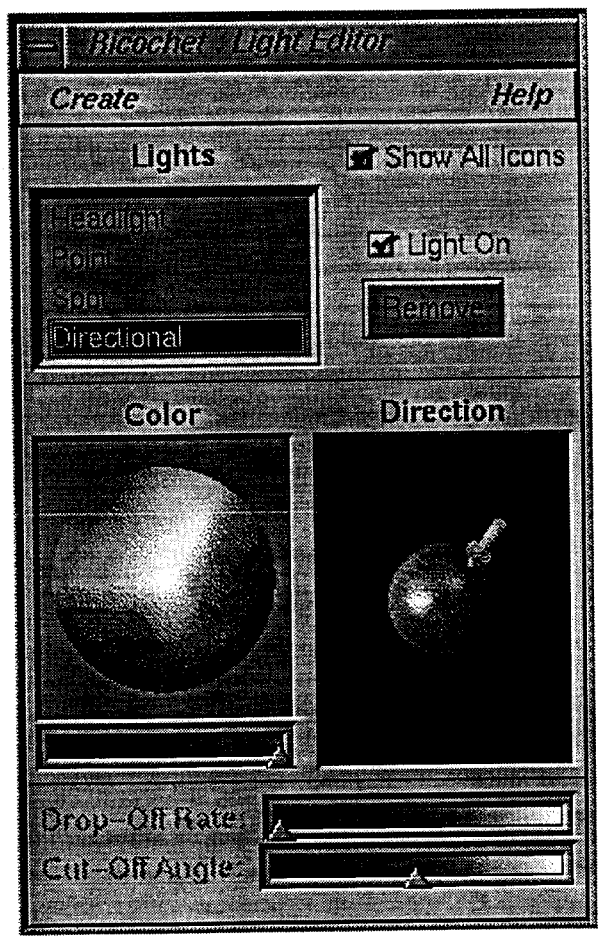
Figure 5-3 Lighting Editor
You can use the Light Editor for:
- "Creating and Removing Lights"
- "Viewing Light Icons in the Ricochet Display"

- "Turning Lights On and Off"
- "Moving a Light"
- "Changing the Color of a Light"
- "Setting Special Parameters for Spot Lights"

Creating and Removing Lights

The pull-down menu for the "Create" command allows you to create lights.

- Point Light—creates a point light in your scene.
- Directional Light—creates a directional light in your scene.
- Spot Light—creates a spotlight in your scene.

You can remove a light from a scene by selecting it in the list of lights, then clicking the Remove button. This removes the light and its icon from the scene and the entry for the light from the list of lights.

Viewing Light Icons in the Ricochet Display

You can view light icons in the display area of the Ricochet window. To show the icons, click the box next to Show All Icons in the Light Editor window. A red checkmark appears in the box. To hide light icons, click on the box next to Show All Icons. The red checkmark disappears.

Turning Lights On and Off

The Light Editor window contains a list of the lights in the scene currently displayed. When you create a new light, it appears in this list, identified by its type. Click on an entry in this list to select a light.

To turn a light on or off, select the light from the list of lights; then click the Light On box next to the list of lights. A red checkmark appears when the light is turned on. When a light is turned off, it remains in the list of lights and in the scene but provides no illumination. If Show All Icons is selected, the icon for the light disappears from the display.

The headlight, which is part of every scene, appears at the top of the list of lights. You cannot remove it. You can turn the headlight on and off by clicking the Headlight command on the Examiner Viewer pop-up menu or by selecting Headlight in the list of lights and then clicking the Light On button.

Moving a Light

The icons that represent light sources in a scene contain components you can select to change the direction or location of a light. Figure 5–4 shows the icons for a directional light (blue) and a spot light (magenta).

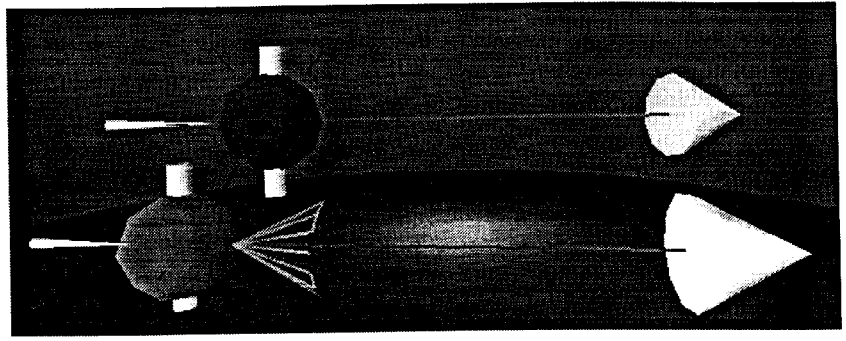

Figure 5-4 Spot Light and Directional Light Icons

To use these components of the light icon:

- click on the head or shaft of the arrow and then drag the cursor to change the direction of the light. You can also change the direction of the light by clicking on the icon in the Direction box of the Light Editor and then moving the cursor.

- click on the sphere at the end of the directional arrow and then drag the cursor to move the light in a plane perpendicular to the direction of the light. Pressing *Alt* when the mouse is over this sphere allows you to cycle through the three different planes. Pressing *Shift* before moving the light restricts the motion in one of the directions.

- click on the cylindrical shapes protruding from the sphere and then drag the cursor to move the light in a direction perpendicular to the direction of the light. When you click on one of these cylindrical shapes, a purple line appears to indicate the direction you can move the light.

Changing the Color of a Light

To change the color of a light, select the light from the list of lights. Then place the cursor on the selection box in the color wheel contained in the Light Editor. Move the cursor around the color wheel until you find the color you want. The light icon for the light you've selected changes color as you move the cursor. The illumination from the light appears immediately in the scene as you move about the color wheel.

You can change the color of the headlight by selecting it in the list of lights and using the color wheel to select its new color.

Setting Special Parameters for Spot Lights

You can use the Drop Off Rate and Cut Off Angle sliders at the bottom of the Light Editor to control illumination from spot lights.

The cut off angle (the angle outside of which there is no light) is represented on the light icon by a conical shape on the shaft of the directional arrow (See Figure 5-4). You can select this conical shape and move the cursor to change the cut off angle. You can also use the CutOff Angle slider at the bottom of the Light Editor to achieve the same result.

You can use the DropOff Rate slider at the bottom of the Light Editor to change the drop off rate (the rate at which light intensity drops off).

Environment Editor

You can add atmospheric effects to your Ricochet scene. These effects, grouped under the term fog, allow you to simulate fog, haze, pollution, and smoke. The differences between various effects result from the color and density of the atmosphere you add to the scene.

The Environment Editor allows you to:

- turn fog on and off
- select the density of the fog
- select the color of the fog Choose "Environment" on the Appearance menu to invoke the Environment Editor. Figure 5-5 shows the Environment Editor.

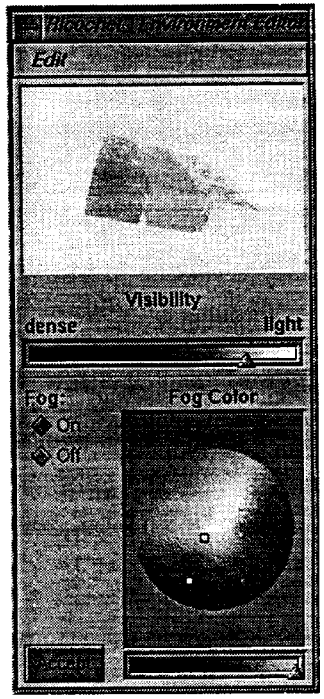

Figure 5-5 Environment Editor

To add fog to your scene:

- Use the On and Off Fog buttons to turn fog on and off.
- Set the density of the fog by moving the Visibility slider.
- Set the color of the fog by moving the selection box within the color wheel. The slider below the color wheel allows you to select a color in the range between black and the color chosen with the selection box.

The display area at the top of the Environment Editor window shows the effects of the fog color and density you've chosen. This display area contains an 3D object with red, green, and white components. You can use the Viewer tool to move this object around to determine the effect of the fog on those three colors, and also on objects at different distances from the scene viewer.

Figure 5-6 shows a Ricochet scene with no atmospheric effects. Figure 5-7 shows the same scene after a blue fog of light visibility is added to the scene.

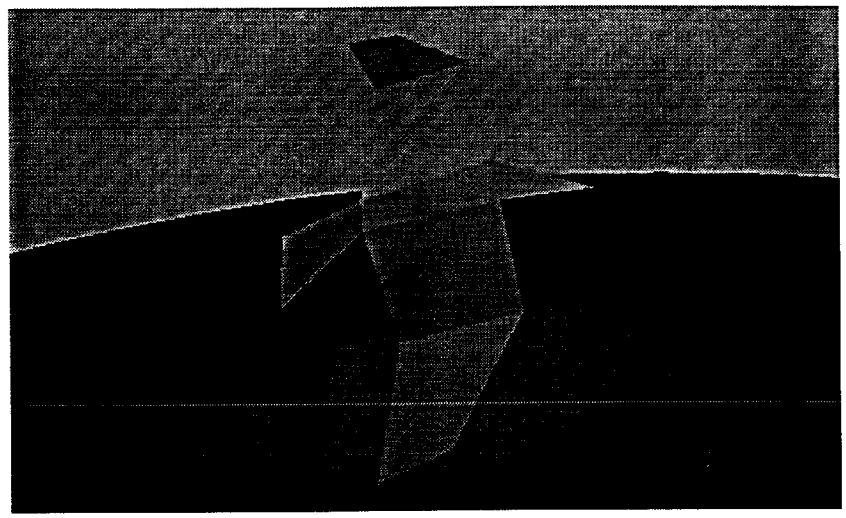

Figure 5-6 A Ricochet Scene with no Fog

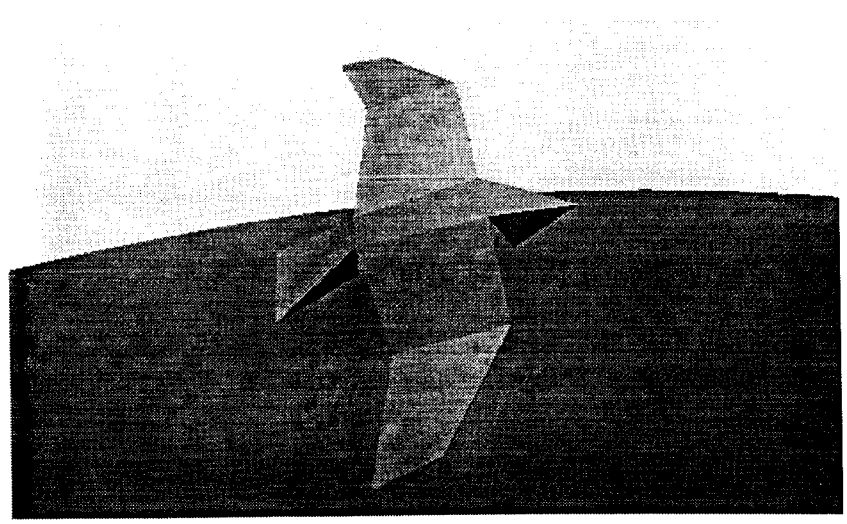
Figure 5-7 A Ricochet Scene With Fog

*Chapter 6*
Rendering a View

After you've created a Ricochet scene, you can render one or more views of this scene. You can either select a view point and produce a single rendered image from this view point or you can define a camera path in the scene and render views along this camera path to produce a movie. This chapter tells you how to produce a single rendered image. Chapter 7, "Defining a Camera Path," tells you how to define a camera path and Chapter 8, "Making Movies,"tells you how to make a movie.

The Render Options Dialog

You can use the "Begin Rendering" command on the Render menu or the Begin Rendering button to initiate the rendering of a Ricochet view. When you use one of these methods to initiate rendering, a Render Options dialog box appears that allows you to specify render options. See Figure 6-1.

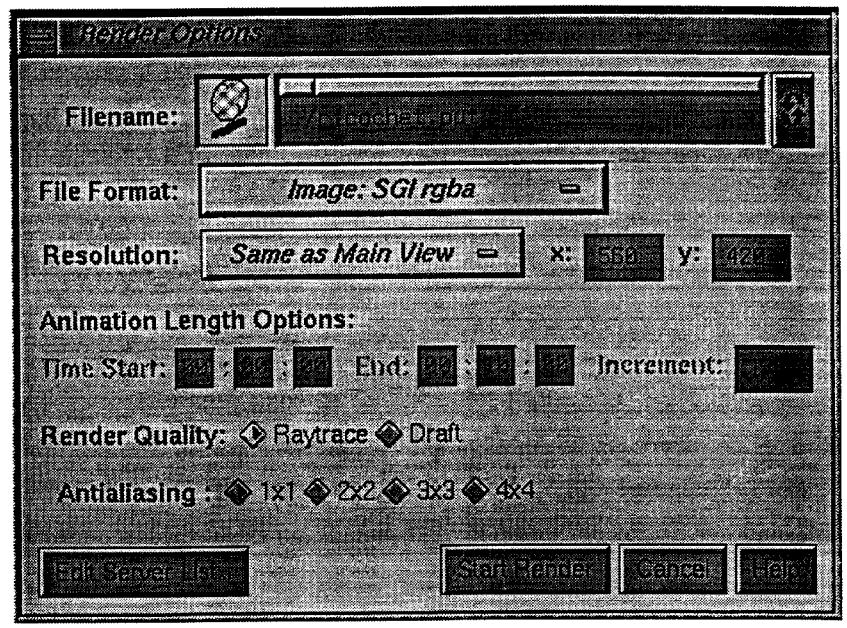

Figure 6-1 Render Options Window

The Filename field in this window allows you to specify the name of the file into which Ricochet stores the rendered image or images. The default action is to store the rendered output in a file named *ricochet.out* in the current directory.

Ricochet User's Guide – Chapter 6, Rendering a View – 1

The File Format field determines whether Ricochet renders a single view of the scene or a series of views along a camera path (a movie). To render a single view, specify *SGI/rgb* in this field.

The Render Quality field determines the type of rendering Ricochet performs. You can choose either Draft or Raytrace rendering; the default is Raytrace.

Click the Start Render button in the Render Options window to start the rendering process. As rendering starts, a renderpanel window appears on the screen. This window shows the tiles of the rendered image one by one as Ricochet computes them. See Figure 6–2.

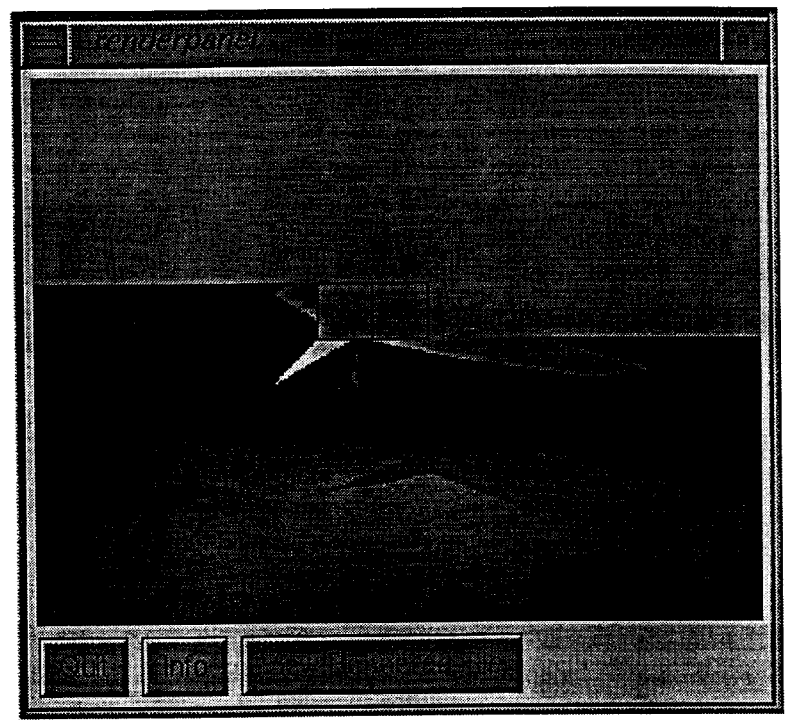

Figure 6–2 The renderpanel

You can click on the *Quit* button to abort the rendering process. When rendering runs to completion, the View Rendered File button becomes active. Click on this button to view the actual rendered file.

Figure 6–3 shows a Ricochet view that is to be rendered. It contains a single model and a stage with one model and several spotlights.

Ricochet User's Guide – Chapter 6, Rendering a View – 2

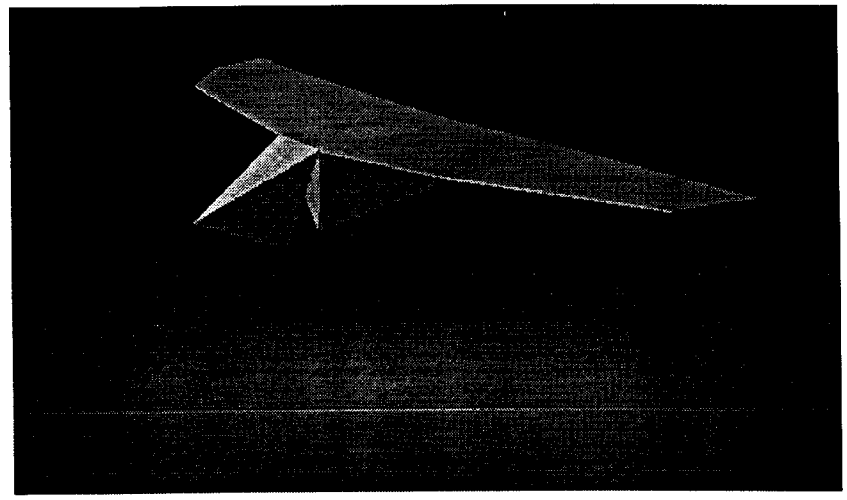
Figure 6–3 A Scene to be Rendered
Figure 6–4 shows a Ricochet scene after rendering by a ray tracing renderer.
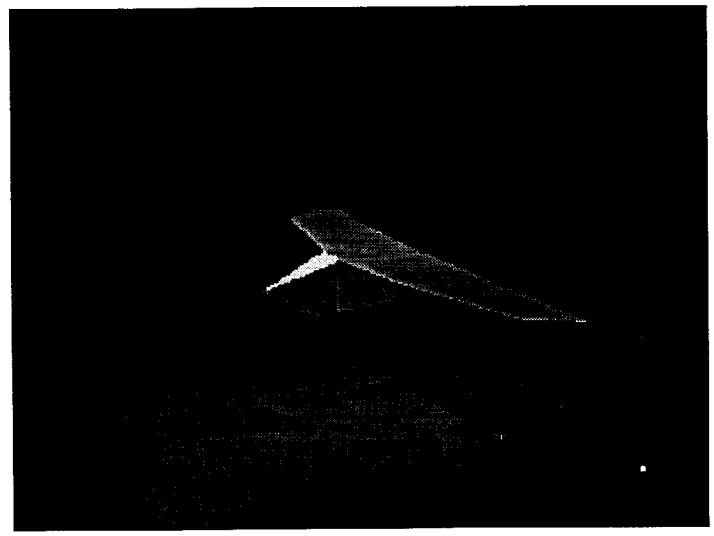
Ricochet User's Guide – Chapter 6, Rendering a View – 3

Figure 6-4 A Rendered View of a Ricochet Scene

Editing the Server List

Coming later

Chapter 7
Defining a Camera Path

Previous chapters of this User's Guide tell you how to compose a Ricochet scene and how to render a single view of that scene. Instead of rendering a single view, you may want to define a camera path through the scene and then make a movie of rendered views taken at points along this camera path. This chapter tells you how to create a camera path for your scene and how to preview the views from this path as you are creating it. Chapter 8, "Making Movies,"tells you how to make a movie from views along this path and how to view the movie once you've created it.

What's a Camera Path?

A camera path is a series of connected viewpoints in a Ricochet scene. After you define a camera path, you can view the scene from the perspective of a camera moving along the camera path from one point to another.

You can include a camera path in your scene in one of these ways:

- Use the camera path contained in a predefined Stage. Each predefined stage that you receive with Ricochet contains a camera path. This path provides views of the contents of the drop zone. You may find this camera path is suitable for your application.

- Modify the Camera Path in a Predefined Stage. After viewing an animation of your scene using the camera path in the stage you've chosen, you may want to make modifications to the path to tailor it to some unique characteristics of your model. You can use the Camera Path Editor to make these modifications.

- Create a totally new camera path. Your first step in creating a new camera path is to use the Examiner Viewer tool to position the model at the sequence of view points you would like in your movie. Use the Extend Camera Path button on the Ricochet Camera toolbar or the "Extend Camera Path" command on the Camera menu to record each of these points. Figure 7-1 shows the Add Camera Path Control Point button. The number next to the icon tells you how many viewpoints the camera path currently contains.

Figure 7-1 Extend Camera Path Button

If you would like to fine tune the camera path once you've created it, the Camera Editor allows you to do this.

When Ricochet constructs a camera path from connected camera points, it determines the length of time needed to play the animation of the path. You can alter the speed with which the animation plays by specifying points along the path at which pauses should occur, or a time along the camera path that a specified camera path point should be reached. Ricochet speeds up or slows down its animation to reach these points at the specified time. You can also alter the time of an animation by specifying a new time for the length of the animation. "Using the Camera Path Editor" tells you how to do this.

Figure 7-2 shows a Ricochet scene for which a camera path is defined. You can't see the camera path when you view the scene in the Ricochet display area.

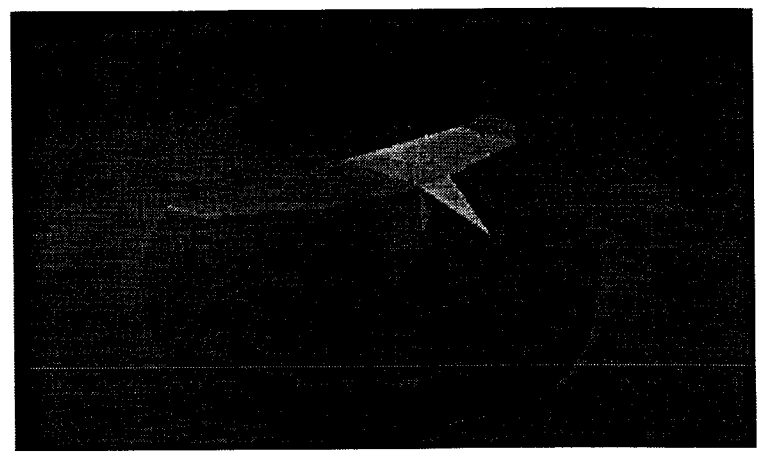

Figure 7-2 A Ricochet Scene with a Camera Path Definition

Figure 7-3 shows a graphical representation of the camera path that is part of the scene shown inFigure 7-2. This view of the camera path, as seen from the top of the scene, was produced by the Camera Path Editor.

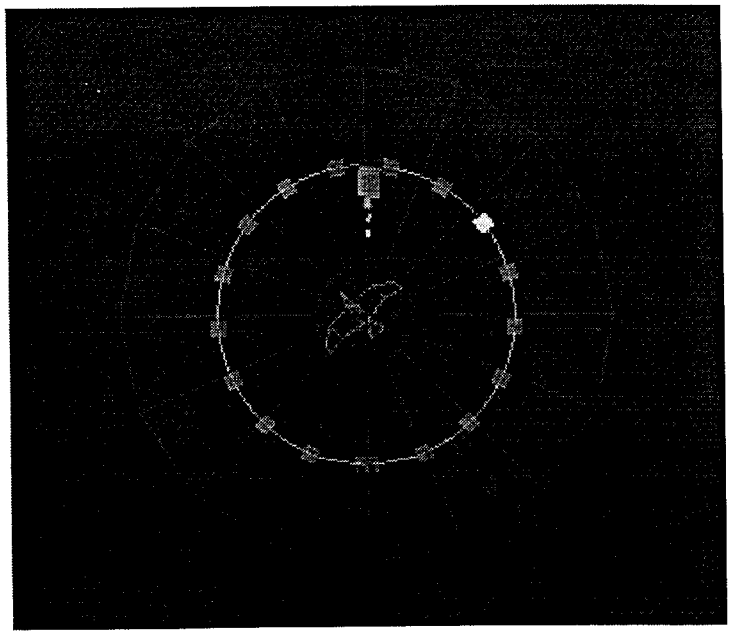

Figure 7-3 A Camera Path

The elements of the camera path graphic, as shown in Figure 7-3, are described below:

- Models that are part of the stage or the scene are shown in wireframe form. In the figure above, the models are the bird that is part of the scene and the pedestal and disk that are part of the stage.
- The camera path is represented by the white, circular line that surrounds the model in the scene.
- The camera icon is a white, camera-like figure that moves around the camera path as you view the animation of the scene. It points in the direction from which each view is taken.
- The camera points that define the camera path are represented by blue icons. The dark blue lines protruding from each blue icon indicate the direction from which the view is taken at that point. Unless you specify otherwise, the camera points toward the drop zone. When you move the cursor over a camera point, the blue icon turns white and Ricochet displays the time in the animation when the point is reached.
- A time tick is a point on a camera path (other than a camera point) that has a time associated with it. This time determines when the camera reaches that point as the camera path is traversed. The Camera Editor represents time ticks by red bars on the camera path. In Figure 7-3, two of the time ticks define the start and end of the camera path. Camera point icons and time ticks on the camera path turn yellow when you select them.

Ricochet User's Guide – Chapter 7, Defining a Camera Path – 3

- Pause ticks represent a point in the camera path when a pause in the animation occurs. They are represented by a red bar with a bulb on the end. Figure 7–3 shows a pause tick.
- Single viewpoints in a scene are represented by green icons. You can add single viewpoints to a scene from the Ricochet window by using the "Create Viewpoint" command on the Camera menu or the Add Viewpoint button on the Camera toolbar. Figure 7–4 shows the Add Viewpoint button.

Figure 7–4 The Add Viewpoint Button

Double click on a green icon to display the scene from that viewpoint in the Ricochet display area.

Using the Camera Path Editor

You can use the Camera Path Editor to modify points on a camera path or to play an animation of the scene. To open the Camera Path Editor, select the "Open Camera Editor" command on the Camera menu or click the Open Camera Path Editor button on the Ricochet menu (see Figure 7–5).

Figure 7–5 The Button You Click to Open the Camera Path Editor

The Camera Editor contains a graphical representation of the current camera path in addition to menus, toolbars, and buttons you can use to create and modify a camera path. Figure 7–6 shows the Camera Path Editor.

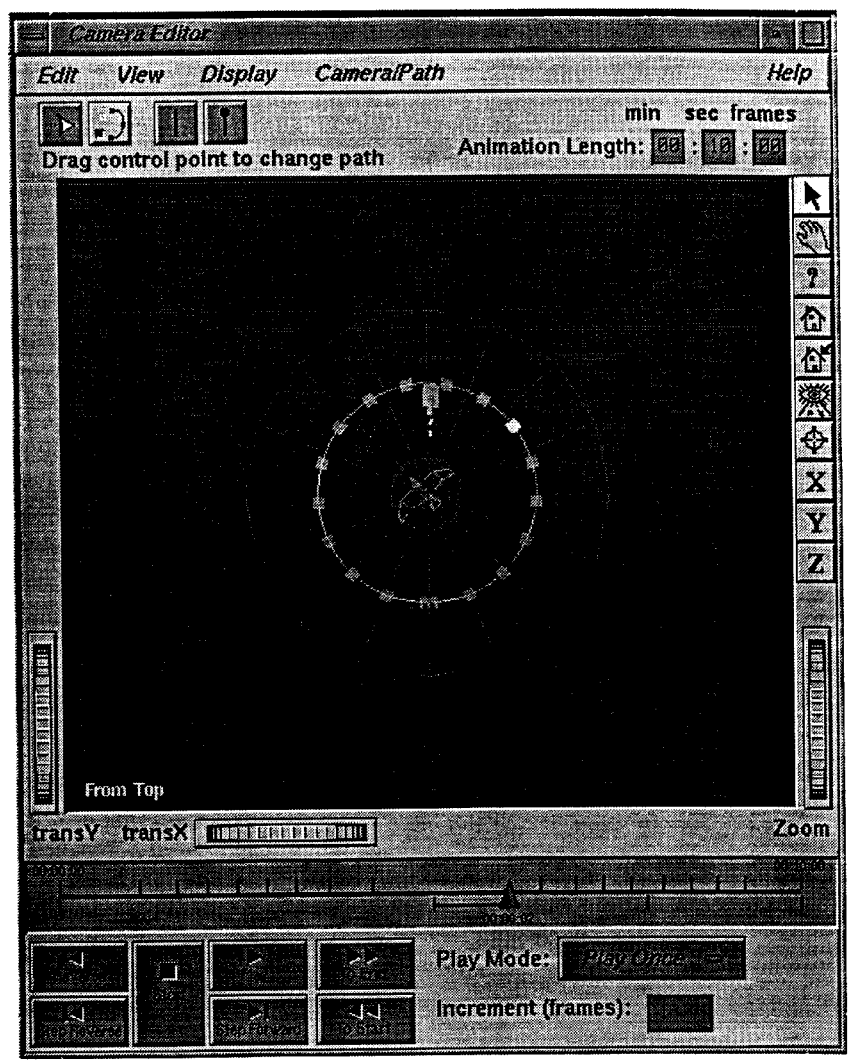
Figure 7-6 The Camera Path Editor
Camera Path Editor Menus
The Camera Path Editor window contains menus that allow you to modify a camera path and control the
Ricochet User's Guide – Chapter 7, Defining a Camera Path – 5 view of the camera path. The following sections describe these menus.

Edit Menu

- Delete—delete the selected camera point or viewpoint.
- Delete path and points—deletes a camera path and all points on it.
- Remove points from camera path—removes all points on a camera path.
- Select all path points—selects all points on the camera path.
- Edit tick times—allows you to edit the time at which a time tick or pause tick occurs in the animation.

To edit a tick time, first click on the time tick icon on the camera path, then select "Edit Tick Times" on the Edit menu. A dialog window appears, in which you can enter the new tick time (seeFigure 7–7). Choose a time that is within the range specified in the dialog box.

Figure 7-7 Time Tick Dialog Window

To edit a pause tick, first click on the pause tick icon on the camera path, then select "Edit Tick Times" on the Edit menu. A dialog window appears, in which you can enter the time the pause is to occur in the scene animation and also the length of the pause. Figure 7–8 shows the Pause Tick dialog window. Choose times that are within the ranges specified in the dialog box.

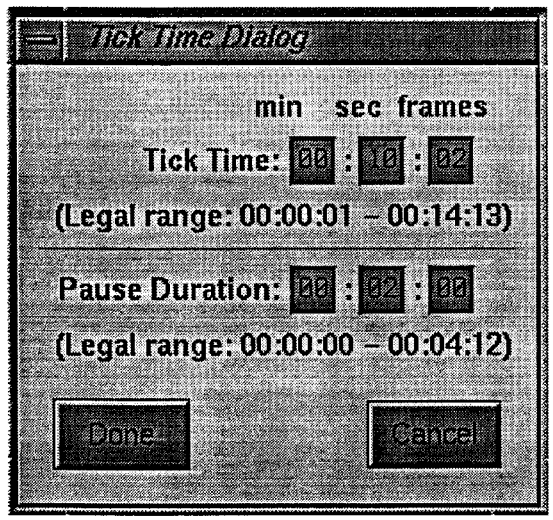

Figure 7-8 Pause Tick Dialog Window

View Menu

- View the camera path from the top, bottom, left, right, front, or back of the scene.

Display

- Viewpoints—Display the points created by "Create Viewpoint" on the camera menu or the Add Viewpoint icon on the Ricochet menu; these points are represented by green icons on the Camera Editor display.
- Time ticks—Display the time ticks (red bars) on the Camera Editor display.
- Look-At Points—Display the look-at points on the Camera Editor display. Look-at-points show the direction the camera points when the view of the scene is taken. Look-at-points are represented by dark blue lines that protrude from the blue camera point icons.

Camera/Path

- Append New Point to Camera Path—Select this menu item, then place the cursor at a point on the camera path and click to place a new point at this location
- Add Timing Tick to Camera Path—Click on this command, then place the cursor at a point on the camera path and click to place a timing tick at this location.
- Add Pause Tick to Camera Path—Click on this command, then place the cursor at a point on the camera path and click to place a pause tick at this location.

- Create New Viewpoint—Click on this command, then place the cursor at a point on the camera path and click to place a new viewpoint at this location.
- Reverse Camera Path—Use this command to traverse the camera path from end to beginning rather than from beginning to end.
- Lock Selected Control Point to Camera—?

Camera Path Editor Tools

Toolbar Icons

Figure 7-9 shows the icons that appear on the Camera Editor toolbar.

Figure 7-9 Camera Editor Toolbar Icons

The functions these icons perform are (from left to right):

- Create Viewpoint—Use this button to create a view point anywhere in the scene. You can view the Ricochet scene from this point by clicking on the green icon that represents the view point.
- Extend Camera Path adds point to the at beginning of the camera path. When you are in add-to-path mode, this button changes to Leave Add-to-Path Mode. Click on this button to leave the add-to-path mode.
- Create Timing Tick—After clicking this button, you can click at a point on the camera path to place a timing tick there.
- Create Pause Tick—After clicking this button, you can click at a point on the camera path to place a pause tick at this point. The default length of a pause is 1 second. You can use "Edit Tick Times" on the Edit menu to change the length of the pause.

The Scrub Bar

The scrub bar is the horizontal line shown below the camera path display in the Camera Editor window (see Figure 7-10).

Figure 7-10 Scrub Bar

In the scrub bar:
- Camera Path points are represented by blue ticks above the scrub bar.

- Timing ticks are represented by red bars below the scrub bar.
- Pause ticks are represented by horizontal red lines below the scrub bar; the length of the red lines correspond to the length of the pause.

Viewing a Scene Animation

You can use the Camera Editor to play the animation of the scene defined by the camera path. When the animation is in progress:

- the display area of the Ricochet window shows the animated view of the scene.
- the display of the Camera Editor shows the position of the camera (the white icon) as it moves around the camera path.
- a gray arrow in the scrub bar moves to represent the current location of the camera within the total animation length.

Use the animation play buttons at the bottom of the Camera Path Editor window to control the play of a scene animation. Figure 7-11 shows the animation play buttons.

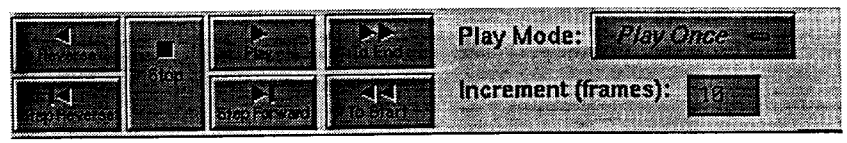

Figure 7-11 Animation Play Buttons

The animation play buttons are described below:

| | |
|---|---|
| Reverse | Reverses the direction of camera motion when a scene animation plays. |
| Step Reverse | Moves the camera in the reverse direction by the number of frames specified in Increment (frames) |
| Stop | Stops the animation play. |
| Play | Plays the scene animation. |
| Step Forward | Moves the camera forward by the number of frames specified in Increment (frames). |
| To End | Moves the camera to the end of the camera path. |
| To Start | Moves the camera to the start of the camera path. |
| Play Mode | Allows you to play an animation one of three modes: <br>• Play Once plays the animation one time from start to finish.<br>• Loop plays the animation in a continuous loop.<br>• Rock plays the animation from start to finish and then reverses direction and plays back to the start of the camera path. |
| Increment | Specifies the number of frames to increment for the Step Reverse and Step Forward |

Ricochet User's Guide – Chapter 7, Defining a Camera Path – 9 buttons.

Chapter 8
Making Movies

To create a movie of your scene, follow these steps:
1. Define a camera path for your scene
2. Fine-tune the camera path
3. Create the movie
4. Play the movie

Define a Camera Path

The first step in creating a movie is to define a camera path that specifies the scenes in the movie. You can use a predefined camera path or create a custom path tailored for your scene.

Use a Predefined Camera Path

The predefined stages provided with Ricochet each contain a camera path definition. If you decide to use one of these predefined stages, view the camera path defined in that stage. These camera paths are designed to present a comprehensive view of one or models located in the drop zone. You may find that the predefined camera path presents your scene in a suitable manner, particularly if you have not changed the drop zone significantly or moved models outside it.

Modify the Predefined Camera Path

When you play an animation of your scene using the predefined camera path, you may find this camera path is fine for your needs except for some minor adjustments. Use the Camera Editor to make the necessary adjustment. See "Fine-Tune the Camera Path."

Create a New Camera Path

If the predefined camera path is not suitable for creating a movie of your scene, use the "Delete Path and Points" command on the Camera Path Editor Edit menu to remove the camera path. Then create a new camera path of connected view points to define a camera path in your scene. To add view points to a camera path, use the:

- Add Camera Path Control Point icon on the Ricochet menu.
- "Create Connected Viewpoints" command on the ViewPoints menu.
- Add to Path at beginning or end icon in the Camera Editor window.
- "Create New Viewpoint" command on the Camera/Path menu in the Camera Editor.

Fine-Tune the Camera Path

When you have defined a camera path of connected view points, you can play an animation of the scene to determine if it needs adjustments to display your model in the way you like. Figure 8-1 shows the Ricochet User's Guide – Chapter 8, Making Movies – 1 to determine if it needs adjustments to display your model in the way you like. Figure 8-1 shows the icons on the Ricochet menu that you can use to control the viewing of scene animation.

Figure 8-1 Icons to Control Scene Animation

These icons (from top to bottom) allow you to:

- start (or restart) the animation
- stop the animation play
- play the animation in the reverse direction After viewing an animation of the scene, you may want to modify the camera path in these ways:

- Move a view point. Click on and then drag a view point (blue icon) to move it to a new location
- Remove a point from the path. Select a point on the path and press Backspace or select the "Remove Points from Camera Path" command on the Camera Editor Edit menu.
- Add a new view point. Chose the "Create New Viewpoint" command on the Camera/Path menu in the Camera Editor. Then click on the point on the camera path where you want to place the new view point.
- Include pauses. You may want to include pauses in your movie to emphasize one or more points in the scene. Choose the "Add Pause Tick to Camera Path" command on the Camera/Path menu in the Camera Editor. Then click on the point on the camera path where you want to place the pause. An icon (a yellow bar with a bulb on the end) appears on the camera path to indicate the pause location. The yellow icon turns red when you deselect it. The scrub bar shows the length of the pause as a red line (See "The Scrub Bar.")
- Use time ticks. You can use time ticks on a camera path to set the time a which the camera arrives at a specified point on the path. To add a timing tick, choose the "Add Timing Tick to Camera Path" command on the Camera/Path menu in the Camera Editor, then click on the point on the camera path at which you want the timing tick located. An icon (a yellow bar) appears on the camera path to indicate the pause location. The yellow icon turns red when you deselect it. A timing tick is represented as a vertical red line below the scrub bar.

Create a Movie

Click on the Render Scene to Screen icon to initiate rendering of a movie. Figure 8-2 shows this icon.

Ricochet User's Guide – Chapter 8, Making Movies – 2

Figure 8-2 Render Scene to Screen Icon

After you click on this icon, the Render Options window appears.

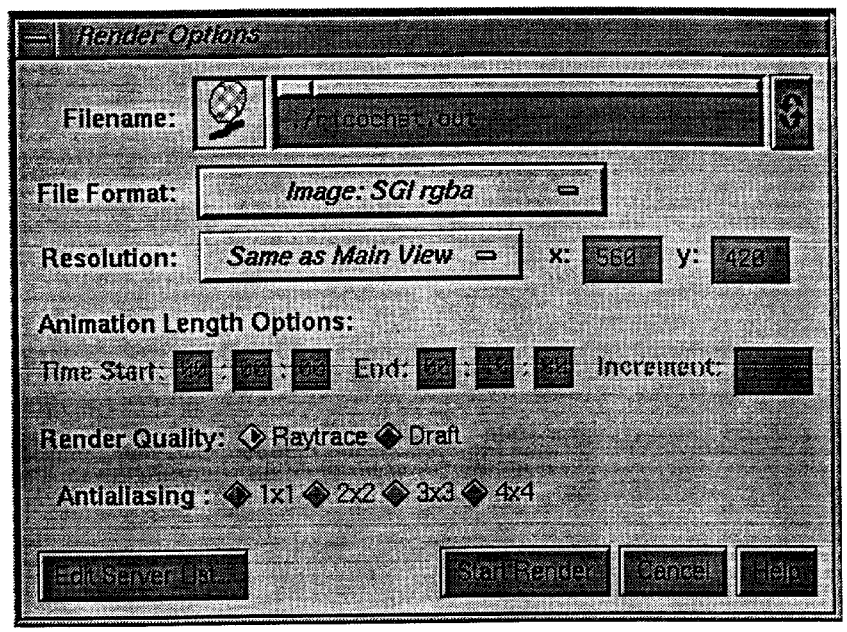

Figure 8-3 Render Options Window

This window allows you to select:

- Filename. This file contains the name of the file in which the rendered image or movie is saved. The default file is *ricochet.out*.

- File Format. This field specifies the format of the rendered file. Choose one of the following to render a movie:

- *Movie: SGI uncompressed*—
    - *Movie: MPEG-1*—
    - *Movie: QuickTime Video*—
    - *Movie: JPEG*—

- Resolution: This field allows you to choose the resolution for the rendered output.

- Animation Length Options. You can render the whole camera path or a portion of it. To render a portion of the path, specify in this field the start and stop time of the portion you want to render.

- Render Quality. You can choose either draft or Raytrace quality rendering.
- Antialiasing Click the Start Render button to start the rendering process. A renderpanel window appears that shows the tiles of the rendered view one-by-one as they are computed by Ricochet. You can abort the rendering of the movie by clicking on the *Quit* button. Figure 8–4 shows the renderpanel window.

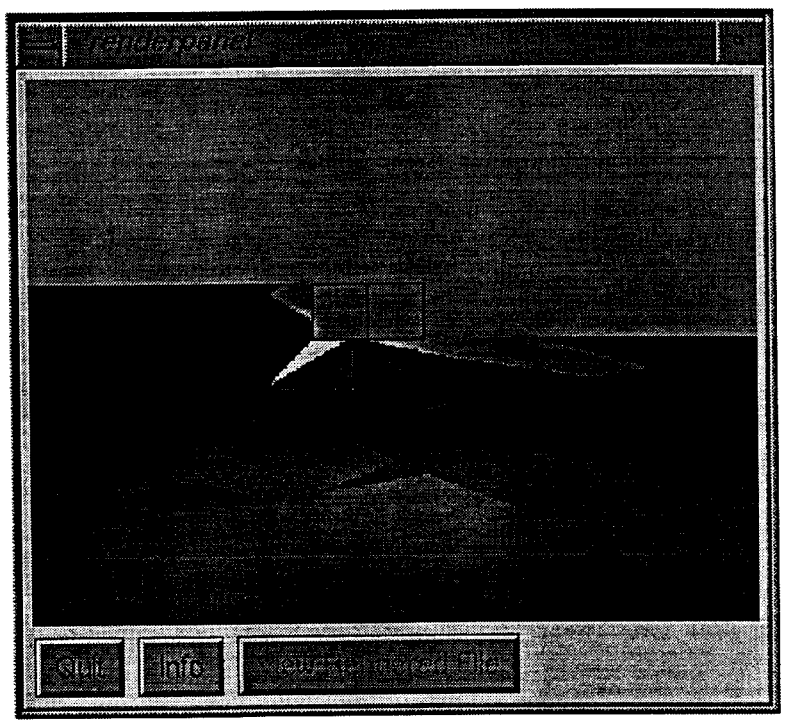

Figure 8–4 renderpanel

Play the Movie

When the movie rendering is complete, you can view the movie by clicking the View Rendered File button. Click on Quit to close the renderpanel window.

You can play the move later by:

- Using Movie Player. Type movieplayer ricochet.out

- Selecting the "View Rendered File" command on the Render menu.

Chapter 9
Using the Examiner Viewer

The Examiner Viewer allows you to interactively change the view of a Ricochet scene by click and dragging the left and middle mouse buttons in a Ricochet window, by using a set of controls represented by icons along the right border of the window, and by using thumbscrews and a slider in the lower part of the Ricochet window. In addition to these controls, a pop-up window allows you a variety of additional ways to control your view of a scene. The illustration of a Ricochet window in Figure 2-3 shows the Examiner Viewer controls.

The Examiner Viewer Toolbar

Some of the Examiner Viewer controls appear in a toolbar along the right edge of the Ricochet window. The table below shows each tool and provides a brief description of its purpose.

| Button | Purpose |
|---|---|
|  | The selection tool. Click this when you want to select an object. |
|  | The viewer tool. Click this when you want to use the cursor to change your view of the scene. |
|  | The view home tool. Click this when you want to return to the home view. |
|  | The set home tool. Click this if you want to save the current view as the home view. See also "Setting a Home View." |
|  | The view all tool. Click this button if you've imported several models into the scene and want to change the view so they are all visible. See also "Viewing All Models in a Scene." |

 The seek tool. Click this button, then click on the area of the model you want to view. The scene changes; the point you clicked on moves to the center of the viewing area. You must be in viewing mode (the hand cursor) to use this tool.

 The camera tool. Click this button to switch between the default camera and an orthographic camera. By default, Ricochet uses a perspective camera. Models that are farther away appear smaller. An orthographic camera eliminates this natural distortion. Consider using it if you want to measure parts and check their relative sizes.

Table 9-1 Viewer Controls

The Examiner Viewer Pop-Up Menu

To display the Viewer pop-up menu, place the cursor over the viewing area, then press the right mouse button. You see the following menu entries:

| | |
|---|---|
| Functions | This rollover menu contains six commands. "Home," "Set Home," "View All," and "Seek" are equivalent to buttons on the toolbar. "Copy View" and "Paste View" are useful if you have multiple viewers open. They let you copy and paste a view from one program to the other. |
| Draw Style | This rollover menu is divided into three regions.The top region contains commands that change the display of models. For instance, you can display a model as a series of points or as a bounding box only. The commands are listed from highest to lowest quality. |
| | The second region of the menu contains commands that change the way models are displayed when you interact with them. For example, a model may appear fully rendered. When you move it, however, it changes and displays as a bounding box only. This lets you interact with the models more quickly. |
| | The third region of the menu lets you control how Ricochet makes use of colors. By default, Ricochet is set to use "double buffer." This prevents you from seeing flickering when you manipulate the models. Switch to "single buffer" when you want the very best color resolution. For instance, if you want to take a screen snapshot of the model, you might want to switch to "single buffer" temporarily. The last command, "interactive buffer," lets you use a single buffer while viewing the models. When you move a model, however, Ricochet switches to double buffer temporarily. |
| "Viewing" | The "Viewing" command is equivalent to the arrow and hand buttons on the toolbar. When a checkmark appears next to the command, you are in viewing mode. The cursor resembles a hand and you can change your view of the scene. When the checkmark is absent, you are able to select models. |
| "Decoration" | The "Decoration" command lets you hide or display all of the controls that appear |

| | around the viewing area. If you choose to hide them, the toolbar, zoom controls, and rotation controls disappear. |
|---|---|
| "Headlight" | The "Headlight" command lets you turn on and off the headlight, which is a single light positioned at the camera. If you turn off the headlight, the scene may appear very dark. If you added lights when you created the original 3D file, the scene will be lit with only those lights when the headlight is off. |
| "Preferences..." | The "Preferences..." command opens a preference sheet. Use it to control various aspects of the viewing area. See "Examiner Viewer Preference Sheet." |

Examiner Viewer Preference Sheet

To display the Examiner Viewer Preference Sheet, you must have "Examiner Viewer" selected in the View menu. Place the cursor over the viewing area, press the right mouse button, and choose "Preferences...". You see the following entries:

Seek Animation Time:
: Sets the time for the seek function. Set this to 0 for instant seek.

Seek to:
: Allows two levels of accuracy for the seek function. "Seek to Point" uses the selected point and a normal surface to align the camera. "Seek to object" uses only the center of the object.

Zoom slider ranges from:
: The default setting for the zoom slider range is 1.0 to 140.0. You can adjust the minimum and maximum ranges to as low as 0 and as high as 180.

Auto clipping planes
: The "Auto clipping planes" command is on by default. Ricochet automatically sets the clipping planes for the best dynamic fit for the object on the screen. If you turn "Auto clipping planes" off, you can move the clipping planes by using the rotation thumbwheels that appear.

Stereo Viewing
: The "Stereo Viewing" command is off by default. When you select "Stereo Viewing," you change the camera rotation using the thumbwheel that appears. With stereo viewing, 3D objects appear to stick out of the monitor and you get better depth perception. Stereo viewing requires special stereo glasses and hardware.

Enable spin animation
: The "Enable spin animation" command is on by default. This feature lets the model continue spinning after you release the mouse button. Select the Viewer tool, press down the left mouse button and drag the cursor in the direction you want to spin. Release the mouse button while still dragging the mouse, and the model continues spinning. To stop the spinning, click the left or middle mouse button anywhere.

Show point of rotation axes
: The "Show point of rotation axes" is off by default. This shows the point about which the camera rotates. When you turn it on, you can also change the size of the axes using the thumbwheel that appears.

Examiner Viewer Thumbwheels and Slider

The Examiner Viewer thumbwheels and slider in the lower part of the Ricochet window provide additional means to control your view of a scene.

Examiner Viewer Rotation Thumbwheels

The rotation thumbwheels appear in the lower left corner of the window. Use the thumbwheel labeled "Rotx" to rotate the scene around the horizontal axis; use the thumbwheel labeled "Roty" to rotate around the vertical axis.

The Zoom Slider and Dolly Thumbwheel

If you want a closer view of the models you're viewing, you can use the Zoom slider or the Dolly thumbwheel. Similarly, you can use these controls if you want to view the models from a distance.

When you use the Dolly thumbwheel, you move the camera closer to or farther from the models. Drag the thumbwheel up to make the models appear smaller; drag the thumbwheel down to make the models appear larger.

Using the Zoom slider is comparable to changing the lens on a camera. The models appear smaller or larger because the viewing angle of the lens is different. Move the slider to the left, and the models appear larger. Move the slider to the right, and the models appear smaller.

Chapter 10
Ricochet Menus and Toolbars

This chapter contains descriptions of Ricochet's menus, toolbars, and keyboard shortcuts. You'll find these sections:

- "The File Menu"
- "The Edit Menu"
- "The View Menu"
- "Stages Menu"
- "Render Menu"
- "The Appearance Menu"
- "Keyboard Shortcuts"

The File Menu

The commands on the File menu allow you to read the contents of a file into a scene, to save components of a scene to a file, to clear a scene, and to quit Ricochet. This section describes each command.

- "The "New" Command"
- "The "Open" Command"
- "The "Import Model..." and "Import Into Stage..." Commands"
- "The "Insert Stage..." and "Replace Stage..." Commands"
- "The "Save All" Command"
- "The "Save All As..." Command"
- "The "Save Stage" Command"
- "The "Save Stage As..." Command"
- "The "About" Command"
- "The "Quit" Command"

The "New" Command

The "New" command clears the scene you're working on and removes the stage. If you have changed this scene, a dialog box pops up asking if you want to save the changes before clearing the scene. To save the changes, click *Save*; to erase the changes, click *Discard*; to cancel the operation, click *Cancel*.

Shortcut: <Ctrl>-n

The "Open" Command

The "Open" command opens an existing Ricochet file and replaces the current Ricochet scene, including its stage, with the scene in the specified file. If you have changed the scene you're working on, a dialog box pops up asking if you want to save the changes before loading the new scene. To save the changes click *Save*; to erase them click *Discard*; to cancel the operation, click *Cancel*.

Shortcut: `<Ctrl>-o`

The "Import Model..." and "Import Into Stage..." Commands

The "Import Model..." command appears on the FIle menu when you are editing a scene. It lets you import Open Inventor models into an existing scene. Use the file browser dialog box that appears when you choose "Import Model..." to select the file containing the model.

Shortcut: <Ctrl>-i

The "Import Into Stage..." command appears on the File menu when you are editing a stage. It allows you to import Open Inventor models into a stage. Use the file browser dialog box that appears when you choose "Import Into Stage..." to select the file containing the model.

Shortcut: `<Ctrl>-i`

The "Insert Stage..." and "Replace Stage..." Commands

The "Insert Stage..." command appears on the File menu when your scene has no stage. It lets you insert a stage into the scene. The "Replace Stage..." command appears when your scene already has a stage. It allows you to replace the existing stage with a new one.

Use the file browser dialog box that appears when you choose "Insert Stage..." or "Replace Stage..." to select the file containing the stage.

The "Save All" Command

The "Save All" command saves both the stage and the custom part of the existing Ricochet scene. Use the file browser dialog box that appears when you choose "Save All" to specify the file into which the scene is to be saved.

Shortcut: <Ctrl>-S

The "Save All As..." Command

The "Save All As..." command lets you save both the stage and custom part of a scene in a file using a new name. Use the file browser dialog box that appears when you choose "Save All As..." to specify the file into which the scene is to be saved.

Shortcut: <Shift>-<Ctrl>-S

The "Save Stage" Command

The "Save Stage" command lets you save just the stage part of the current scene. Use the file browser dialog box that appears when you choose "Save Stage" to specify the file into which the stage is to be saved.

The "Save Stage As..." Command

The "Save Stage As..." command lets you save the stage part of the existing scene in a new file. Use the file browser dialog box that appears when you choose "Save Stage As" to specify the file into which the stage is to be saved.

The "About" Command

The "About" command ...

The "Quit" Command

The "Quit" command closes the file you're working on and quits from Ricochet. If you have changed the scene you're working on, a dialog box pops up asking if you want to save the changes before quitting. To save the changes, click *Save*; to erase them, click *Discard*; to cancel the operation, click *Cancel*.

Shortcut: <Ctrl>-Q

The Edit Menu

The Edit menu contains the following commands:

- "The "Undo" Command"
- "The "Redo" Command"
- "The "Cut" Command"
- "The "Copy" Command"
- "The "Paste" Command"
- "The "Delete" Command"
- "The "Select Highest" and "Select Lowest" Commands"
- "The "Select Parent" and "Select Child" Commands"
- "The "Background Color..." Command"

The "Undo" Command

The "Undo" command lets you undo the changes you make. For example, if you delete a model and then decide you want to use that model, you can select "Undo" to restore the model. You can choose "Undo" multiple times to reverse a sequence of changes.

Most actions can be reversed using the "Undo" command. However, the list of actions you can undo is purged once you save a file or open a new file.

Shortcut: <Ctrl>-z

The "Redo" Command

The "Redo" command works with the "Undo" command to reverse the effect of the "Undo". For example, if you delete a model and then choose "Undo" to restore the model, selecting "Redo" causes the model to disappear again.

Shortcut: <Ctrl>-<Shift>-z

The "Cut" Command

The "Cut" command removes the selected model and places it in a buffer. Use the "Paste" command to

The "Cut" command removes the selected model and places it in a buffer. Use the "Paste" command to restore objects that you've cut from the scene.

Shortcut: `<Ctrl>-x`

The "Copy" Command

The "Copy" command makes a copy of the selected model and places the copy in a buffer. Use the "Paste" command to paste the copy into the scene.

Shortcut: `<Ctrl>-c`

The "Paste" Command

Choose the "Paste" command after you've used the "Cut" or "Copy" command. If you choose "Paste" after cutting or copying a model, a wireframe version of the model appears when you place your cursor in the viewing area. Drag and click the cursor to place the model.

Shortcut: `<Ctrl>-v`

The "Delete" Command

The "Delete" command lets you delete the selected model. See "Deleting Models" for details.

Shortcut: `<Backspace>`

The "Select Highest" and "Select Lowest" Commands

Many 3D models are constructed from a hierarchy of smaller shapes or building blocks. By default, when you click the left mouse button, you select the entire model, not one of its building blocks. To select the highest or lowest building block automatically, without traversing the hierarchy of the model, use the "Pick Highest" and "Pick Lowest" commands. To select the building blocks between the lowest and the highest, use the "Select Parent" and "Select Child" commands.

For example, suppose you have a model of a car with a door handle as one of the smallest shapes in the model. By default, when you click on the door handle, you select the entire car. If you choose "Pick Lowest" and then click on the handle, the handle is selected.

Choose "Pick Lowest" and the lowest building block in the hierarchy is selected, for example, the door handle. Choose "Pick Highest" again and the entire car is selected.

See also "Selecting a Portion of a Model."

The "Select Parent" and "Select Child" Commands

Many 3D models are constructed from a hierarchy of smaller shapes or building blocks. By default, when you click the left mouse button, you select the entire model, not one of its building blocks. Use the "Select Child" command to traverse the hierarchy of shapes from largest to smallest shape.

When the shape currently selected is one of the smaller shapes in the hierarchy, use the "Select Child" command to move up the hierarchy to successively larger shapes.

For example, suppose you have a model of a car with a door handle as one of the smallest shapes in the

Ricochet User's Guide – Chapter 10, Ricochet Menus and Toolbars – 4 model. By default, when you click on the door handle, you select the entire car. If you choose "Select Child" repeatedly, you move down the hierarchy until the door handle is selected...

See also "Selecting a Portion of a Model."

The "Background Color..." Command

By default, the background color of the Ricochet display area is black. To change to a different color, use the "Background Color..." command. This opens a Color Editor from which you can choose a new color. For step-by-step instructions, see "Changing the Background Color."

Note: This background color gets saved with the document.

The View Menu

The View commands allow you to control the view of a scene that appears in a Ricochet window. You can vary the angle from which you view the scene, center the window at different parts of the scene, change the background color of the scene, hide various components of the scene, and vary the camera lens through which you view the scene. For details, see:

- "The "View All" Command"
- "The "View Selection" Command"
- "The "View Home" Command"
- "The "Set Home" Command"
- "The Viewing Direction Commands"
- "The Lens Commands"
- "The Resolution Commands"
- "The "Display Drop Zone" Command"
- "The "Nice Transparency" Command"

The "View All" Command

The "View All" command changes the view so the entire scene is centered in the viewing area. Choosing this command is equivalent to clicking the View All tool in the Examiner Viewer toolbar. See Figure 10-1.

Figure 10-1 The View All Tool

The "View Selection" Command

The "View Selection" command changes the view so the selected model is at the center of the viewing area.

The "View Home" Command

The "View Home" command lets you return to a particular view. By default, the home view is equivalent to the initial view when you opened the file. To create a custom view, use the "Set Home" command.

This command is equivalent to the button shown in Figure 10-2.

Figure 10-2 The View Home Button

The "Set Home" Command

The "Set Home" command lets you choose a custom view and easily return to it using the "View Home" command. See also "Setting a Home View."

This command is equivalent to the button shown in Figure 10-3.

Figure 10-3 The Set Home Button

The Viewing Direction Commands

The viewing direction commands allow you to view a scene from six directions;—the front, back, left, right, top, and bottom of the scene. These commands are:

| | |
|---|---|
| "View Front" | Lets you look at the front of a scene—as though the camera is positioned in front of the scene. |
| "View Back" | Provides you with a rear view of the scene—as though you have positioned a camera behind the scene. |
| "View Left" | Lets you look at the left side of a scene—as though you have positioned a camera to the left of a scene. |
| "View Right" | Lets you look at the right side of a scene—as though you have positioned a camera to the right of a scene. |
| "View Top" | Lets you look down upon the scene—as though you have positioned a camera above the scene. |
| "View Bottom" | Lets you look up at a scene—as though you have positioned a camera below the scene. |

Ricochet User's Guide – Chapter 10, Ricochet Menus and Toolbars – 6

The Lens Commands

Photographers switch camera lenses to take different types of pictures. They might use a telephoto lens to take close-up shots with little or no perspective, or a wide angle lens to take panoramic shots with a great deal of perspective. You can use one of the Lens commands to achieve a similar affect.

- Choose "Wide Lens" for panoramic scenes. The models will be slightly distorted; models that are farther away will appear smaller.
- Choose "Normal Lens" to preserve the normal size of the models.
- Choose "Telephoto Lens" to make the models appear closer to you and larger.

The Resolution Commands

The three resolution commands are:

- "At NTSC Resolution"
- "At Pal Resolution"
- "At Custom Resolution"

The "Display Drop Zone" Command

The "Display Drop Zone" command allows you to view or hide the drop zone when you are editing the custom part of the Ricochet scene. When a check mark appears next to the command, the drop zone appears on the screen. When the checkmark is missing, the drop zone is hidden.

The "Nice Transparency" Command

A model can appear opaque or transparent depending on its material. By default, Ricochet uses a low-quality transparency setting. The result: models move and rotate quickly but they look rough. Choose "Nice Transparency" to improve the appearance.

Note: Choosing "Nice Transparency" slows the rendering speed.

Stages Menu

The commands on the Stages menu allow you to control the stages in your scenes. For more detail, see:

- "The "Edit Stage" Command"
- "The "Make Stage From Models" Command"
- "The "Delete Stage" Command"
- "The Draw Commands"

The "Edit Stage" Command

The "Edit Stage" command allows you to edit a stage. Choose "Edit Stage" to enter edit stage mode (a checkmark appears next to "Edit Stage"). The custom parts of the scene disappear and only the stage appears in your Ricochet window. This is the only time you can select or edit components of a stage. To exit from edit stage mode, select "Edit Stage" again. Ricochet exits from edit stage mode (the checkmark no longer appears next to "Edit Stage").

The "Make Stage From Models" Command

The "Make Stage From Models" command creates a stage from the models and lights currently in a scene. Ricochet places a drop zone in the stage that is just large enough to contain the models in the scene.

The "Delete Stage" Command

The "Delete Stage" command removes a stage from the Ricochet scene.

The Draw Commands

The Draw commands determine how Ricochet displays models in the stage when you are editing the custom scene. You can choose to suppress part or all of the detail of models in the stage when you are editing the custom scene to improve performance. The Draw options are:

- "Draw As Is"—Draw models with all components present.
- "Draw No Texture"—Omit textures from the display of models in a stage.
- "Draw Wireframe"—Draw just the wireframe component of the model.
- "Draw Invisible"—Suppress display of models in the stage.

Render Menu

The Render menu allows you to initiate rendering of a view or movie.

- "The "Begin Rendering" Command"
- "The "Edit Render Server List" Command"

The "Begin Rendering" Command

This command initiates the rendering of either a single view of a scene or a movie. A Render Options dialog appears that allows you to select options for rendering. See Chapter 6, "Rendering a View," to learn more about the Render Options dialog.

Choosing this command is equivalent to clicking the Rendering button in the toolbar. SeeFigure 10–4

Figure 10-4 The Begin Rendering Button

The "Edit Render Server List" Command

Ricochet allows you to distribute the work of rendering an image or a movie among several servers on the network. The "Edit Render Server" command allows you to choose the machines on the network that will participate in the rendering of your scenes.

When you choose this command, an Edit Server List window appears on your monitor. This window displays the list of server currently selected and allows you to add machines to the list or delete machines from it. Figure 10-5 shows the Edit Server List dialog.

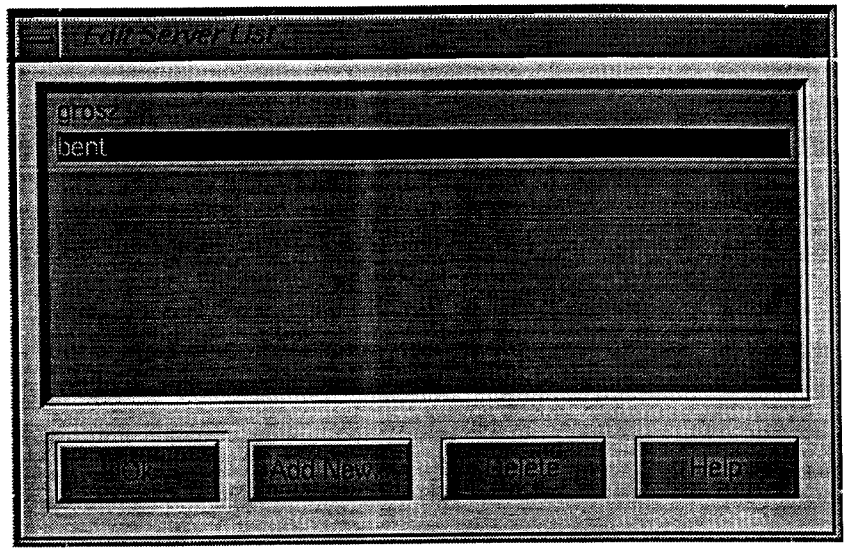

Figure 10-5 The Edit Server List Dialog

The Camera Menu

The commands on the Camera menu allow you to create and modify

- "The "Create ViewPoint" Command"
- "The "Extend Camera Path" Command"
- "The "Delete Path and Points" Command"
- "The "Open Camera Editor" Command"
- "The "Play Animation" Command"
- "The "Stop Animation" Command"
- "The "Go To Beginning" Command"

The "Create ViewPoint" Command

The "Create ViewPoint" command allows you to save the current view of a scene. The Camera Editor represents this viewpoint as a green icon in the Camera Editor display area. This viewpoint becomes a part of the scene and is saved in the scene file. You can display the saved view of the scene by opening the Ricochet User's Guide – Chapter 10, Ricochet Menus and Toolbars – 9

Camera Editor and clicking twice on the green icon that represents the view.

The "Extend Camera Path" Command

The "Extend Camera Path" command adds the current view of a scene to the end of the camera path for the scene. Ricochet represents the added camera path point as a blue icon on the camera path shown in the Camera Editor display area.

If you click on the Reverse button in the Camera Editor window, the new camera path point is added to the new end of the path—what was the beginning of the path before the reverse operation.

The "Delete Path and Points" Command

The "Delete Path and Points" command deletes the current camera path and all camera points viewpoints in the scene.

The "Open Camera Editor" Command

Choose "Open Camera Editor" command to open the Camera Editor. The command is equivalent to clicking the Open Camera Path Editor button (see Figure 10–6).

Figure 10–6 Open Camera Editor Path Button

The "Play Animation" Command

Use the "Play Animation" command to play an animation of the scene currently displayed in the Ricochet display area. This animation shows views of the scene, as defined by the camera path, from the current position of the camera to the end of the path. If the camera is positioned at the end of the camera path, the camera is moved to the beginning of the path and the animation begins at that point.

You can open the Camera Path Editor to determine the current location of the camera on the path or the movement of the camera along the path as the animation plays.

The "Stop Animation" Command

The "Stop Animation" command stops the animation at the current location on the camera on the path.

The "Go To Beginning" Command

The "Go To Beginning" command repositions the camera to the beginning of the camera path.

The Appearance Menu

The Appearance menu contains commands that let you change the color, material, and texture of 3D models.
- "The "Material Palette" Command"
- "The "Material Editor" Command"
- "The "Texture" Command"
- "The "Lighting" Command"
- "The "Environment" Command"

The "Material Palette" Command

The "Material Palette" command opens a material palette. You can use this palette to change the material of a selected model. Figure 10-7 shows a material palette. The Palettes menu is displayed to show the list of other palettes from which you can choose. "The Material Palette" tells you more about choosing materials for your models.

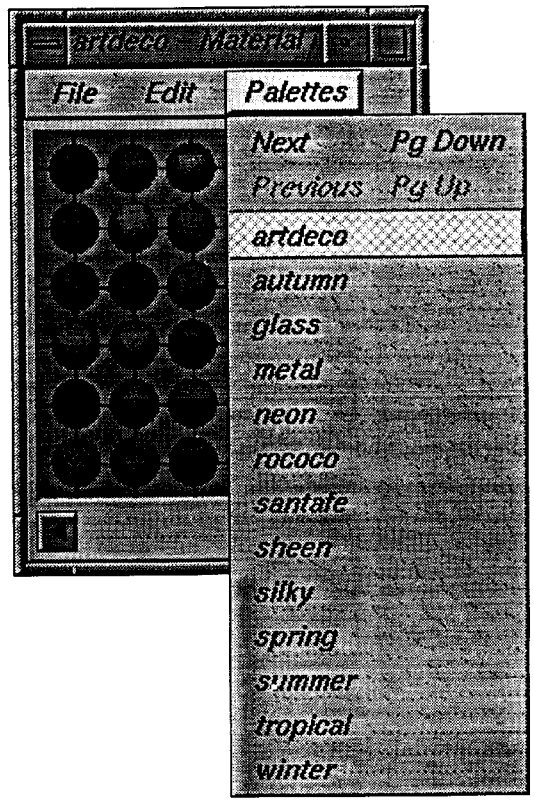

Ricochet User's Guide – Chapter 10. Ricochet Menus and Toolbars – 11

Figure 10-7 The Material Palette

The "Material Editor" Command

Figure 10-7 shows the many material palettes that Ricochet provides. In addition to selecting from one of these palettes, you can use the Material Editor to create a custom palette or modify one of the existing materials. See "The Material Editor" to learn more about creating materials using the Material Editor.

The "Texture" Command

The "Texture" command opens the Texture Editor. You can use this editor to apply a texture to a selected model and to specify how you want the texture applied to the model. Figure 10-8 shows the Texture Editor. The Palettes menu is displayed to show the many palettes from which you can choose.

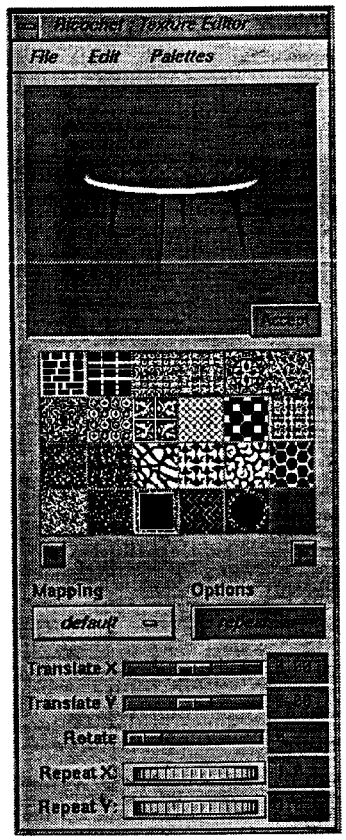

Figure 10-8 The Texture Editor

In addition to selecting from one of these palettes, you can create a custom palette or modify one of the existing textures. See also "The Texture Editor"

The "Lighting" Command

The "Lighting" command opens the light editor. You can use this editor to add spot lights, directional lights, and point lights to either a custom scene or a stage. You can also use the Open Light Editor button on the Appearance toolbar to open the Light Editor. "Using Lights in a Scene" describes the Lighting Editor in detail.

The "Environment" Command

The "Environment" command opens the Environment Editor. You can use this editor to add fog to a stage or a custom scene. See "Environment Editor" to learn more about adding environmental effects to your scene.

Toolbars

Rendering Toolbar

The Rendering toolbar contains a Begin Rendering icon that allows you to initiate the rendering of a view or a movie made from a camera path in the scene. Figure 10-9 shows the Begin Rendering icon.

Figure 10-9 Render Scene to Screen Icon

When you click on the Begin Rendering icon, the Render Options window appears on your screen. Figure 10-10 shows this window.

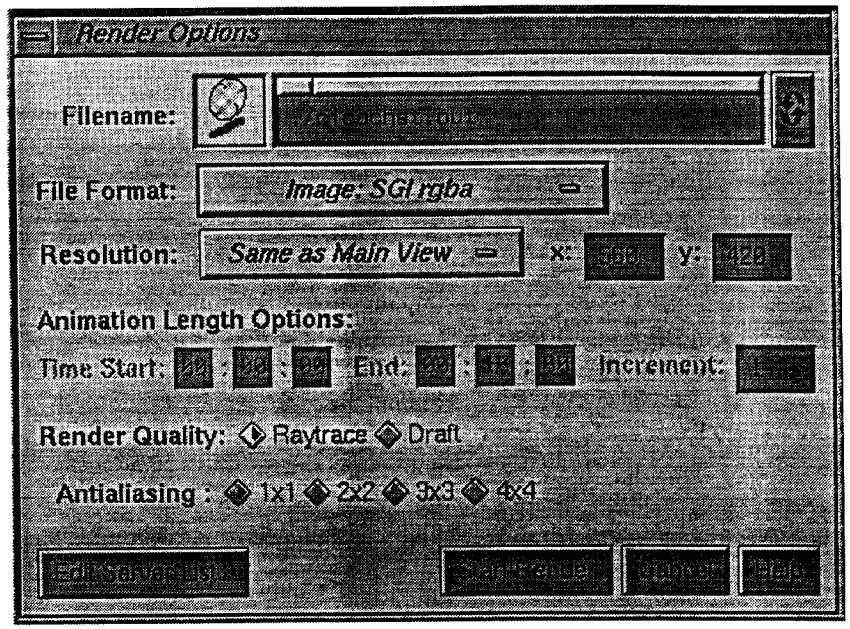

Figure 10-10 Render Options Window

This window allows you to select:

- Filename. This file contains the name of the file in which the rendered image or movie is saved. The default file is *ricochet.out*.
- File Format. This field specifies the format of the rendered file. Choose *SGI/rgb* if you want to render a single scene; choose *Movie: SGI uncompressed, Movie: MPEG–1, Movie:QuickTime Video*, or *Movie: JPEG* to render a movie.
- Resolution: This field allows you to choose the resolution for the rendered output. Resolution options are: *NTSC, 1/2 Res NTSC, PAL, 1/2Res PAL, Same as Main View*, or *Custom*.
- Animation Length Options. If you are rendering a movie, you can render the whole camera path or you can render a portion of it. To do this, specify in this field the start and stop time of the portion you want to render.
- Render Quality. You can select either Raytrace or draft quality rendering.
- Antialiasing. ?
- Edit Server List. Ricochet allows you to specify that workstations other than your own perform portions of the rendering process. The Edit Server List button at the bottom of the window allows you define a list of these workstations.

Ricochet User's Guide – Chapter 10, Ricochet Menus and Toolbars – 14

Click the Start Render button to start the rendering process. A renderpanel window appears that shows the tiles of the rendered view one-by-one as they are computed by Ricochet. Figure 10-11 shows a renderpanel.

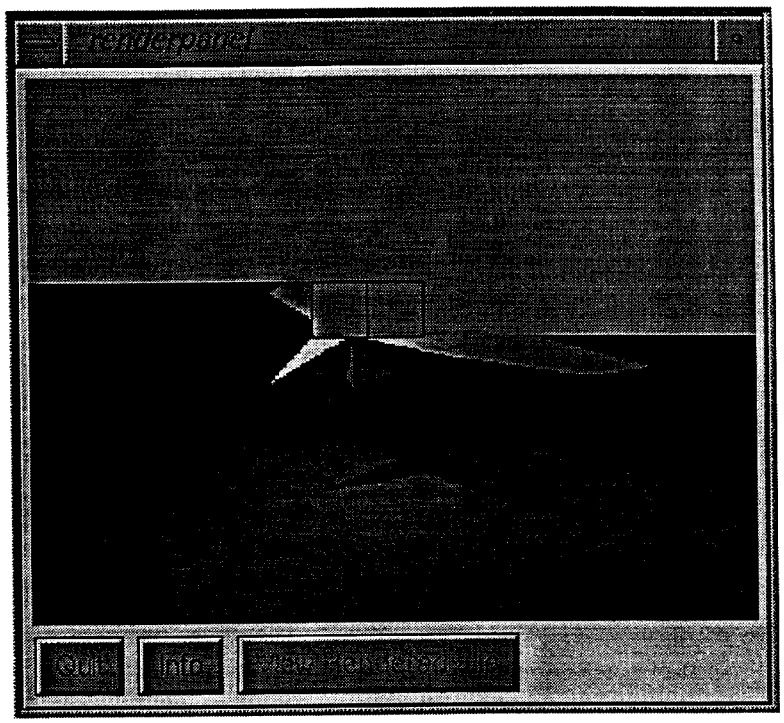

Figure 10-11 The renderpanel

The renderpanel has an *Quit* button that allows you to abort the rendering process if you determine that the result is not what you want. The renderpanel remains on the screen after rendering is complete. At this point, you can select the *View Rendered File* button to view an enlarged version of the rendered view.

Camera Toolbar

The Camera toolbar allow you to add viewpoints or a camera path points to your scene. Figure 10-12 shows the Camera toolbar.

Figure 10-12 Camera Toolbar

Use the Viewer tool to position the scene to the desired view before clicking on these icons. In left to right order, the Camera icons are:

- Add Viewpoint. Click on this icon to add a single viewpoint to your scene. You can see this viewpoint in the Camera Editor display area as a green icon. You can double click on the green icon to position the scene to this view in the Ricochet display area. Use the Viewer tool to position the scene to the desired view before clicking on this icon.
- Extend Camera Path. Click on this icon to add the current view point to the end of the camera path. You can see this camera point in the Camera Editor display area as a blue icon. Use the Viewer tool to position the scene to the desired view before clicking on this icon.
- Open Camera Path Editor. Use this icon to open the Camera Path Editor.

Appearance Toolbar

The Appearance toolbar allows you to select editors that modify the appearance of models in a scene or that add lighting and fog effects to the scene.

Figure 10-13 The Appearance Toolbar

Use the up arrow and down arrows at the left end of the Appearance toolbar to move up and down the hierarchy of shapes in a model composed of a hierarchy of shapes. If the up (or down) arrow is gray, it means you have gone as far up (or down) the hierarchy as you can. In other words, the current selection is the parent (or the smallest child) in the hierarchy.

The five icons following the arrows in the Appearance toolbar invoke editors that modify the appearance of a model or a scene. In left to right order, these icons invoke the:

- Material Palette. You can select a material for your model from those presented in the material palettes. See "The Material Palette."
- Material Editor. Use this editor to customize a material from a material palette or to create your own material palette. See "The Material Editor."
- Texture Editor. Use this editor to apply a texture to a model in a scene. See "The Texture Editor."
- Light Editor. Use this editor to add spot lights, directional lights, and point lights to your scenes. See "Using Lights in a Scene."
- Camera Editor. Use this editor to define a camera path used by Ricochet to create views for a rendered movie. See Chapter 7, "Defining a Camera Path."

Note: The Material Palette, Material Editor, and Texture Editor icons are only active when a model is selected since you use them to change the appearance of a model. The Light and Camera Editor icons are always active since you use them to add features to the whole scene.

Keyboard Shortcuts

You can use keyboard shortcuts for many Ricochet commands. The shortcuts appear on the right side of the menu and are shown in Table 10-1. To use these shortcuts, press the keys listed on the menu. For example, to quit Ricochet, press the <Ctrl> and q keys simultaneously.

Table 10-1 Shortcuts for Ricochet Commands

| Menu | Command | Keyboard Shortcut |
|---|---|---|
| File | "New" | <Ctrl>-n |
| | "Open..." | <Ctrl>-o |
| | "Import Model..." | <Ctrl>-i |
| | "Save All" | <Ctrl>-s |
| | "Save All As..." | <Ctrl>-<Shift>-s |
| | "Quit" | <Ctrl>-q |
| Edit | "Undo" | <Ctrl>-u |
| | "Redo" | <Ctrl>-<r> |
| | "Cut" | <Ctrl>-x |
| | "Copy" | <Ctrl>-c |
| | "Paste" | <Ctrl>-v |
| | "Delete" | <Backspace> |
| | "Select Parent" | up arrow |
| | "Select Child" | down arrow |
| View | "View Home" | <Home> |
| | "View Front" | <Ctrl>-1 |
| | "View Back" | <Ctrl>-2 |
| | "View Left" | <Ctrl>-3 |
| | "View Right" | <Ctrl>-4 |
| | "View Top" | <Ctrl>-5 |
| | "View Bottom" | <Ctrl>-6 |
| Stages | "Edit Stage" | <Ctrl>-E |

What is claimed is:

1. A method for use in a computer system for authoring a 3D scene, the method comprising:

interactively selecting a stage from among predefined 3D stages, each of the 3D stages having a predetermined feature;

importing a predefined 3D object into the selected stage; and rendering a 3D scene comprising the predefined 3D object and the selected 3D stage.

2. The method of claim 1 wherein the selecting of a stage is performed by a user of the computer system.

3. The method of claim 2 further comprising presenting to the user a visual interface having graphical abstractions to allow the user to communicate with the computer system.

4. The method of claim 1 further comprising enabling a user of the computer system to modify the predetermined feature of the selected 3D stage.

5. The method of claim 1 wherein the predetermined feature of the selected 3D stage comprises a functional element.

6. The method of claim 1 wherein the predetermined feature of the selected 3D stage comprises an aesthetic element.

7. The method of claim 1 wherein the predetermined feature of the selected 3D stage comprises lighting characteristics for the 3D scene.

8. The method of claim 1 wherein the selected stage includes a headlight having a position that moves in synchronization with a viewpoint from which a user of the computer system views the stage.

9. The method of claim 1 wherein the predetermined feature of the selected 3D stage comprises a platform.

10. The method of claim 1 wherein the predetermined feature of the selected 3D stage comprises at least one of a texture, a color or a material composition.

11. The method of claim 1 wherein the predetermined feature of the selected 3D stage comprises an environment in which the 3D object is displayed.

12. The method of claim 11 wherein the environment in which the 3D object is displayed comprises at least one of fog, haze, pollution and smoke.

13. The method of claim 1 wherein the predetermined feature of the selected stage comprises a home view position with respect to which the 3D object is rendered.

14. The method of claim 1 wherein the predetermined feature of the selected stage comprises a camera path that defines a series of positions in 3D virtual space with respect to which the 3D object is rendered.

15. The method of claim 1 further comprising, prior to the selecting, defining the 3D stages such that each stage comprises features that are tailored to complement each other.

16. The method of claim 1 wherein each of the 3D stages represents a different atmosphere in which 3D objects may be displayed.

17. The method of claim 1 further comprising, prior to the rendering, translating, rotating or scaling the imported 3D object.

18. The method of claim 1 wherein the importing comprises scaling the predefined 3D object to a predetermined size.

19. The method of claim 1 wherein the importing comprises retaining an original scale or an original orientation of the predefined 3D object.

20. The method of claim 1 wherein the importing comprises placing the predefined 3D object at a predetermined drop zone within the selected 3D stage.

21. The method of claim 20 wherein the drop zone comprises a virtual 3D region within the stage.

22. The method of claim 20 wherein the drop zone comprises a bounding box that encompasses the imported 3D object.

23. The method of claim 22 wherein the imported 3D object is scaled to fit within the bounding box.

24. The method of claim 20 wherein the predetermined feature of the selected stage comprises a path in virtual 3D space along which a virtual camera travels while rendering views of the 3D scene.

25. The method of claim 24 wherein the virtual camera looks at the drop zone at all points along the path.

26. The method of claim 1 wherein the predefined 3D object comprises a self-animated object.

27. A method for use in a computer system for authoring a movie of a 3D scene, the method comprising:

providing user-interface abstractions that allow a user of the computer system to interactively define (i) a camera path in virtual 3D space along which a virtual camera travels; and (ii) a variable rate at which the camera moves along the camera path;

receiving user input that defines a camera path and a variable rate for the virtual camera; and rendering virtual camera views of the 3D scene based on the input received from the user.

28. The method of claim 27 wherein the camera path comprises a series of positions from which the 3D scene is to be viewed.

29. The method of claim 28 further comprising receiving user input that defines for each of the positions a point in the 3D scene towards which the virtual camera looks.

30. The method of claim 27 wherein the user input that defines the camera path includes directional information for varying the orientation of the virtual camera as it travels along the camera path.

31. The method of claim 27 wherein the user input that defines the variable rate at which the camera moves along the camera path includes information that causes the virtual camera to pause for a specified duration when the virtual camera reaches a specified location on the camera path.

32. The method of claim 27 wherein the user input that defines the variable rate at which the camera moves along the camera path includes time tick information that causes the virtual camera to arrive at a specified location on the camera path at a specified time.

33. The method of claim 27 wherein the user input that defines the variable rate at which the camera moves along the camera path includes information that causes the virtual camera to accelerate or decelerate as it moves along the camera path.

34. The method of claim 27 wherein the 3D scene of which a movie is being made comprises a predefined stage has an associated default camera path.

35. The method of claim 34 wherein the default camera path comprises a circle within a plane.

36. The method of claim 35 wherein the received user input comprises a modification to the default camera path.

37. An interactive user interface for authoring a movie of a 3D scene on a computer system, the user interface comprising:

graphic abstractions that allow a user to visually define independently of each other (i) a camera path in virtual 3D space along which a virtual camera travels, and (ii) movement of the virtual camera along the defined camera path; and an output context for viewing the movie of the 3D scene as the virtual camera travels along the defined camera path.

38. The interactive user interface of claim 37 wherein the output context comprises a window on a display monitor or a movie file.

39. The interactive user interface of claim 37 wherein the camera path comprises camera points and wherein the graphic abstractions include tools to allow the user to add, delete or modify camera points.

40. The interactive user interface of claim 37 wherein the graphic abstractions comprise a camera icon that travels along a graphic representation of the camera path.

41. The interactive user interface of claim 37 wherein the graphic abstractions include tools to allow the user to add pauses or time ticks at specified locations along the camera path.

42. The interactive user interface of claim 41 wherein the pauses or tick marks added by the user vary a speed at which the camera moves along a portion of the camera path.

43. The interactive user interface of claim 37 wherein the user can define movement of the virtual camera such that its speed varies as it travels along the camera path.

44. A computer program, residing on a computer readable medium, for composing a graphic scene on a computer system comprising a graphic user interface, the computer program comprising instructions to:

receive from a user of the computer system input that identifies a 3D object to be included in the graphic scene;

scale the specified 3D object to a size less than or equal to a predetermined size; and import the scaled 3D object into a predetermined location within the scene.

45. The computer program of claim 44 further comprising instructions to allow the user to rescale or relocate the 3D object after it has been imported into the scene.

46. The computer program of claim 44 wherein the same predetermined size and predetermined location are used for importing a plurality of objects.

47. The computer program of claim 44 wherein the predetermined location comprises a 3D virtual region strategically placed within the scene.

48. The computer program of claim 47 wherein the strategic place is optimized for a characteristic of the scene.

49. The computer program of claim 44 wherein the predetermined location at which the 3D object is imported comprises a location specified by a model that defines the 3D object.

50. The computer program of claim 44 further comprising instructions to retain an original parameter of the 3D object.

51. The computer program of claim 50 wherein the original parameter comprises a location at which the 3D object is imported.

52. The computer program of claim 50 wherein the original parameter comprises a size of the 3D object.

53. The method of claim 9 further comprising placing the 3D object on the platform.

* * * * *